United States Patent [19]

Conover et al.

[11] 3,862,225

[45] Jan. 21, 1975

[54] D-RING SUBSTITUTED TETRACYCLINES

[75] Inventors: Lloyd H. Conover, Quaker Hill, Conn.; Robert B. Woodward, Belmont, Mass.

[73] Assignee: Pfizer Inc., New York, N.Y.

[22] Filed: Jan. 7, 1971

[21] Appl. No.: 104,747

Related U.S. Application Data

[63] Continuation-in-part of Ser. No. 647,238, June 19, 1967, abandoned, which is a continuation-in-part of Ser. No. 209,269, July 11, 1962, abandoned, which is a continuation-in-part of Ser. No. 132,304, Aug. 18, 1961, abandoned.

[52] U.S. Cl..... 260/559 AT, 260/239.3 T, 260/520, 260/243 B, 260/544 M, 260/247.1, 260/562 R, 260/247.2 A, 260/571, 260/247.2 B, 260/574, 260/247.2 R, 260/576, 260/247.5 R, 260/578, 260/247.7 A, 260/590, 260/268 PC, 260/612 D, 260/268 TR, 260/613 D, 260/293.56, 260/623 D, 260/326.33, 260/625, 260/326.5 B, 260/999, 260/343.6, 260/293.62, 260/351, 260/429.9, 260/439 R, 260/448 R, 260/465 R, 260/465 E, 260/465 F, 260/469, 260/471 A, 260/473 F, 260/475.8 C, 260/479 R, 260/501.17, 260/501.21, 260/515 A, 260/515 R, 260/518 R, 260/519

[51] Int. Cl......................................... C07d 103/19

[58] Field of Search... 260/559 AT, 247.1, 247.2 A, 260/247.2 B, 247.2 R, 247.5 R, 247.7 A, 268 PC, 326.33, 293, 56

[56] References Cited
UNITED STATES PATENTS

| | | | |
|---|---|---|---|
| 3,029,284 | 4/1962 | Gordon | 260/559 AT |
| 3,188,348 | 6/1965 | Butler et al. | 260/559 AT |
| 3,338,963 | 8/1967 | Petisi et al. | 260/559 AT |
| R26,253 | 8/1967 | Petisi et al. | 260/559 AT |

*Primary Examiner*—Donald G. Daus
*Assistant Examiner*—Anne Marie T. Tighe
*Attorney, Agent, or Firm*—Connolly And Hutz

[57] ABSTRACT

The total synthesis of tetracycline-type antibiotics by a multistep process beginning with 3,4,10-trioxo-1,2,3,4,4a,9,9a,10-octahydroanthracenes comprising: (1) an aldol condensation with a glyoxalic acid ester to give a 2-carboxymethylidene-3,4,10-trioxo-1,2,3,4,4a,9,9a,10-octahydroanthracene ester; (2) Michael reaction of said ester with an amine to produce 3,4,10-trioxo-1,2,3,4,4a,9,9a,10-octahydroanthracene-2-($\alpha$-amino)acetic acid ester; (3) conversion of the triketone to the corresponding 4,10-diketone by (a) selective reduction of the Michael reaction product to the corresponding 3-hydroxy compound, followed by conversion of the 3-hydroxy compound to the corresponding 3-formyloxy compound and removal of the 3-formyloxy group by treatment with zinc dust to give a 4,10-dioxo-1,2,3,4,4a,9,9a,10-octahydroanthracene-2-($\alpha$-amino)acetic acid ester; or (b) conversion of the hydrochloride salt of the Michael reaction product to a lactone by reaction with p-toluenesulfonic acid and treatment of the lactone with zinc dust formic acid; (4) conversion of the 4,10-diketo-1,2,3,4,4a,9,9a,10-octahydroanthracene-2-($\alpha$-amino)-acetic acid to a mixed anhydride; (5) followed by acylation of a malonic acid ester with the mixed anhydride; (6) cyclization of the acyl malonate derivative to a 12a-deoxytetracycline which is then hydroxylated to a tetracycline. The preparation of the 3,4,10-trioxo-1,2,3,4,4a,9,9a,10-octahydroanthracenes from benzoyl halides by (a) Friedel-Crafts reaction of a benzoyl halide with a pyrocatechol ether, e.g., a di-(lower)alkyl ether, to produce a 3,4-di-(lower)alkoxybenzophenone; (b) conversion of the benzophenone by partial or complete reduction of the carbonyl group by chemical or catalytic methods to a 3,4-di-(lower)alkoxy diphenyl methanol or 3,4-di-(lower)alkoxy diphenyl methane; or to a 3,4-di-(lower)alkoxy diphenyl alkane via a Grignard reaction and reduction of the thus-produced alkanol; (c) oxidation of the 3,4-di-(lower)alkoxy diphenyl alkane, or the corresponding dihydroxy compound, to a dienedioic acid ester or dienedioic acid; (d) hydrogenation of the dienedioic acid compound to a benzyl adipic acid derivative; (e) cyclization of said compound to a 2-(2-carbalkoxyethyl)-4-tetralone by means of dehydrating or dehydrohalogenating agents; (f) cyclization of the 4-tetralone derivatives by condensation with a dialkyloxalate to give a 2-carbalkoxy 3,4,10-trioxo-octahydroanthracene; and (g) removal of the 2-substituent by decarboxylation. The intermediates and final products are useful as bactericides and/or chelating agents.

6 Claims, No Drawings

D-RING SUBSTITUTED TETRACYCLINES

CROSS-REFERENCES TO RELATED APPLICATIONS

This application is a continuation-in-part of copending application Ser. No. 647,238, filed June 19, 1967, and now abandoned which is in turn a continuation-in-part of copending application Ser. No. 209,269, filed July 11, 1962, and now abandoned which in turn is a continuation-in-part of application Ser. No. 132,304, filed Aug. 18, 1961, now abandoned.

BACKGROUND OF THE INVENTION

This invention relates to a process of preparation of antibacterial agents. More particularly, it is concerned with the discovery of new and novel synthetic routes for the preparation of known as well as new tetracycline products. It is also concerned with the new and useful tetracycline products obtained thereby, as well as with the new intermediates of the process.

The tetracycline antibiotics comprise a group of biologically active hydronaphthacene derivatives having the following essential structural features. The numbering system indicated is that employed by "Chemical Abstracts."

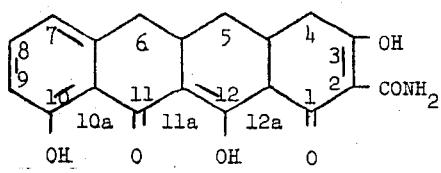

Among the biologically active members of this group are those containing the following substituent groups:

| Substituents | Common Name |
|---|---|
| 4-N(CH₃)₂,6-OH,6-CH₃,12a-OH | tetracycline |
| 4-N(CH₃)₂,5-OH,6-OH,6-CH₃,12a-OH | 5-oxytetracycline |
| 4-N(CH₃)₂,6-OH,6-CH₃,7-Cl,12a-OH | 7-chlorotetracycline |
| 4-N(CH₃)₂,5-OH,6-CH₃,12a-OH | 6-deoxy-5-oxytetracycline |
| 5-OH,6-CH₃,12a-OH,6-OH | 4-desdimethylamino-5-oxytetracycline |
| 4-N(CH₃)₂,6-CH₃,12a-OH | 6-deoxytetracycline |
| 4-N(CH₃)₂,12a-OH | 6-deoxy-6-demethyltetracycline |
| 4-N(CH₃)₂,6-OH,6-CH₃,7-Br,12a-OH | 7-bromotetracycline |
| 4-N(CH₃)₂,6-OH,7-Cl,12a-OH | 6-demethyl-7-chlorotetracycline |
| 6-OH,6-CH₃,12a-OH | 4-desdimethylaminotetracycline |
| 6-OH,6-CH₃,7-Cl,12a-OH | 4-desdimethylamino-7-chlorotetracycline |
| 4-N(CH₃)₂,6-OH,12a-OH | 6-demethyltetracycline |
| 12a-OH | 6-deoxy-6-demethyl-4-desdimethylamino-tetracycline |

SUMMARY OF THE INVENTION

The present new processes utilize 3,4,10-trioxo-1,2,3,4,4a,9,9a,10-octahydroanthracenes (formula I) as starting materials to produce both known and new tetracyclines having the formulae:

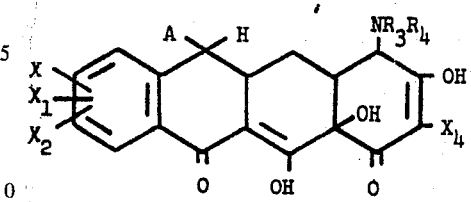

(XVI)

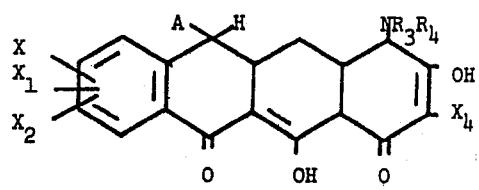

(XVII)

wherein the various terms are as defined below, by the reaction sequence illustrated in Flow Sheet I. It will be appreciated by those skilled in the art that several alternative routes exist for the conversion of compounds of formula I to the final products of formulae XVI and XVII. The particular route adopted for the preparation of a given tetracycline is largely dependent upon economic factors, such as, availability of materials, and yields of reaction products throughout the sequence.

Further, the conditions for any reaction in the sequence can, unless otherwise indicated, be varied within the skill of the art. The actual conditions employed are determined by the above listed factors as well as by type and availability of equipment.

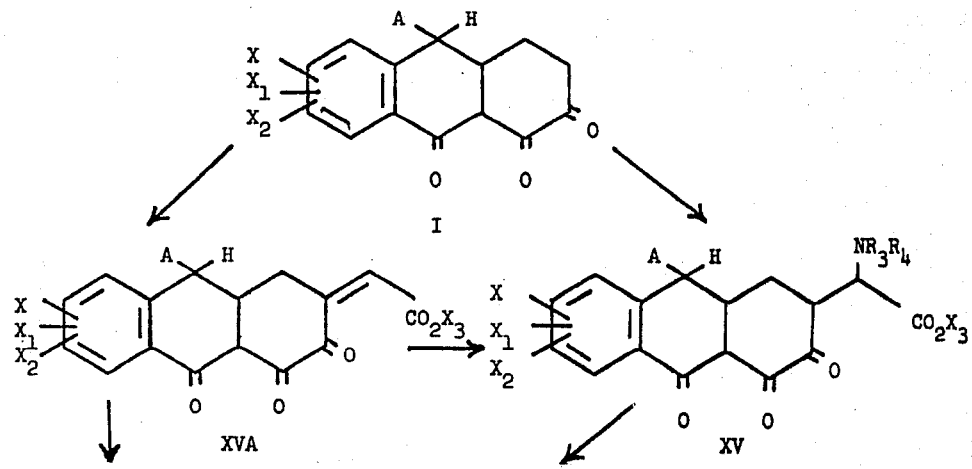

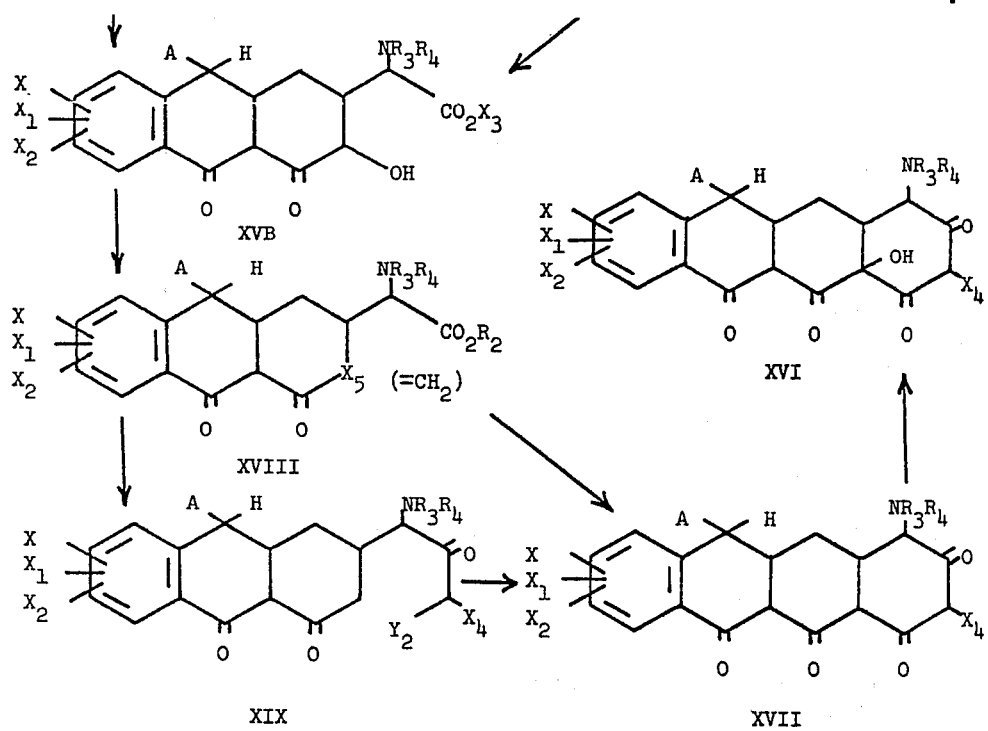

In the compounds of this sequence, X and $X_1$, the substituents corresponding to the 7- and 8- position substituents, respectively, in the final tetracyclines are selected from the group consisting of hydrogen, trifluoromethyl, amino and substituted amino, lower alkyl, hydroxyl and lower alkoxyl;

$X_2$ is OR' wherein R' is selected from the group consisting of hydrogen, lower alkyl, and benzyl;

A is selected from the group consisting of hydrogen, lower alkyl and $B_2OCH(B_3)$— wherein $B_2$ is lower alkyl and $B_3$ is selected from the group consisting of hydrogen and lower alkyl;

$X_3$ is selected from the group consisting of hydrogen, lower alkyl and benzyl;

$R_2$ is selected from the group consisting of $X_3$ and $CO_2X_6$ (mixed anhydride) in which $X_6$ is lower alkyl;

$R_3$ and $R_4$ when taken together with the nitrogen atom to which they are attached form a nitrogen heterocyclic ring selected from the group consisting of piperazino, morpholino, pyrrylo, pyrrolidino, 2-(lower carbalkoxy)pyrrolidino and thiomorpholino;

$R_3$ and $R_4$ when taken separately are each selected from the group consisting of hydrogen, lower alkyl, alkanoyl containing 1 to 4 carbon atoms and $\beta$-dimethylaminoethyl;

with the proviso that only one of said $R_3$ and $R_4$ substituents is alkanoyl containing 1 to 4 carbon atoms;

$X_4$ is selected from the group consisting of cyano, and $$\overset{O}{\underset{}{\overset{\|}{C}}}-NHR_6$$

in which $R_6$ is selected from the group consisting of hydrogen and lower alkyl;

$X_5$ is selected from the group consisting of $-CH_2$, $-CHOH$, $$-CH(O\overset{O}{\overset{\|}{C}}H)$$

and C=O;

$Y_2$ is selected from the group consisting of hydrogen, cyano and lower carbalkoxy.

It should be noted that although the X, $X_1$ and $X_2$ terms in the benzenoid moiety of the above generic structures appear in the same sequence, they need not be present in this sequence in actual practice. This representation is for convenience only and is not to be taken to indicate, for example, that $X_2$ always represents the 5-substituent, or that $X_1$ represents the 6- or the 7-substituent. They can occur in any sequence in the benzoid moiety.

It should be noted that the various substituents in the final tetracyclines of formulae XVI and XVII or in the intermediates for their production may be replaced by other groups according to procedures described hereinafter. Thus, X, $X_1$ and $X_2$ may be transformed to hydroxy, hydroxyalkyl, nitro, cyano, carbalkoxy, alkyl sulfonyl, halo sulfonyl, alkyl sulfinyl and sulfamyl. The A substituent may be transformed to $=CHB_3$, amino, mono- or di-lower alkylamino and $-CH(B_3)OH$ wherein $B_3$ is selected from the group consisting of hydrogen and alkyl, by appropriate reactions as is discussed below.

A wide variety of 4-aminotetracyclines are, of course, prepared according to the present processes by substituting various primary or secondary alkyl, aralkyl or aryl amines for dimethylamine. Suitable amines include other dialkylamines, e.g., methyl, ethyl, propyl, etc., amines; aralkyl and alkaryl amines, and N-alkyl derivatives thereof; e.g., N-methylaniline, benzylamine, heterocyclic amines, e.g., pyrrolidine, morpholine, aminopyridines and N-alkyl derivatives thereof; arylamines, e.g., aniline and substituted derivatives thereof wherein the substituent is hydroxy, carbalkoxy, nitro and amino; and ammonia. Further, hydroxyalkyl substituents on the nitrogen, where protected for some of the reaction steps by ether formation or acylation, as discussed below, may be subsequently be regenerated, e.g., by HBr cleavage or hydrolysis.

Of the present new compounds of particular value are those containing the following benzenoid moiety:

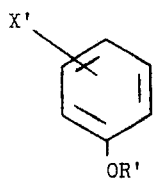

in which the preferred values of X' are selected from the group consisting of 7-trifluoromethyl, 8-trifluoromethyl, 8-dimethylamino, 7-lower alkyl, 8-lower alkyl, 7-hydroxyl, 8-hydroxyl, 7-lower alkoxyl and 8-lower alkoxyl; and the preferred 10-position substituents (OR') are those wherein R' is selected from the group consisting of hydrogen, benzyl and lower alkyl. These compounds are suitable for the preparation of biologically active tetracycline compounds not previously described.

DETAILED DESCRIPTION OF THE INVENTION

From I to XVA is an aldol condensation with a glyoxalic acid derivative, generally, a lower alkyl ester. The reaction is catalyzed by acids or metals, e.g., metal salts, preferably metal alkoxides. It is preferably conducted in an inert atmosphere, e.g., nitrogen, at a temperature of from about 80°–120°C. for from ¼ to about 24 hours using from about ⅛ to 2.0 moles metal ion/mole of triketone. The acid catalyzed condensation is conveniently carried out in glacial acetic acid as solvent. Non-hydroxylic solvents such as benzene, xylene, toluene, dioxane, dimethoxyethane, diethyleneglycol-dimethylether and dimethylformamide are useful solvents for the metal catalyzed condensation, especially when using metal alkoxides. Magnesium methoxide is especially useful in this condensation. Of course, when active hydrogen (in addition to that of the β-diketone system) is present, one extra equivalent of alkoxide is used per active hydrogen. The α-hydroxy ester, wherein the elements of water are added to the unsaturated ester, is also obtained in small yield. Its production is favored by short reaction periods and low temperatures. Dehydrating agents, such as phosphorus oxychloride in pyridine at 0° C. and p-toluenesulfonic acid in benzene permits dehydration and regeneration of the unsaturation.

The conversion of XVA and XV is a Michael reaction with an amine $HNR_3R_4$. The reaction is conducted at a temperature of from about $-70°$ C. to about $10°$ C. preferably at about $-20°$ C. An excess of the amine is employed; a sufficiently large excess frequently being used to serve both as solvent and as reactant. A variety of other solvents can be used and are actually necessary when the amine is a solid at the temperature of the reaction. Such solvents include tetrahydrofuran, ethylene glycol ethers, diethyleneglycol ethers and chloroform. The only criteria essential for the solvent are adequate solubility for the reactants, inertness and a sufficiently low freezing point.

The reaction is run for periods of from 15 minutes to 24 hours depending upon the reactants and temperature employed. Oxygen should be excluded during the period when the product is in contact with the excess amine. The order of addition of the reactants appears, in general, to be immaterial to the outcome of the reaction.

In some instances the ester group is transformed to the amide corresponding to the amine reactant. Primary lower alkylamines may also enter into further reaction involving the 3-keto group. This appears to be a transient or intermediate step in the reaction and, as long as the amine addition product is retained in solution, can be directly reduced to the 3-hydroxy amino acid ester (XVB). Isolation of the amine addition product, however, produces what is believed to be a fused lactam possibly via formation of a hydroxy amine at the 3-position followed by elimination of alcohol between the ester and amine groups.

From XV to XVB is a selective reduction with a suitable chemical reducing agent, such as metal hydrides, especially sodium borohydride. The reaction is carried out by dissolving the amino acid ester reactant in a suitable reaction-inert solvent such as 1,2-dimethoxyethane, ethyleneglycol ethers, diethyleneglycol ethers and liquid amines. When hydroxylic solvents are employed, e.g. alcohols, an excess of sodium borohydride is used. Reaction periods of from about 10 minutes to about 3 hours are required. Of course, when active hydrogen is present in the reactants, one equivalent of sodium borohydride is required per active hydrogen in addition to that of the β-diketone system.

Alternatively, the reduction is conducted by adding the sodium borohydride all at once to a vigorously stirred solution of the amino acid ester (XV) in one of the aforementioned solvents at $-70°$ C. followed by gradual increase in the temperature to $0°$ C. In this process, as above, 0.5 to 4.0 moles of reducing agent per mole of amino acid ester is used. A ratio of 1 is, however, preferred (except in cases where active hydrogen is present).

From XVA to SVB is a selective reduction with a suitable chemical reducing agent, such as sodium borohydride, of the Mannich reaction product XV. It is represented as a one-step conversion since the Michael reaction product need not be separated prior to reduction. Simultaneous formation of the corresponding lactone also occurs.

The lactone, of course, serves as a suitable reactant for the production of XVB by cleavage of the lactone ring under mild conditions.

The formation of XIX from XVIII ($R_2$=H) is accomplished by formation of a mixed anhydride ($R_2$=$CO_2X_6$) with a haloalkyl carbonate as described in the J. Am. Chem. Soc. 75, 636–9 (1953) and the J. Org. Chem. 22, 248 (1957). Acylation of a malonic acid ester derivative, e.g. malonic diester, cyanoacetic ester, malonic ester half amide, including N-alkylated amides and especially the magnesium salt of ethyl t-butyl-malonamate, etc. with the mixed anhydride produces the corresponding malonic acid derivative. Reaction is conducted in a suitable solvent system such as chloroform, toluene, benzene, diethylether, acetonitrile, dimethylformamide, nitromethane, dioxane, tetrahydrofuran, ethers of ethyleneglycol and diethyleneglycol at from about $-5°$ to about $35°$ C. for periods ranging from 25 minutes to up to 3 days. When $R_2$ is $CO_2X_6$ the malonic acid derivative is employed as a magnesium enolate according to the procedure of Tarbell and Price (J. Org. Chem., Loc. cit.)

Where $X_4$ is N-alkyl, e.g. t-butyl, isopropylcarboxamido, treatment with concentrated sulfuric acid yields the corresponding unsubstituted carboxamide.

The conversion of XIX to XVII is accomplished by standard basecatalyzed acylation using, for example, sodium alkoxides, sodamide or preferably sodium hydride. A ratio of at least 4 equivalents of base and desirably a great excess of up to 10 equivalents is employed. A variety of reaction-inert solvent can be used, e.g. benzene, xylene, toluene, anisole, dimethylformamide. Dimethylformamide containing a small amount of methanol is the preferred solvent. Reaction is conducted under nitrogen at a temperature of from about 80° to about 150° C., preferably 120° C., for periods of from about 3 minutes to up to 24 hours depending upon the reactants. A period of 5 to 7 minutes is adequate, indeed preferred, in most instances. When $Y_2 =$ CN, the 12-imido group which results is hydrolyzed with aqueous acid to the 12-keto group. Of course, when $X_4$ is lower carbalkoxy, the 2-cyano tetracycline (XVII) is obtained.

The compounds of structure XVI and XVII in which $X_4$ is a carboxamide group are biologically active tetracycline products, the latter being 12a-deoxytetracyclines which are converted to tetracycline compounds XVI by introduction of a 12a-hydroxy group by known procedures such as described in the J. Am. Chem. Soc., 81, 4748 (1959).

A preferred method of 12a-hydroxylation is the method described in U.S. Pat. No. 3,188,348, issued June 8, 1965 wherein is described the hydroxylation of certain metal chelates of the 12a-deoxytetracyclines. The advantage of this latter process lies in the fact that the hydroxy group is introduced cis- to the hydrogen at position 4a.

Compounds of structure XVI and XVII in which $X_4$ is carbalkoxy may be converted to corresponding compounds in which $X_4$ is carboxamide by fusion with ammonium formate at elevated temperature followed by hydrolysis with dilute mineral acids. Such compounds may be converted to those in which $X_4$ is carboxamide or CN by a variety of routes. Where the $C_2$ substituent is H ($X_4 =$ H), treatment with an alkyl or acyl isocyanate in the presence of sodium hydride or other base (triethylamine, alkali metal alkoxides, sodamide, 1,4-diaza[2,2,2] bicyclooctane) introduces a 2-N-substituted carboxamido group. In the case of an acyl isocyanate, the resulting 2-N-acyl carboxamide group is readily hydrolyzed to a 2-carboxamido group by methanolic ammonia; while in the case of a secondary or tertiary alkyl isocyanate, e.g. t-butyl isocyanate, the resulting 2-N-alkyl carboxamido group is converted to the 2-carboxamide group by dealkylation with concentrated mineral acid and water. The carboxamido group may also be introduced into compounds XVI and XVII by treatment with carbamyl chloride or an N-alkyl carbamyl chloride under basic conditions, e.g. in the presence of triethylamine, or other base as given above. Where a secondary or tertiary N-alkyl carbamyl chloride is employed the resulting N-alkyl carboxamide is converted to an unsubstituted carboxamide by treatment with mineral acid as previously discussed.

The reactions of isocyanates and carbamyl chlorides are generally carried out at temperatures of from about 0° to about 70° C. Most reactions proceed satisfactorily at room temperature after an initial cooling period which serves to moderate the reaction during the mixing of the reactants. Solvents such as dimethyl sulfoxide, toluene, dioxane, tetrahydrofuran, acetonitrile, ethers of ethylene- and diethyleneglycol and especially dimethylformamide are suitable for the reaction. The reaction time varies from about 10 minutes to 24 hours depending upon the reactants.

Additionally, the carboxamide group may be introduced at the 2-position of these compounds by heating with urea under basic conditions. For example, the reaction may be carried out in dimethyl-formamide solution under the influence of triethanolamine at temperatures ranging from 80° C. to the boiling point of the solvent. The reaction period varies with the structure of the reactant. However, periods of from about 5 minutes to one hour are generally satisfactory.

In lieu of this procedure, fusion with urea at about 130° C. for from 15 to 45 minutes under nitrogen serves to introduce a carboxamide group at C-2. (Scarborough, J. Org. Chem. 26, 3717 (1960)). Additionally, compounds in which hydrogen is at C-2 may be treated with lower alkyl halocarbonates to introduce carbalkoxy under conditions similar to those described above for introducing the carboxamide group via carbamyl chlorides. Further, ethyl ortho formate under acid conditions introduces a formyl group at C-2. The aldehyde function thus produced can be subjected to typical carbonyl reactions.

Compounds of structure XVII in which hydrogen is at C-2 are converted to corresponding compounds in which C-2 bears cyano by reaction with ethyl chloroximinoacetate in the presence of an acid acceptor, e.g., sodium carbonate or triethylamine, followed by hydrolysis of the thus produced 2,3-tetracycline-4',5'-isoxazole-3'-carboxylic acid ethyl ester to the corresponding 3'-carboxylic acid which is decarboxylated and converted to the nitrile product by treatment with copper and ammonia. A further related method comprises the reaction of chlorine free cyanogen chloride with compounds of structure XVII.

The diketo compound XVIII is obtained from the hydrochloride of XVB via the lactone by treatment with from about 0.5 to about 2 equivalents of p-toluenesulfonic acid in a suitable reaction-inert solvent (benzene, toluene, xylene) for periods of from about 5 hours to about 2 days. A temperature of from about 80°–140° C. is satisfactory. The lactone hydrochloride of XVB is then treated with zinc dust-formic acid for a brief period to give XVIII wherein $X_3$ is hydrogen. A ratio of from 1 to 20 equivalent of zinc dust is effective in cleaving the lactone to the free acid; 6–7 equivalents are preferred. Formic acid is the solvent of choice. However, mixtures of formic acid-methanol-water or of acetic acid-methanol-water, in approximately 1-1-1 ratio, can also be used. A temperature of about 25° C. is generally used, although this is not a critical level. To avoid reduction of the 4, 10-diketo system, it is important that mild reaction conditions and brief contact times be employed. Contact times of from about 30 seconds to several hours depending upon the reactants, are operative. In general, however, periods of from 45 seconds to 120 seconds are favored.

Alternatively, conversion of XVB to the diketo compound XVIII ($X_5=CH_2$) is accomplished by reaction with acetoformic anhydride according to known procedures followed by removal of the 3-formyloxy group

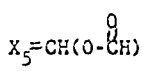

by one of the following; treatment with zinc dust-formic acid, or zinc dust in aqueous ammonium hydroxide, calcium in liquid ammonia, or catalytichydrogenation (5% Pd-C) in tetrahydrofuran or formic acid. Care must be taken to avoid over reduction, that is reduction of the 4,10-keto group. For this reason mild conditions are required. When using zinc dust-formic acid, for example, reaction is effected at room temperature with contact times of brief duration.

The 8-chloro atom of the diketo octahydroanthracene amino acid (XVIII, $X_5=CH_2$ and $R_2=H$), corresponding to the 7-chloro atom of the final tetracycline products can, if desired, be readily removed by catalytic hydrogenolysis. Pd-C or Pt-C containing 5-10% of the metal are most effective for this purpose. Pd-C (10%) is preferred. From about 0.1 to 1 weight equivalent is used. Dimethylformamide, tetrahydrofuran, water, ethanol and ethylacetate, preferably ethanol, serve as solvents. Pressures of from about 1 atmosphere to high pressures, e.g. 70 atmospheres or higher, and temperatures of from −20° C. to 60° C. or higher can be used. The preferred conditions are atmospheric pressure and room temperature for periods of about 3 hours. A base is required to take up the hydrogen chloride produced. While a variety of bases, both organic and inorganic by nature, can be used, it is preferred to use triethylamine, generally about 4 equivalents.

When the substituents of the present compounds are hydroxy or amino the use of a blocking group is sometimes advantageous in obtaining high yields during their preparation. Especially useful blocking groups are acyl, benzyl, tetrahydropyranyl, methoxymethyl, methyl and ethyl radicals. Benzyl ethers are particularly easily reduced to hydroxyl groups. Tetrahydropyranyl ethers are easily removed under mildly acidic conditions. Acyl groups which may be used include the acetyl, propionyl and butyryl, as well as the benzoyl, succinyl, phthaloyl, and the like. The lower alkyl blocking groups are preferred since these compounds are readily preparable.

When desired the above mentioned blocking groups, i.e. enol ether radicals, may be removed. The enol radicals are hydrolyzed by treatment with aqueous acid as is well known by those skilled in the art. When the ether radical is benzyl, hydrogenolysis over noble metal catalyst may also be used.

In compounds of formula XVII, for example, the compound wherein X, $X_1$ and A are hydrogen; $X_2$ is 10-methoxy; $R_3$ and $R_4$ are methyl and $X_4$ is N-t-butylcarboxamido, the 10-methyl ether and the t-butyl group at the 2-position are conveniently removed in a single step by treatment with 48% HBr for up to 15 minutes at about 100° C. If shorter periods of time, e.g. 5 minutes, are used only the 10 methyl ether may be cleaved. Alternatively, the protective methyl and t-butyl groups can be removed in step-wise fashion. Treatment with 85% $H_2SO_4$ for 2 hours at about room temperature removes only the t-butyl group to give the 10-methyl ether of 6-demethyl-6,12a-dideoxytetracycline. The 10-methyl group is then removed by treatment with 48% HBr, or with hot concentrated HCl, or hot 50% $H_2SO_4$.

The new compounds described herein are useful as chelating, complexing or sequestering agents. The complexes formed with polyvalent metal ions are particularly stable and usually quite soluble in various organic solvents. These properties, of course, render them useful for a variety of purposes wherein metal ion contamination presents a problem; e.g. stabilizers in various organic systems, such as saturated and unsaturated lubricating oils and hydrocarbons, fatty acids and waxes, wherein transition metal ion contamination accelerates oxidative deterioration and color formation, biological experimentation, metal extraction. They are further useful in analysis of polyvalent metal ions which may be complexed or extracted by these materials and as metal carriers. Other uses common to sequestering agents are also apparent for these compounds.

In addition, the compounds of Flow Sheet I are especially valuable as intermediates in chemical synthesis particularly in the synthesis of 6-deoxytetracycline, 6-deoxy-6-demethyltetracycline and other novel antimicrobial agents bearing structural similarities to the tetracycline antibiotics. Many of the herein described compounds, especially those containing one or more hydroxy groups in the benzenoid moiety, are useful as antibacterial agents in their own right.

In the present new process, particularly as applied to the synthesis of biologically active tetracyclines, it is preferred to employ intermediates in which the hydrogen atoms at the 9a and 2-positions of the anthracene ring (corresponding to the 4a and 5a-positions of the tetracycline nucleus) are in the cis arrangement. For example, preferred compounds are depicted by the following formula (syn. compounds)

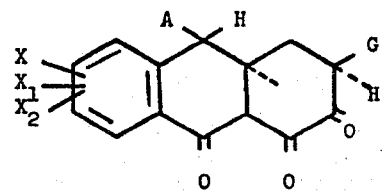

in which G is a substituent other than hydrogen, as contrasted with anti compounds of the formula:

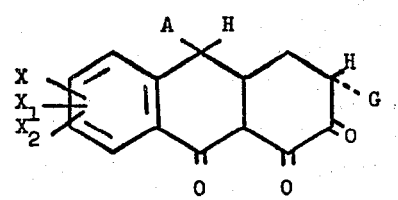

In general, syn and anti compounds are separable by virtue of differences in physical properties, e.g. differences in solubility in various solvents. Usually, fractional crystallization permits ready separation.

It is a particular advantage of the novel triketo octahydroanthracenes of the present invention that, by virtue of the activating influence of the carbonyl oxygen, they equilibrate to the predominantly cis configuration in the course of preparation. This enables the synthesis to proceed in sterospecific fashion without the loss of material that would otherwise be entailed in the separation of syn and anti compounds.

However, since in the production of compounds of this type, the product may consist of a mixture comprised of compounds differing in position 2 of the anthracene nucleus, i.e. the hydrogen being both cis and trans to the hydrogen at position 9a, the mixture can be converted to the predominately cis arrangement by equilibration in aqueous alkali, e.g. by treatment with aqueous sodium hydroxide or under the influence of the amine in the Mannich reaction. The procedure merely involves dissolving the reaction product in aqueous base and allowing the mixture to stand for periods of several hours to ensure complete equilibration. In lieu of this procedure, equilibration is attained via the Michael reaction using extended reaction periods.

It is recognized by those in the art that, when such compounds have an asymmetric center in the substituent G, they exist as diastereoisomers which, as previously mentioned, may be separated by fractional crystallization for each of the syn and anti compounds. Of course, as is known, diastereoisomers are racemic modifications consisting of two structures which are mirror images (optical antipodes). The racemic modifications may be resolved according to standard procedures. In the present process it is preferred, however, to utilize the diastereoisomers of the syn compounds since changes in configuration may occur during the various procedural steps of the total synthesis to tetracycline compounds, thus necessitating costly and time-consuming resolution procedures. The syn diastereoisomers are converted to tetracycline products which consist of the normal tetracyclines and their 4-epimers which are separable by known procedures. Of course, the 4-epitetracyclines are useful in that they are converted to normal tetracyclines by known procedures.

The starting compounds of structure I are prepared according to the following procedure:

is preferably not a nitro group since this group deactivates the ring of compounds of structure II in the ring closure reaction to those of structure III; ($R_1$ is lower alkyl or benzyl) and $R_5$ is hydroxyl, benzyloxy, lower alkoxy or halogen (Cl, F, Br, or I). Alternatively, the corresponding nitriles (e.g. where $COR_5$ is replaced by CN) may be used. Further, at least one of the two positions of the benzenoid ring ortho to the diester side chain must be available for the ring closure of structure II compounds. If desired, halogen, (Cl or Br) may be introduced into compounds of structure I, II, III and IV in which at least one of the benzenoid substituents is hydrogen by direct halogenation with a chlorinating or brominating agent by methods generally employed for halogenation of an aromatic ring. In the case of structure III and IV compounds at least a 2-molar excess of halogenating agent must be used since halogenation can also occur in the 2 and especially 4a positions. A variety of such agents are known to those in the art and include phosphorus pentachloride and pentabromide, sulfuryl chloride, N-chloro or bromoalkanoamides, e.g. N-chlor- and N-bromacetamide; N-chloro (or bromo) alkanedioic acid imides, e.g. N-halosuccinimide; N-halophthalimide; chlorine; bromine; N-haloacylanilides, e.g. N-bromoacetanilide, propionanilide and the like; 3-chloro-, 3-bromo, 3,5-dichloro and 3,5-dibromo-5,5-dimethylhydantoin; pyridinium perbromide and perchloride hydrohalides, e.g. pyridinium perbromide hydrobromide; and lower alkyl hypochlorites, e.g. tertiary butylhypochlorite.

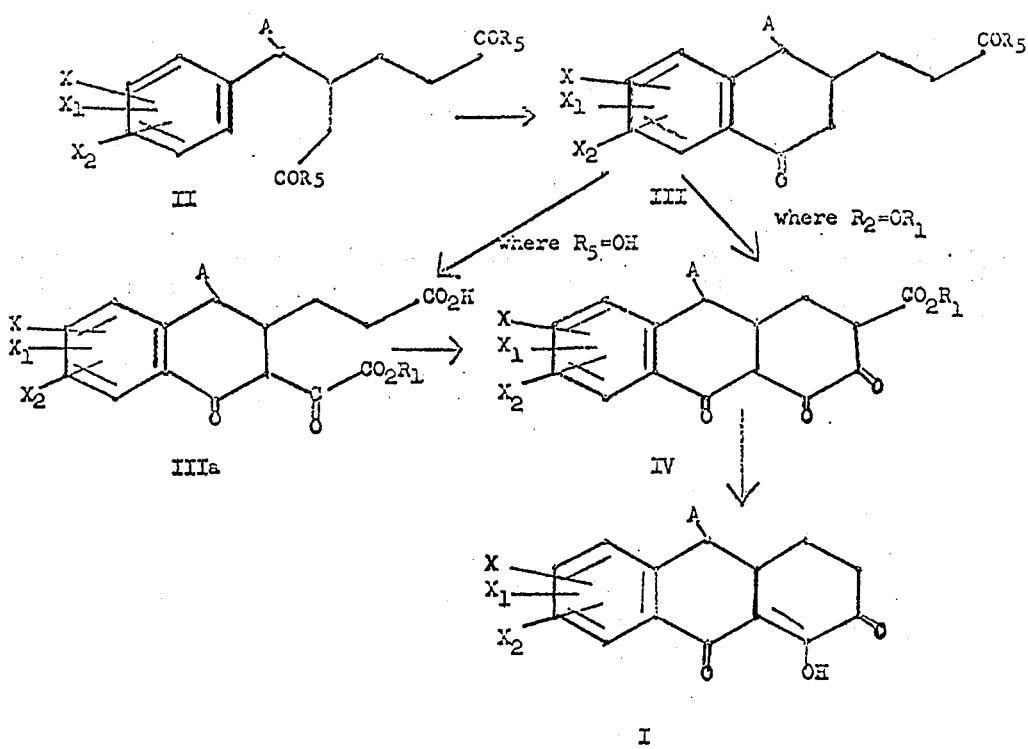

in the above formulae, X, $X_1$, $X_2$, and A are as previously described with the exception that substituent X Of particular value are compounds of the following formula:

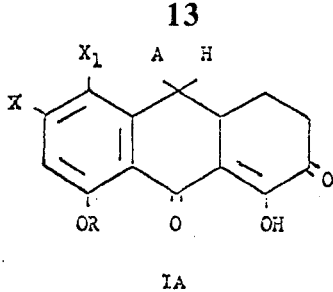

IA in which X, $X_1$, R and A are as described above, since these compounds are suitable for the preparation of biologically active tetracycline compounds, i.e. where OR is OH, and homologs and analogs thereof.

These compounds are prepared from the corresponding starting compounds of structure II represented by structure IID

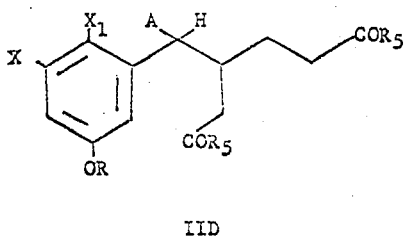

IID through the sequences represented by II → III → IV → I.

In the ring closure reaction of corresponding structure II compounds, it is preferred that the benzenoid substituent ($X_1$) para to substituent OR be other than hydrogen to enable the ring closure reaction to proceed in the position ortho to substituent OR to afford corrsesponding structure III compounds. If there is no substituent para to OR a halogen group may be introduced by direct halogenation by conventional methods as hereinbefore described. The para halogen substituent may be removed, if desired, by hydrogenolysis, under the usual conditions, of the tetralone resulting from the ring closure.

The ring closure of compounds II to III is accomplished by any of the commonly employed methods for such reactions which generally involve the use of a dehydrating or dehydrohalogenating cyclization agent. With compounds of structure II, a preferred method when $R_5$ is OH or alkoxy, involves treatment of the starting compound with such ring closure agents as hydrogen fluoride or polyphosphoric acid. When $R_5$ in the starting compound is hydroxyl, it is usually preferred to use hydrogen fluoride; when $R_2$ is lower alkoxy, polyphosphoric acid. When $R_5$ is halogen a Friedel-Craft's catalyst, of course, should be employed, e.g. aluminum chloride. m-Hydroxy- or alkoxy-benzyl compounds of structure II having ON in place of $COR_5$ lend themselves to the Hoesch synthesis (Berichte, 48, 1122 and 50, 462) wherein treatment with dry hydrogen chloride in the presence of zinc chloride leads to imine formation, and hydrolysis of the latter provides the tetralone keto group.

The condensation of compound III in which $R_5$ is $OR_1$ with oxalic ester as well as ring closure of compounds IIIa (after esterification of the free acid with $R_1OH$) are effected by the general methods for ester condensation reactions of this type. Usually the reaction is carried out in the presence of a strong base such as alkali metal, alkali metal alkoxides and hydrides, sodamide and the like. If the starting compound in the oxalate condensation contains free hydroxyl, or amino groups it is preferred to block such groups by alkylation or acylation by known procedures. After the reaction is completed, the blocking groups may be removed, if desired. The resulting product from structure III, i.e. the corresponding 2-carbalkoxy or carbobenzyloxy compound of structure IV, on hydrolysis and decarboxylation yields compounds of structure I. Cleavage of the ether linkage or other blocking groups by any of the general methods, e.g. treatment with mineral acid such as concentrated hydrobromic or hydriodic acid, or when R is benzyl, hydrogenolysis, gives free hydroxy groups in the benzenoid portion.

The starting compounds of the above described processes, i.e. compounds of structure II, are prepared by the following sequence of reactions.

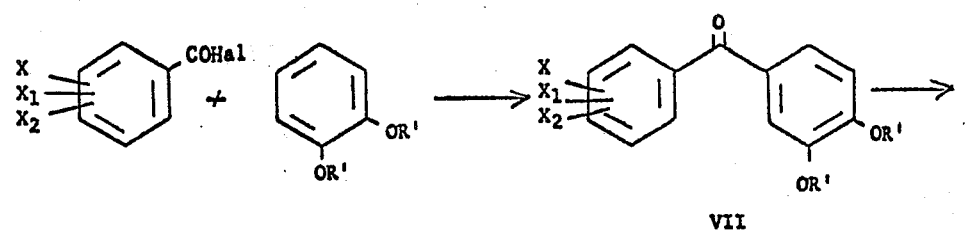

VII

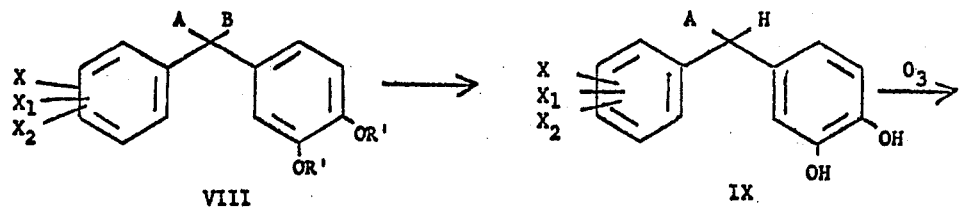

VIII                                IX

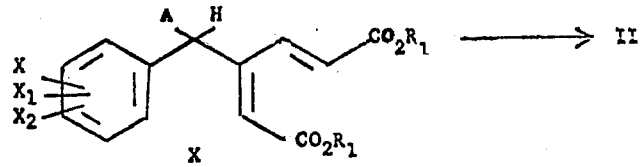

In the above sequence, $R^1$ and $R_1$ are lower alkyl or benzyl; and B is hydrogen or hydroxy.

The first of these reactions for the preparation of compounds of structure VII is by means of Friedel-Craft's reaction, e.g. $AlCl_3$ in carbon disulfide. The conversion of compounds of structure VII to those of VIII in which A and B are hydrogen is by catalytic reduction, e.g. over copper chromium oxide or noble metal, e.g. palladium, catalyst at from atmospheric to superatmospheric pressures of hydrogen gas; where A is alkyl and B hydroxyl, by reaction with a suitable Grignard reagent, e.g. AMgHalogen; where A is alkyl or hydrogen and B is hydrogen, by reduction, i.e. hydrogenolysis, of corresponding compounds in which B is hydroxyl. From VIII to IX is a standard ether hydrolysis, e.g. concentrated hydrobromic acid.

From IX to X is an ozonolysis reaction giving rise to the dienedioic acid which on hydrogenation over a noble metal catalyst, e.g. palladium, palladium on carbon, platinum, platinum oxide, etc., gives compounds of structure II. In the ozonolysis reactions to form compounds of structure X it is not possible to employ as starting compounds those of structure IX in which there are adjacent hydroxyl groups in the benzene ring containing X, $X_1$ and $X_2$ as substituents, since such structures are susceptible to the oxidation reaction.

Further, in the ozonolysis reaction compounds of structure IX in which X, $X_1$ and $X_2$ are adjacent ether groups or adjacent ether and hydroxy groups cannot be used since they, too, are susceptible of oxidation. The ozonolysis reaction is applicable to compounds of structure VIII, subject of course to the above limitation, wherein $OR^1$ represents an ether group. In such cases the ester (X) is obtained. In the hydrogenation reaction, compounds of structure X may be used as the free acids or corresponding benzyl or lower alkyl esters to provide corresponding products of structure II. Of course, benzyl esters may undergo hydrogenolysis to the free acid.

In addition, appropriate methods are available for reduction of the benzoyl keto group to a secondary alcohol. For example, IIa and VII can be reduced with sodium borohydride, or by hydrogenation with palladium catalyst in non-acidic media. By other well-known replacement procedures such as the following, the secondary alcohol may be converted to a readily replaceable sulfonic ester group, e.g., the tosylate, mesulfate, etc., followed by reaction with an alkali metal cyanide, an amine, a malonic ester, or the like, thus affording means for introduction of a cyano, amino or $-CH(CO_2B_2)_2$ group in the 6-position of the final tetracycline. The secondary alcohol can also be dehydrated and the resulting unsaturated compound reduced to the corresponding benzyl derivative.

In this sequence of reactions, when X and/or $X_1$ are halogen, care should be taken to avoid prolonged hydrogenations which may result in the removal of the halogen atom. The possibility of halogen removal may be minimized by the use of a lower alkanoic acid, e.g. acetic or propionic as solvent for the reaction. Of course, if removed, halogen may be reintroduced if desired by the method hereinbefore described.

In those compounds of structure IX in which there are adjacent hydroxy groups in the benzenoid moiety, such groups must be protected by suitable blocking groups, e.g. etherified with lower alkyl or benzyl groups. Similarly, free amino groups may be acylated. Of course, the etherifying radical of the hydroxy group may differ from that represented by $R'$. If the etherifying radical is benzyl it may subsequently be removed by hydrogenolysis. Alternatively, all ether groups can be removed by hydrogen iodide treatment.

As will be appreciated from the preceding reaction sequence, it is most convenient to introduce the benzenoid substituents, X, $X_1$ and $X_2$ by employing the appropriately substituted benzoic acid derivative as starting material. Many of these benzoic acid derivatives are commercially available, and others may be readily obtained by those skilled in the art.

It will be noted that a number of the later steps of the preceding sequences involve reaction conditions which may affect certain of the substituent groups signified by X, $X_1$ and $X_2$. For instance, in catalytic hydrogenation; e.g. VII → VIII, halo groups are subject to hydrogenolysis. Therefore, where halo groups are desired in the final product, these are best introduced subsequent to the hydrogenation by an appropriate substitution reaction.

In commencing the sequence with a substituted benzoyl succinate, it is essential that an ortho ring position be unsubstituted, since cyclization to form the center ring of the hydroanthracene occurs at this position. For the preparation of the preferred compounds of structure I, which bear an OR substituent in the 5 position, the position of the benzene ring between the OR group and the keto group in the starting benzoyl succinate should be unsubstituted, to provide for the subsequent ring closure. On the other hand, it is preferred to have a substituent in what corresponds to the 8-position of compound I, since, this precludes cyclization to that position in competition with the desired cyclization [II → III]. A $CF_3$, alkyl, or acylamino group can be conveniently carried in this position from the outset. Alternatively, an 8-substituent may be introduced during the reaction sequence, prior to the cyclization. For example, compound II may be halogenated at this position, e.g. by treatment with chlorine in the presence of a catalytic amount of iodine or ferric chloride.

Compounds of structure II are also prepared by the following sequences of reactions.

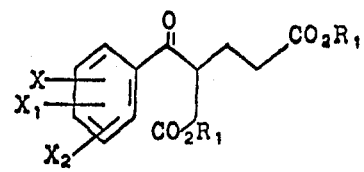

IIa

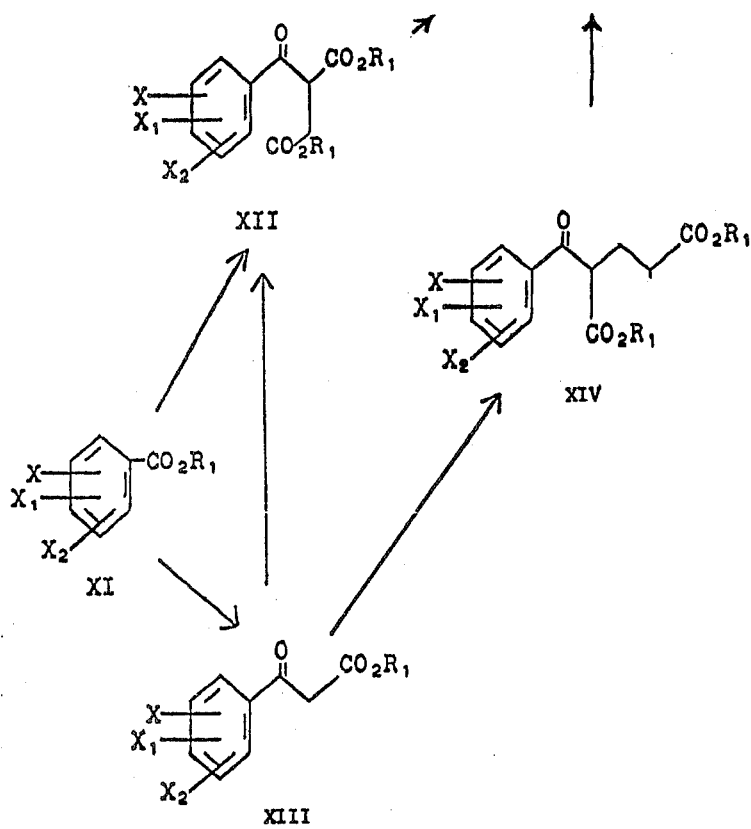

The conversion of compounds of formula XI to those of XII is a Claisen-type condensation of the lower alkyl ester of XI with succinic acid diesters to provide formula XII compounds. The conversion of compounds of formula XI to XIII is similarly a Claisen condensation using acetic acid esters. The conversion of compounds of formula XIII to XII is by alkylation reaction with a monohaloacetic acid ester, and the conversion of XIV to IIa is such an alkylation followed by hydrolysis and decarboxylation. The preparation of compounds of formula XIV from those of formula XIII is by standard alkylation procedures preferably using $H_2C = CHCO_2R_1$ or corresponding nitriles. This conversion may also be effected by alkylation with a $\beta$-halo acid derivative halogen-$CH_2CH_2CO_2R_1$ or the corresponding nitrile. Each of these reactions are effected under standard conditions known to those skilled in the art, e.g. in a reaction-inert solvent in the presence of a base such as Triton B (benzyltrimethylammonium hydroxide), sodamide, sodium hydride and their obvious equivalents.

The conversion of compounds of formula XII to those of IIa is by known standard reactions, e.g. by reaction of formula XII compounds with corresponding acrylic acid esters of the formula $H_2C = CHCO_2R_1$ in which $A_1$ and $R_1$ are as previously described under the conditions of the Michael reaction. It may also be effected by alkylation with $\beta$-halo-alkanoic acids of the formula Halogen-$CH_2CH_2CO_2R_1$ or of the corresponding nitriles. Hydrolysis and decarboxylation of these compounds gives structure IIa compounds. The conversion of structure IIa compounds to those of structure II is brought about by reactions as previously described for preparing structure VIII compounds.

The present invention additionally is adaptable for the preparation of other tetracycline molecules, as follows.

For compounds in which substituent X is nitro, the tetralone of structure III is nitrated by standard procedures, e.g., such as nitric-acetic anhydride — acetic acid mixtures or nitric acid — sulfuric acid mixtures. Those in which X is halogen, cyano, nitro or other such groups are prepared by a Sandmeyer reaction of the corresponding diazonium salt with suitable salt reagents ($Cu_2Cl_2$, $Cu_2Br_2$, KI, etc.). The diazonium salt is obtained by diazotization of the amino compound, prepared from compounds of structure II in which X is amino or produced by the reduction of the corresponding nitro compound by conventional means, e.g., chemical means, such as, active metals (Sn) and mineral acids (HCl) or by catalytic hydrogenation, e.g., nickel catalyst and superatmospheric pressure.

The amino group may also be introduced into the benzenoid ring by coupling of aryldiazonium salts, e.g., benzene diazonium chloride or the diazonium salt of p-aminobenzenesulfonic acid, with compounds of structure II or III containing a free hydroxy substituent in the 5-position of the 4-tetralone ring (3-position of the benzene ring) followed by reduction of the resulting phenylazo compound, e.g., catalytic reduction over noble metal catalysts. An amino group may also be introduced in place of the keto carbonyl oxygen of compounds of structure VII and XIV by reduction of the corresponding oxime or hydrazone, by reductive ammonolysis of the keto carbonyl group over noble metal catalysts or by reduction of the keto group to a secondary hydroxy group by sodium borohydride followed by conversion to the tosylate and replacement of the tosylate group by an amino group.

A further modification of the present invention provides a means of introducing a variety of substituents in positions corresponding to the 6-position of the tetracycline nucleus. This involves formation of the secondary alcohol corresponding to structure IIA compounds represented by the formula:

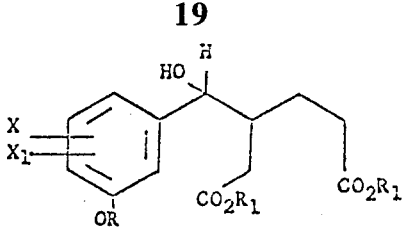

by partial reduction of the corresponding ketone over palladium catalyst at superatmospheric pressure until only one molar equivalent of hydrogen is taken up. Compounds of structure IIb are also intermediates for the preparation of 6-demethyltetracyclines.

The benzoyl keto group of compounds of structure IIa may be subjected to the Wittig reaction as described in Angewandte Chemie 71, 260-273 (1959) to produce the alkylidene derivatives IIc

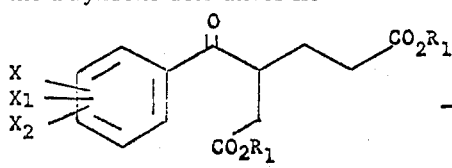 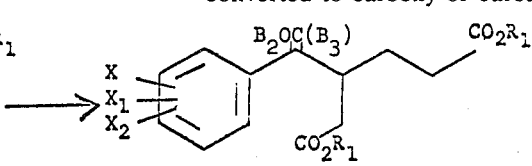

by treatment with the ylid prepared from a chloroether of the formula $(B_3)CHClOB_2$ (where $B_2$ is lower alkyl and $B_3$ is hydrogen or lower alkyl.) The necessary chloroethers are obtained by standard treatment of aldehyde acetals of the formula $(B_3)CH(OB_2)_2$ with an acid chloride (J. Org. Chem. 231, 1936).

Treatment of compounds IIa in this fashion with the ylid from chloromethyl ether, for example, converts the keto group to a methoxy-methylene group, which may be reduced to methoxymethyl. The latter group may be carried through the subsequent steps herein described to the 6-methoxymethyltetracycline. At this point the elements of methanol may be split out by standard procedures to obtain the 6-methylene-6-deoxy-6-demethyltetracycline.

The products of the above reaction may, in turn, be hydrogenated with noble metal catalysts:

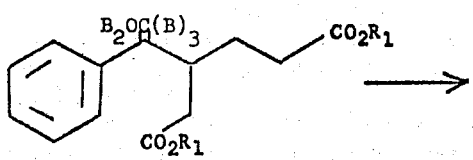 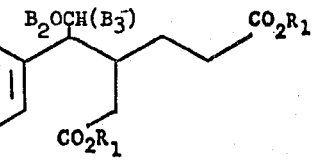

Subjecting the reduction products to the further synthetic sequences illustrated herein yields tetracyclines having a $6\text{-}CH(B_3)OB_2$ substituent. Treatment of such tetracyclines with liquid hydrogen fluoride results in the elimination of a mole of alcohol $B_2OH$ and provides tetracyclines having a $=CH(B_3)$ at the 6-position. The latter treatment is, for example, conveniently effected after the introduction of the 12a-hydroxyl group. Alternatively, treatment of such tetracyclines having a 6-$CH(B_3)OB_2$ group converts this group to $CH(B_3)OH$ with concurrent hydrolysis of any ether groups in the aromatic D-ring.

The products of the Wittig reaction IIC may also be hydrolyzed to aldehydes and the resulting aldehyde group in turn converted by catalytic hydrogenation to a hydroxymethyl group. The latter may be carried through the subsequent reactions of synthetic sequence with its free hydroxyl group, or preferably, in the form of a lower alkyl ether.

The described procedures are adaptable to the preparation of a variety of tetracycline molecules, as follows:

For introduction of aromatic nitro groups, the given compound, e.g. tetralone III, is nitrated by standard procedures, such as treatment with nitric acid-acetic anhydride-acetic acid mixtures, or nitric-sulfuric acid mixtures. Those in which X is halogen, cyano, halo sulfonyl nitro or other such groups may be prepared by Sandmeyer reaction of the corresponding diazonium salt with suitable salt reagents ($Cu_2Cl_2$, $Cu_2Br_2$, etc.). The diazonium salt is obtained by diazotization of the amino compound, which may in turn be prepared by reduction of the corresponding nitro compound by conventional means, e.g. chemical reduction with active metals (Sn) and mineral acids (HCl) or catalytic hydrogenation, e.g. with nickel catalyst at superatmospheric pressure. Aromatic cyano groups may be further converted to carboxy or carbalkoxy groups where desired by standard hydrolysis and esterification.

The amino group may also be introduced into the benzenoid ring, e.g. in compounds of structure II having a phenolic hydroxyl group, by coupling with aryldiazonium salts such as benzene diazonium chloride or the diazonium salt of p-aminobenzenesulfonic acid, followed by reduction of the resulting phenylazo compound, e.g. by catalytic hydrogenolysis with noble metal ctalysts.

As has been previously pointed out, normal discretion must be employed in subjecting certain of the substituted intermediates to the herein described reaction steps. In the base condensation reactions, the presence of a substituent having an active hydrogen (e.g. a hydroxyl, or amino group) will necessitate the use of an additional mole of the sodium hydride or other base. The presence of more than one such substituent per molecule is preferably avoided in these reactions, e.g. by the use of protective ether groups as previously described. The same considerations apply to Grignard reactions and hydride reductions. Hydroxyl groups can be subsequently regenerated from their ethers by conventional hydrolytic procedures such as treatment with hydrogen bromide. Similarly, protective benzyl ether groups can subsequently be hydrogenolyzed to obtain hydroxyl groups where desired.

In the reduction of benzoyl adipate IIa or benzophenone VII to the corresponding benzyl derivatives II and VIII, chemical reduction with amalgamated zinc and HCl by the well-known Clemmensen procedure may be employed in place of catalytic hydrogenolysis. Any ester groups which may be present in the molecule are concurrently hydrolyzed in the Clemmensen procedure, and reesterification will therefore be necessary.

Alternative routes or procedures can be used in place of the Clemmensen reduction. Thus, in the reduction of benzoyl adipate IIa to corresponding benzyl derivative II, the three-step procedure previously referred to is an appropriate alternative to direct reduction, i.e. (1)

conversion of the keto group to hydroxyl, e.g. with sodium borohydride or by mild reduction at room temperature with palladium on carbon in alcohol or other neutral solvent; (2) conversion of the resulting alcohol to the unsaturated compound by dehydration in anhydrous hydrogen fluoride; and (3) rapid hydrogenation of the resulting double bond, e.g. with palladium at room temperature and moderate hydrogen pressure, until one mole of hydrogen has been consumed. Another alternative reduction procedure which is suitable is the Wolf-Kishner reaction (*Annalen*, 394, 90, 1912 and *J. Russ. Phys. Chem. Soc.* 43, 582, 1911) wherein the benzoyl derivative is converted to a hydrazone, and the latter is in turn reduced to the corresponding benzyl derivative by heating with a base such as sodium ethoxide.

The present invention provides a means of synthesizing tetracycline compounds including 8-substituted and other valuable new tetracyclines, not previously described, which are therapeutically useful by virtue of their antimicrobial activity.

Those skilled in the art will appreciate that the following examples provide a basis for preparing the listed tetracyclines and the corresponding 12a-deoxy derivatives thereof.

Of particular significance in accordance with this invention are those final tetracycline products (XVI and XVII) wherein a hydroxy group or a group readily convertible to a hydroxy group (alkoxy or alkanoyloxy) is present at the 8-position. An additional substituent of importance in accordance with this invention is the trifluoromethyl group when present at the 7- and or 8-positions of the final tetracyclines.

TABLE I

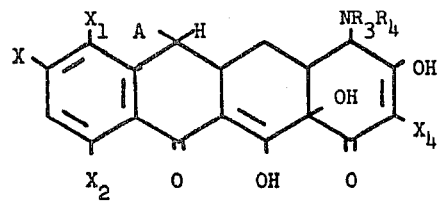

| X | $X_1$ | $X_2$ | A | $NR_3R_4$ | $X_4$ |
|---|---|---|---|---|---|
| 8-$NH_2$ | H | 10-OH | H | $NMe_2$ | $CONH_2$ |
| 8-Me | H | 10-OH | H | $NMe_2$ | $CONH_2$ |
| 8-$NMe_2$ | H | 10-OH | H | $NMe_2$ | $CONH_2$ |
| H | 7-Me | 10-OH | $Me_2CH$ | $NMe_2$ | $CONH_2$ |
| H | 7-Me | 10-OH | Me | $NMe_2$ | $CONH_2$ |
| H | 7-Me | 10-OH | Me | $NEt_2$ | $CONH_2$ |
| H | H | 10-OH | H | pyrrolidyl | $CONH_2$ |
| H | H | 10-OH | H | piperidyl | $CONH_2$ |
| H | H | 10-OH | H | morpholinyl | $CONH_2$ |
| 8-OH | H | 10-OH | H | $NMe_2$ | $CONH_2$ |
| H | 7-Me | 10-OH | H | $NMe_2$ | $CONH_2$ |
| H | H | 10-OH | $Me_2CH$ | $NMe_2$ | $CONH_2$ |
| H | H | 10-OH | Me | $NMe_2$ | $CONH_2$ |
| H | H | 10-OH | H | $NH_2$ | $CONH_2$ |
| 8-OMe | H | 10-OMe | H | $NMe_2$ | $CONH_2$ |
| H | H | 10-OMe | H | $NH_2$ | $CONH_2$ |
| H | H | 10-OMe | H | NHEt | $CONH_2$ |
| 8-$OC_4H_9$ | H | 10-OH | H | $NMe_2$ | $CONH_2$ |
| 8-OH | 7-Me | 10-OH | H | $NMe_2$ | $CONH_2$ |
| H | H | 10-OH | H | $NH_2$ | $CONH_2$ |
| H | 7-$NH_2$ | 10-OH | H | $NMe_2$ | $CONH_2$ |
| H | 7-$OCH_3$ | 10-OH | H | $NMe_2$ | $CONH_2$ |

Table I—Continued

| X | $X_1$ | $X_2$ | A | $NR_3R_4$ | $X_4$ |
|---|---|---|---|---|---|
| H | H | 10-OH | Me | $-NHCH_2CH_2OH$ | $CONH_2$ |
| H | H | 10-OH | H | $-NHCH_2CH_2OH$ | $CONH_2$ |
| H | H | 10-OH | H | $-NHCH_2CH_2OCH_3$ | $CONH_2$ |
| H | H | 10-OH | Bu | $NMe_2$ | $CONH_2$ |
| H | H | 10-OH | H | NHMe | $CONH_2$ |
| H | H | 10-OH | H | $NHCH_2CH_2OCOCH_3$ ] | $CONH_2$ |
| H | H | 10-OH | H | $-NHCH_2CH_2NMe_2$ | $CONH_2$ |
| H | H | 10-OH | H | $-NHCH_2CH_2NHCH_3$ | $CONH_2$ |
| H | H | 10-OH | H | $-NHCH_2CH_2N(C_4H_9)_2$ | $CONH_2$ |
| H | H | 10-OH | H | $-N(CH_3)CH_2CH_2OH$ | $CONH_2$ |
| H | H | 10-OH | $CH_2OH$ | $NMe_2$ | $CONH_2$ |
| H | H | 10-OH | H | $-\overline{N(CH_2)_2NMeCH_2CH_2}$ | $CONH_2$ |
| H | H | 10-OH | H | $-\overline{NCH(CO_2Me)(CH_2)_2CH_2}$ | $CONH_2$ |
| H | H | 10-OH | H | $NMe_2$ | $-CONEt_2$ |
| H | H | 10-OH | H | $NMe_2$ | $-CONHMe$ |

Some of the new tetracyclines of the present invention are homologs, isomers or closely related analogs of known tetracyclines. Many of the new tetracyclines are distinguished from prior art compounds by their possession of important and desirable properties, such as extended in vitro and in vivo antibacterial spectra, activity against organisms which have inherent or acquired resistance to known antibiotics, rapid absorption, sustained blood levels, freedom from serum binding, preferential tissue distribution at various parts of the body (e.g. kidney, lung, bladder, skin, etc.) which are sites for infection, sustained stability in a variety of dosage forms, resistance to metabolic destruction, broad solubility, and freedom from objectionable acute and cumulative side-effects. The new tetracyclines are useful in therapy, in agriculture, and in veterinary practice both therapeutically and as growth stimulants. In addition, they may be employed as disinfectants and bacteriostatic agents, in industrial fermentations to prevent contamination by sensitive organisms, and in tissue culture, e.g. for vaccine production.

The various new tetracyclines of the present invention which do not share the antibacterial activity of the known tetracyclines are valuable intermediates in the preparation of other compounds of classes known to contain biologically active members. Thus, the D-ring can be nitrated directly and the nitro derivatives reduced catalytically to an aminotetracycline. Further, the tetracycline products of this invention can be halogenated by known methods at the 11a-, or in the case of a 7-unsubstituted tetracycline, in the 7,11a-positions by treatment with such halogenating agents as perchloryl fluoride, N-chlorsuccinimide, N-bromsuccinimide and iodobromide.

The present invention embraces all salts, including acid-addition and metal salts, of the new antibiotics. Such salts are formed by well known procedures with both pharmaceutically acceptable and pharmaceutically unacceptable acids and metals. By "pharmaceutically acceptable" is meant those salt-forming acids and metals which do not substantially increase the toxicity of the antibiotic.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically unacceptable acid addition salts, while not useful for therapy, are valuable for isolation and purification of the new substances. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochlorides, by solution in hydrochloric acid and crystallization of the hydrochloride salt formed. The perchloric acid salts are useful for purification and crystallization of the new products.

Whereas all metal salts may be prepared and are useful for various purposes, the pharmaceutically-acceptable metal salts are particularly valuable because of their utility in therapy. The pharmaceutically-acceptable metals include more commonly sodium, potassium and alkaline earth metals of atomic number up to and including 20, i.e., magnesium and calcium, and additionally, aluminum, zinc, iron and maganese, among others. Of course, the metal salts include complex salts, i.e., metal chelates, which are well recognized in the tetracycline art. The pharmaceutically-unacceptable metal salts embrace most commonly salts of lithium and of alkaline earth metals of atomic number greater than 20, i.e., barium and strontium, which are useful for isolating and purifying the compounds.

It will be obvious that, in addition to their value in therapy, the pharmaceutically-acceptable acid and metal salts are also useful in isolation and purification.

The new tricyclic intermediates of the present invention, in addition to their value in synthesis, exhibit valuable antimicrobial activity. They may be employed as bacteriostatic agents, and are further useful in separation and classification of organisms for medical and diagnostic purposes. These new intermediates, by virtue of their $\beta$-diketone structure, are also valuable chelating, complexing or sequestering agents, and form particularly stable and soluble complexes with polyvalent cations. They are, therefore, useful wherever removal of such polyvalent ions is desired, e.g., in biological experimentation and in analytical procedures. Of course, as is well known to those skilled in the art, such $\beta$-diketones may exist in one or more of several tautomeric forms as a result of their ability to enolize. It is fully intended that the $\beta$-diketone structures herein employed embrace such tautomers.

The starting compounds of the present invention are readily preparable by known procedures. Many of these compounds, including both benzoic acid esters and benzophenone starting compounds, have been described in the literature.

The following examples are given by way of illustration.

EXAMPLE I

Monoethyl Ester of 3-(3-methoxybenzyl)Adipic Acid

METHOD A

Five grams of diethyl 3-(3-methoxybenzoyl)adipate and 2 g. of 5% palladium on carbon in 30 ml. of acetic acid are treated in a conventional Parr shaker at a pressure of 40 psi of hydrogen gas at 50° C. until 2 moles of hydrogen are taken up. The first mole of gas is taken up rapidly and the second more slowly over a total reaction time of up to about 30 hours. The mixture is filtered, concentrated under reduced pressure to an oil which is vacuum-distilled to obtain the product.

METHOD B

The $\gamma$-lactone of the enol form of the monoethyl ester of the starting compound is hydrogenated over palladium on carbon by this same method to obtain this product, b.pt. 190°-1° C. (0.3 mm.). Elemental analysis gives the following results:

Calcd. for: $C_{16}H_{22}O_5$: C, 65.29; H, 7.53;
Found: C, 65.25; H, 7.68.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25} = 1.4973$. Elemental analysis gives the following results:

Calcd. for: $C_{18}H_{26}O_5$: C, 67.06; H, 8.13;
Found: C, 67.02; H, 8.31.

The starting compound together with the corresponding $\gamma$-lactone are prepared by hydrolysis and decarboxylation of diethyl 3-carbo-t.butoxy-3-(3-methoxybenzoyl)adipate (Example L) by refluxing in dry xylene containing p-toluenesulfonic acid. The products are separated by fractional distillation or may be used together as starting compound for this hydrogenation reaction.

EXAMPLE II 3-(3-Methoxybenzyl)Adipic Acid

METHOD A

Amalgamated zinc is prepared by shaking for 5 minutes a mixture of 120 g. of mossy zinc, 12 g. of mercuric chloride, 200 ml. of water and 5 ml. of concentrated HCl. in a round-bottomed flask. The solution is decanted and the following reagents added: 75 ml. of water and 175 ml. of conc. HCl, 100 ml. of toluene and 52 g. of 3-(3-methoxybenzoyl)adipic acid. The reaction mixture is vigorously boiled under reflux for 24 hours. Three 50 ml. portions of concentrated HCl are added at intervals of 6 hours during reflux.

After cooling to room temperature, the layers are separated, the aqueous layer diluted with 200 ml. of water and extracted with ether. The ether extract is combined with the toluene layer, dried and concentrated under reduced pressure to obtain the product.

METHOD B

A solution of 6254.4 grams (22.1 mole) 3-(3-methoxybenzoyl)-adipic acid in 38.5 liters of glacial acetic acid is hydrogenated in a 15 gal. stirred autoclave in the presence of 2.5 Kg 5 percent palladium-on-carbon catalyst at 1,000 psig and 50°C. until the theoretical amount of hydrogen has been absorbed. The catalyst is filtered off and the solvent removed from the filtrate by distillation at reduced pressure. This gives 5,432 grams of product in the form of an oil. It is further purified by conversion to the dimethyl ester, fractional distillation, and hydrolysis, as follows:

A solution of 5,432 grams (20.4 mole) of the crude 3-(3-methoxybenzyl)adipic adipic acid, 3,410 grams (106.6 mole) methanol, 10.6 liters ethylenedichloride and 106 ml. concentrated sulfuric acid is stirred and refluxed for 15 hours. The mixture is cooled and washed with water (3 × 5 l.), 5 percent aqueous sodium hydroxide (1 × 2 l.) and again with water (3 × 5 l.). The ethylenedichloride solution is dried over 3 lb. anhydrous magnesium sulfate (with 2 lb. Darco G60 activated carbon). The drying agent and carbon are filtered off and the filtrate concentrated at reduced pressure to remove solvent. The residue is distilled through a 3 × 16 inch vacuum-jacketed fractionating column packed with porcelain saddles. After a forerun of 934.1 grams, the product is collected at 172.0°C/0.2 mm to 183°C/0.35 mm. This amounts to 3076.6 g. of 95 percent pure ester.

The ester, 2943.4 grams (10.00 mole) is hydrolyzed by heating over a steam bath for 19 hours with 1 Kg. (25.0 mole) sodium hydroxide in 6 liters of water. The hydrolysis mixture is acidified to pH ca. 1.0 by addition of concentrated hydrochloric acid and the product is extracted into methylene chloride (1 × 4 l. and 2 × 2 l.). The methylene chloride extract is washed with water (1 × 4 l. + 1 × 8 l.), dried over magnesium sulfate, filtered and freed of solvent by distillation at reduced pressure. This gives 2,506 grams of 3-(3-methoxybenzyl)adipic acid in the form of a very sticky oil.

METHOD C

A solution of dimethyl 3-(3-methoxybenzyl)adipate (0.01 mole) in 280 ml. of 1:1 tetrahydrofuran: 1,2-dimethoxyethane at a temperature of about −10°C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes. Hydrochloric acid (3 ml. of 6N) is then added, the mixture stirred for an additional 0.5 hour, then poured into water. The product, 3-[α-hydroxy-(3-methoxybenzyl)-]adipic acid dimethyl ester, is recovered by evaporation.

The hydroxy ester is placed in 150 ml. of anhydrous hydrogen fluoride and allowed to stand overnight. The hydrogen fluoride is then evaporated and the thus produced dimethyl 3-(3-methoxy benzylidene)adipate dissolved in dioxane (300 ml.), treated with 0.3 g. of palladium on charcoal (5%) and subjected to 50 psi at room temperature until an equimolar proportion of hydrogen is consumed. The mixture is filtered and the filtrate evaporated to dryness under reduced pressure to give the desired compound as the methyl ester. It is hydrolyzed to the acid by the procedure of Method B.

EXAMPLE III

Dimethyl 3-(2-chloro-5-methoxybenzyl)adipate

METHOD A

A mixture of 3.2 g. of dimethyl 3-(3-methoxybenzyl)adipate and 1.4 g. of N-chlorosuccinimide in 30 ml. of trifluoracetic acid is stirred and heated on a steam bath for 30 minutes. The reaction mixture is then poured into 5% aqueous sodium bicarbonate with stirring, and the mixture extracted with ether. The combined extracts are dried over anhydrous sodium sulfate and then concentrated under reduced pressure to an oil which is vacuum-distilled to obtain the product, b.p. 200°C. (1.1 mm Hg).

METHOD B

A mixture of 3.2 g. of dimethyl 3-(3-methoxybenzyl)adipate and 2.1 g. of phosphorus pentachloride in 100 ml. of dry benzene is refluxed for 30 minutes. The reaction mixture is carefully poured into ice and water, the benzene layer separated, washed with water and dried. Concentration of the dried benzene solution under reduced pressure yields an oil which is vacuum-distilled to obtain the product.

Similarly, the diethyl, dibenzyl and dipropyl chloroesters are prepared.

METHOD C

A solution of 1688 g. of 3-(3-methoxybenzyl)adipic acid and 50 mg. of iodine in 9 liters of glacial acetic acid is stirred while a solution of 450 g. of chlorine in 8 liters of glacial acetic acid is added during about 2 hours. The mixture is kept in the dark during the procedure and the temperature maintained at 10°–15°C. The solvent is then removed by concentration under reduced pressure to give 1,902 g. of a dark amber oil.

This procedure is repeated with ferric chloride in lieu of iodine with comparable results.

METHOD D

A mixture of 30.4 g. of diethyl 3-(3-methoxybenzyl)adipate and 12.75 g. of sulfuryl chloride in 250 ml. of benzene is allowed to stand for 3 days at room temperature. At the end of this period, the reaction mixture is concentrated under reduced pressure to a gummy residue which is vacuum-distilled to obtain the product.

METHOD E

The procedure of Method B is repeated using as starting compound the corresponding dicarboxylic acid to obtain 3-(2-chloro-5-methoxybenzyl)adipic acid dichloride.

EXAMPLE IV

Diethyl 3-(2-chloro-5-ethoxybenzyl)adipate

This product is obtained by the procedure of Method A of Example III employing diethyl 3-(3-ethoxybenzyl)adipate in lieu of dimethyl 3-(3-methoxybenzyl)adipate.

EXAMPLE V 2-(2-Carbethoxyethyl)-5-methoxy-8-chloro-4-tetralone

METHOD A

A mixture of 2 g. of diethyl-3-(2-chloro-5-methoxybenzyl)adipate (Example III) and 30 g. of polyphosphoric acid is heated on a steam bath for 30 minutes and then poured into ice water. The oil then separates and is collected.

METHOD B

A mixture of 2.0 g. of the di-acid chloride of 3-(2-chloro-5-methoxybenzyl)-adipic acid in 30 ml. of carbon disulfide is cooled to 0°C. and 4 g. of aluminum chloride added portionwise to the cooled mixture. The mixture is stirred for 30 minutes and then allowed to warm to room temperature where a vigorous reaction ensures. After the vigorous reaction subsides the mixture is warmed on a steam bath, cooled, diluted with water and the carbon disulfide steam distilled. The mixture is extracted with chloroform and the product obtained by drying and concentrating the chloroform extract. The product is the free acid which, if desired, is converted to the desired lower alkyl ester by conventional methods. For example, the methyl ester is prepared as follows:

A mixture of 2,002 g. (7.1 moles) of the tetralone acid, 3 L. chloroform, 682 g. (21.3 mole) methanol and 21.2 ml. conc. sulfuric acid is refluxed with stirring on a steam bath for 20 hours. The reaction mixture is then chilled and 2 L. each of chloroform and water are added. The organic phase is separated and washed successively with $2 \times 2$ L. water, $1 \times 1$ L. 2% aqueous sodium hydroxide and $3 \times 4$ L. water to a final pH of about 7.5. After drying over anhydrous sodium sulfate and treatment with Darco KB activated carbon the solution is filtered and concentrated to a dark oil at reduced pressure. The oil is taken up in 6 L. hot ethyl acetate and 11 L. hexane added. The solution is chilled to −5°C. with stirring and 1,404 g. 2-(2-carbomethoxyethyl)-5-methoxy-8-chloro-4-tetralone recovered by filtration, hexane-washing and air-drying. The product melts at 101.0°–102.4°C.

EXAMPLE VI 2-(2-Carboxyethyl)-5-methoxy-8-chloro-4-tetralone

A polyethylene container is charged with 1,809 g. (6.03 mole) 3-(2-chloro-5-methoxybenzyl)adipic acid and chilled in an ice bath while 7 kg. liquid hydrogen fluoride is introduced from an inverted, chilled tank. The mixture is swirled to make homogeneous and then left to evaporate partially overnight in a hood. Most of the hydrogen fluoride that remains is removed by placing the polyethylene container in warm water to cause rapid evaporation. The remainder is removed by quenching in about 10 L. water. The product is then extracted into chloroform, washed with water and dried over magnesium sulfate. Removal of the drying agent by filtration and the solvent by distillation gives a gum that is triturated with ether and filtered. This gives 1,031 g. of crude product that is recrystallized from a mixture of 16 L. ethanol, 2 L. acetone and 1 L. ethylene dichloride, with activated carbon treatment. The first two crops amount to 863.9 grams. of white crystalline product melting at 175.0° − 180.5°C.

Elemental analysis gives the following results:

Calcd. for: $C_{14}H_{15}O_4Cl$: C, 59.47; H, 5.35; Cl, 12.54;
Found: C, 59.51; H, 5.42; Cl, 12.60.

Ultraviolet absorption shows λ max at 223 mμ (ε = 24,650), 255 mμ (ε = 7,900) and 326 mμ (ε = 4,510). Infrared absorption maxima appear at 5.76 and 5.99 μ.

This product is also obtained by hydrolysis of the product of Method A, Example V, by treatment with Hcl in acetic acid.

The methyl ester, ethyl ester (m. 57°–59°C.) and benzyl ester (m 84°–85°C.) are prepared by conventional methods.

3-(3-Methoxybenzyl)adipic acid, treated with HF as described, yields 2-(2-carboxyethyl)-7-methoxy-4-tetralone, which melts at 158°–9°C. after two recrystallizations from benzene-hexane and exhibits ultraviolet absorption maxima at 225 mμ (ε = 13,500) and 276 mμ (ε = 16,000) in methanolic HCl and NaOH. Analysis, Calcd. for: $C_{14}H_{16}O_4$: C, 67.73; H, 6.50%; Found: C, 67.67; H. 6.48%

EXAMPLE VII 2-(2-Carboxyethyl)-6-chloro-7-methoxy-4-tetralone

This substance is a byproduct of the cyclization of the products of Example III. It is separated from the crude 2-(2-carboxyethyl)-5-methoxy-8-chloro-4-tetralone of Example VI by virtue of its chloroform insolubility. 2,900 g. of the crude tetralone are leached six times with 8 liter portions of hot chloroform. 170 g. of white solid remain, melting at 236°–239°C. The methyl ester is prepared by the procedure of Example V, Method B.

EXAMPLE VIII 2-(2-Carbomethoxyethyl)-5-benzyloxy-8-chloro-4-tetralone 2-(2-Carboxyethyl)-5-methoxy-8-chloro-4-tetralone (25 g.), glacial acetic acid (200 ml.) and 48% hydrobromic acid (50 ml.) are heated at 90° under nitrogen for 24 hours. The cooled solution deposits a crystalline solid. The mixture is poured over two parts ice and the total solid crop isolated by filtration and thoroughly washed with water. The crude 2-(2carboxyethyl)-5-hydroxy-8-chloro-4-tetralone obtained in this way is recrystallized from acetonitrile to obtain 18.8 g. melting at 164°–8°C.

Elemental analysis,

Calcd. for: $C_{13}H_{13}ClO_4$: C, 58.11; H, 4.88; Cl, 13.20%;

Found: C, 57.99; H, 4.87; Cl, 12.73%.

14.5 g. of this product is placed in 200 ml. dry methanol and the mixture refluxed for 30 minutes as anhydrous HCl is passed through. The now clear yellow solution is allowed to stand overnight, and the methanol is then removed in vacuo. The residual gum is extracted exhaustively with hexane and the combined extracts are concentrated and cooled. HCl of the white, crystalline methyl ester separates and is filtered off and recrystallized from hexane. The ester melts at 68°–69.5°C. and analyzes as follows.

Calcd. for $C_{14}H_{15}ClO_4$: C, 59.45; H, 5.35; Cl, 12.6%; Found: C, 59.16; H, 5.38; Cl, 12.6%.

5.6 g. (0.02 mole) of this substance is dissolved in 500 ml. anhydrous methanol and to this is added 0.02 mole sodium methoxide and 500 ml. benzene. The mixture is concentrated to dryness in vacuo at room temperature, then heated at 100°C. and 0.1 mm for 10 minutes. The residue is maintained under high vacuum at room temperature for 16 hours, and the dry solid added to 50 ml. benzyl bromide together with sufficient demethyl formamide to solubilize. The mixture is heated at 100°C. for 48 hours with stirring, then cooled and filtered. The filtrate is concentraed at reduced pressure and the residual oil chromatographed on acetone-washed and dried silicic in chloroform. The first effluent fraction consists of unchanged starting material. The main fraction, recognized by a negative ferric chloride test, deposits crystalline 2-(2-carbomethoxy ethyl)-5-benzyloxy-8-chloro-4-tetralone on standing.

EXAMPLE IX

2-Carbomethoxy-5-methoxy-8-chloro-3,4,10-trioxo-1,2,3,4,4a,9,9a,10-octahydroanthracene 30 Grams of 2-(2-carbomethoxyethyl)-5-methoxy-8-chloro-4-tetralone (0.1 mole), prepared as described in Example V, Method B, is dissolved together with 24 grams dimethloxalate (0.2 mole) by warming with 135 ml. freshly distilled dimethyl formamide in a well dried two liter flask which has been flushed with dry nitrogen. The solution is cooled to 20°C. and to it is added all at one time 0.4 mole sodium hydride in the form of a 50% oil dispersion which has been exposed to the atmosphere for 24 hours in order to produce a deactivating coating. The reaction mixture is maintained at 20°–25°C. with an ice bath. 0.1 mole dry methanol is now added, and the temperature rises spontaneously to 40°–50°C. When the temperature begins to fall (about 5 minutes after addition of the methanol) the reaction vessel is removed from the ice bath and quickly placed in an oil bath at 110°C. The reaction temperature is brought with dispatch to 90°C. and maintained there for 10 minutes, or until active bubbling ceases if this occurs sooner.

The flask is now immediately transferred back to the ice bath, and when the temperature reaches 15°C., 100 ml. of glacial acetic acid is added at such a rate that the temperature does not exceed 30°C. At this point, a golden yellow precipitate appears. 150 ml. methanol and 50 ml. water are added and the mixture is digested at 45°C. for 15 minutes and then stirred in an ice bath for an hour. If only a scanty crop of crystals is present at this time the mixture may be stored in the refrigerator overnight before proceeding. It is now transferred to a separatory funnel to permit separation of the oil from the sodium hydride oil dispersion. The suspension is then filtered with suction, and the filter cake triturated three times with 100 ml. portions of hot hexane to extract impurities. The washed solid is next stirred with 200 ml. water, filtered, and then digested with 500 ml. refluxing methanol for 20 minutes, to effect further purification. 15–16 grams of bright yellow needles are obtained. The product melts at 200°–205°C. and exhibits no carbonyl absorption below 6 μ. In 0.01 N methanolic HCl it exhibits ultraviolet absorption maxima at 406 mμ (ε = 14,200) and at 275–290 mμ (ε = 5,940). In 0.01 N methanolic NaOH it exhibits maxima at 423 mμ (ε =13,950) and at 340 mμ (ε = 7.120).

EXAMPLE X

2-Carbomethoxy-6-chloro-7-methoxy-3,4,10-trioxo-1,2,3,4,4a,9,9a,10-octahydroanthracene 2-(2-carbomethoxyethyl)-6-chloro-7-methoxy-4-tetralone, prepared in Example VII, 30 g., is dissolved in 24 g. dimethyl oxalate in 300 ml. dry distilled dimethyl formamide by warming. The solution is then cooled under nitrogen in an ice-salt bath and 19.86 g. sodium hydride (51.2% in oil) added all at once as the temperature is maintained below 20°C. The ice bath is removed and the temperature rises spontaneously to 30°C., whereupon the bath is replaced briefly to control the vigorous reaction. The reaction mixture is then heated to 70°–80°C. for 5–8 minutes, cooled to below 0°C., and treated with 100 ml. acetic acid, added at such rate that the temperature does not reach 25°C. The reaction mixture is now poured into four volumes of chloroform. The chloroform solution is washed with water, then with saturated brine, and dried over anhydrous sodium sulfate. The solvent is removed in vacuo, and the residue is treated with 350 ml. methanol. After standing for several hours at room temperature the slurry is filtered to obtain 12.5 g. yellow crystalline product, melting at 228°–231°C. with decomposition and gas evolution. Recrystallization from chloroform-methanol raises the melting point to 235.6°–236.8°C. analysis, Calcd. for: $C_{17}H_{15}O_6Cl$: C, 58.21; H, 4.31; Cl, 10.11%;

Found: C, 58.53; H, 4.43; Cl, 10.10%.

EXAMPLE XI

2-Carbobenzyloxy-5-methoxy-8-chloro-3,4,10-trioxo-1,2,3,4,4a,9,9a,10-octahydroanthracene 2-(2-Carboxyethyl)-5-methoxy-8-chloro-4-tetralone, 28.3 g. (0.10 mole), is combined with 32.4 g. (0.30 mole) benzyl alcohol, 60 ml. ethylene dichloride and 0.6 ml. conc. sulfuric acid. The mixture is heated at reflux for 4 hours, then cooled and water-washed. It is then dried over magnesium sulfate and filtered. The filtrate is concentrated under reduced pressure and the resulting 48 g. residue is crystallized from ethyl acetate-hexane. 25.7 g. of the benzyl ester of the starting compound is obtained, melting at 81°–85°C. After recrystallization from ethyl acetate-hexane it melts at 84.0°–85.5°. Analysis, calculated for $C_{21}H_{21}O_4Cl$: C, 67.65; H, 5.68; Cl, 9.51; found: C, 67.63; H, 5.81; Cl, 9.4.

The substance is dissolved together with 0.04 mole dibenzyl oxalate in 50 ml. dry, distilled dimethyl formamide. To this is added 0.08 mole sodium hydride in the form of a 50% oil dispersion, while maintaining the temperature at about 20°–25°C. Benzyl alcohol, 0.02 mole, is added, and the mixture is heated to 80°C. for 5 minutes, then cooled to 20°C. and slowly acidified with glacial acetic acid. The reaction mixture is next evaporated to dryness under reduced pressure and the residue is taken up in chloroform. The chloroform solution is washed with water, then with brine, dried over sodium sulfate, treated with activated carbon and filtered. The filtrate is evaporated at reduced pressure to obtain the desired product as residue. It is purified by evaporation of the highly fluorescent, less polar eluate fraction from silicic acid chromatography in chloroform.

EXAMPLE XII

2-Carbomethoxy-5-Methoxy-8-chloro-3,4,10-trioxo-1,2,3,4,4a,9,9a,10-octahydroanthracene Clean sodium metal (3.68 g.) is dissolved in methanol (50 ml.) and the solution evaporated to a dry white solid in vacuo (this is most successfully carried out by using rotary vacuum equipment). Dimethyloxalate (9.44 g.) and benzene (100 ml.) are then added to the flask and refluxing is carried out for about 10 minutes under nitrogen (not all of the solids dissolve but the cake is broken up). The solution is cooled and dimethylformamide (50 ml.) then added followed by the dropwise addition of a solution of 2-(2-carboxyethyl)-5-methoxy-8-chloro-4-tetralone (Example VI) (11.3 g.) in dimethylformamide (100 ml.) during one hour at 20° under $N_2$ with stirring, and stirring at room temperature under $N_2$ is continued overnight. The solution is then poured into cold water (1 l.) and extracted twice with chloroform. The chloroform extract is discarded and the aqueous solution acidified with 10% HCl solution. The product is obtained by extraction with chloroform (3 × 200 ml.), backwashing once with water, drying over anhydrous $Na_2SO_4$, treatment with charcoal, filtration and evaporation of the solvent in vacuo to give a red gum (16.4 g.) which is 2-(2-carboxyethyl)-3-methyloxalyl-5-methoxy-9-chloro-4-tetralone.

U.V. absorption maxima in 0.01 N NaOH at 258 and 363 m$\mu$. maximum in 0.01 N CHl at 347 m$\mu$, minimum at 277 m$\mu$.

The gum gives a deep red color with ferric chloride in methanol and liberates $CO_2$ from a saturated $NaHCO_3$ solution.

The acid is esterified by dissolving in chloroform (1 l.), methanol (50 ml.) and conc. $H_2SO_4$ (10 ml.) and rfluxing gently for 15 hours. The solution is cooled, poured into excess water and the chloroform layer separated. The aqueous layer is extracted with chloroform (250 ml.) and the combined chloroform extracts are backwashed twice with cold water. The extract is then dried over anhydrous sodium sulphate, treated with activated charcoal, filtered and evaporated to a red gum in vacuo. This gum does not liberate $CO_2$ from saturated bicarbonate solution, and gives a deep red color with ferric chloride in methanl.

The ester product, 3.825 grams, and 1.275 g. of sodium hydride (56.5% solution in oil) are dissolved in 25 ml. of dimethylformamide. An exothermic reaction sets in with the evolution of hydrogen gas. After the evolution of gas ceases the mixture is warmed at 40°C. for ½ hour where further evolution of hydrogen gas occurs and the reaction mixture darkens. The reaction mixture is finally digested on a steam bath for 10 minutes after which it is cooled and acidified with glacial acetic acid (15 ml.). The product is then obtained by dilution of the mixture with water followed by extraction with chloroform. The dried chloroform solution is concentrated under reduced pressure to obtain a gummy residue which crystallizes on trituration in methanol. The orange-yellow crystalline product, 2-carbomethoxy-5-methoxy-8-chloro-3,4,10-trioxo-1,2,3,4,4a,9,9a,10-octahydroanthracene, (1.2 g.) melts at 196°–201.5°C.

EXAMPLE XIII

2Carbomethoxy-5-hydroxy-8-chloro-3,4,10-trioxo-1,2,3,4,4a,9,9a,10-octahydroanthracene Dimethyl oxalate, 0.84 g., and 2-(2-carbomethoxyethyl)-5-hydroxy-8-chloro-4-tetralone, 2.0 g., are added to a suspension of 0.34 g. sodium hydride in 10 ml. dimethyl formamide and the mixture is heated to 70°C. for 3 minutes. After cooling, the reaction mixture is treated with 10 ml. acetic acid and evaporated to dryness at reduced pressure. The residual gum is triturated with water to remove sodium acetate and chromatographed to silicic acid in chloroform. The main effluent fraction is dried to a bright yellow solid which is crystallized from chloroform-hexane to provide 380 mg. product melting at 218°–219.5°C. Elemental analysis, calculated for $C_{16}H_{13}O_6Cl$: C, 56.7; H, 3.9; Cl, 10.5; found: C, 56.86; H, 3.89; Cl, 10.8%.

EXAMPLE XIV

Diethyl 3-(α-hydroxy-3-methoxybenzyl)adipate

This product is obtained by treating 5 g. diethyl 3(3-methoxybenzoyl) adipate and 2 g. 5% palladium on carbon in ethanol with 40 psi hydrogen gas at room temperature until one molar equivalent of hydrogen is consumed. The reaction mixture is filtered and concentrated at reduced pressure to obtain the product.

It is further converted to diethyl 3-(α-N,N-dimethylamino-3-methoxybenzyl)adipate in the following manner:

The α-hydroxy benzyl adipate ester, 0.01 mole in 15 ml. dimethoxyethane, is added to a stirred mixture of 1.9 g. (0.01 mole) p-toluenesulfonyl chloride and 2.5 ml. dry pyridine in an ice bath. When the reaction subsides the mixture is permitted to warm to room temperature, stirred for 3 hours, and poured into 50 ml. water. The pH is adjusted to 5 and the resulting tosyl ester recovered by filtration.

The tosylate (0.0025 mole) is combined with 25 ml. dimethoxyethane and added dropwise to a stirred solution of 0.015 mole dimethylamine in 50 ml. dimethoxyethane at 0° C. After addition is complete, stirring is continued for an hour at 0° and the reaction mixture is then heated at 60° for three hours under a Dry Ice condenser. The mixture is next evaporated in vacuo and the residue washed with water to remove dimethylammonium toluenesulfonate. The product is recovered by filtration from the water. Substitution of monomethylamine for dimethylamine in this procedure provides the corresponding α-N-methylamino derivative.

EXAMPLE XV 2-(2-Carbomethoxyethyl)-5-methoxy-4-tetralone 2-(2-Carbomethoxyethyl)-5-methoxy-8-chloro-4-tetralone (1.5 g.) is combined with 5% palladium-on-charcoal (0.37 g.), triethylamine (0.5 g.) and methanol 270 ml. in a standard Parr hydrogenation bottle and subjected to fifty pounds of hydrogen pressure. The absorption of hydrogen levels off at approximately one molar equivalent. The catalyst is filtered off, the solution taken to dryness, and triethylamine hydrochloride is removed by washing with water. The residual white solids weigh 1.1 g. and melt at 63°–66° C. After two recrystallizations from hexane and one from ether the product melts at 85°–87° C.

Analysis

Calcd. for $C_{15}H_{18}O_4$: C, 68.68; H, 6.92%;
Found: C, 68.59; H, 6.98%.

EXAMPLE XVI 2-(2-Carboxyethyl)-7-hydroxy-4-tetralone 3-(3-methoxybenzyl) adipic acid, 22.46 g., is heated at reflux with hydriodic acid (specific gravity 1.5) for 3 hours and the methyl iodide formed is separated. The solution is evaporated in vacuo and the resulting gum triturated with cold water to yield 14.7 g. of yellow crystalline product. Dired and recrystallized from aqueous acetone the product is obtained in the form of white crystals melting at 183.5°–185.5° C.

Analysis

Calcd. for $C_{13}H_{14}O_4$: C, 66.65; H, 6.02%;
Found: C, 66.60; H, 6.02%.

The same product is obtained by refluxing a mixture of 0.5 g. of the 3-(3-methoxybenzyl)adipic acid with 25 ml. 48% HBr for 18 hours, then pouring the reaction mixture into 3 volumes of water, and filtering the resulting 0.4 g. of crystalline precipitate.

EXAMPLE XVII 2-(2-Carbomethoxyethyl)-5-methoxy-8-nitro-4-tetralone

One gram of the Example XV product is slowly added to 10 ml. of concentrated sulfuric acid containing 2 ml. of 70% nitric acid at a temperature of 0°–5° C. The solution is stirred for 15 minutes and allowed to warm to room temperature. The mixture is poured into ice-water mixture and extracted with chloroform, the chloroform layer separated, dried and concentrated to obtain the product.

EXAMPLE XVIII 2-(2-Carboxyethyl)5-hydroxy-8-amino-4-tetralone

One molecular proportion of aniline is dissolved in 2N HCl, employing about 20 ml. thereof per gram of aniline, and the solution treated with one molecular proportion of $NaNO_2$ at 0° to 10°C. The benzenediazonium chloride solution is then mixed with stirring at 0° to 20°C. with an aqueous solution of 2-(2-carboxyethyl)-5-hydroxy-4-tetralone sodium salt and sufficient sodium carbonate to neutralize the excess HCl in the diazotised aniline solution. The pH of the solution is in the range 8–10. Stirring is continued at 0°C. for approximately two hours after which careful neutralization of the reaction mixture yields the 8-phenylazo compound. The product is collected on a filter, washed and dried.

One part by weight of 2-(2-carboxyethyl)-5-hydroxy-8-phenylazo-4-tetralone is mixed with 20 parts by weight of methanol and 1/5 part by weight of 5% palladium-on-carbon catalyst is added to the mixture which is then hydrogenated at 30–45 psi of hydrogen gas in a conventional shaker apparatus at 30°C. until two molar equivalents of hydrogen are taken up.

After filtration, the product is recovered by high vacuum distillation of the residue obtained by removal of the solvent in vacuo. Care must be exercised to protect the amino phenol from air. It can be stabilized by acetylation, as follows:

The crude amine is placed in 20 parts water containing one molar equivalent of HCl, and 2.2 molar equivalents of acetic anhydride are added. Sufficient sodium acetate is then added to neutralize the HCl and the solution is warmed to 50°C. After 5 minutes the mixture is cooled and the crude acetate separated by filtration. The solid is then dissolved in cold 5% sodium carbonate solution and reprecipiated with 5% HCl. The 2-(2-carboxyethyl)-5-hydroxy-8-N-acetylamino-4-tetralone obtained in this manner is a preferred form of the amino compound for further reaction sequences.

EXAMPLE XIX 3-(2-Amino-5-hydroxybenzyl)adipic acid

The procedure of Example XVIII is repeated using 3-(3-hydroxybenzyl) adipic acid as starting compound to obtain this product. It may be converted to the product of Example XVIII by the ring closure procedure of Example VI.

EXAMPLE XX 3-(2-Chloro-5-hydroxybenzyl)adipic acid

Three parts by weight of the product of Example XIX (obtained by evaporating the methanol) is protected from air, immediately mixed with 10 parts by weight of 10% aqueous hydrochloric acid at 0° C., and diazotized by gradual addition of 20% aqueous sodium nitrile solution. Addition of sodium nitrite is continued until a positive starch iodide test on a few drops of the reaction mixture is obtained in the convention fashion. The resulting solution is then added to 15 parts of a boiling 10% solution of cuprous chloride in aqueous hydrochloric acid. The mixture is boiled for 10 minutes and allowed to cool. The product separates from the cooled mixture and is collected in the conventional manner.

This procedure is used for the preparation of 3-(2-substituted-5-hydroxy-benzyl) adipic acid compounds such as 2-bromo (using $Cu_2Br_2$ and HBr), 2-iodo (using KI and $H_2SO_4$) and 2-fluoro compounds (decomposing the dry diazonium fluoborate salt by careful heating).

EXAMPLE XXI

3-[α-Hydroxy-α-(2-chloro-5-methoxy-phenyl)ethyl-]adipic acid diethyl ester

To a solution of 3-(2-chloro-5-methoxybenzoyl-)adipic acid diethyl ester in dimethoxyethane is added dimethoxyethane solution containing a molar equivalent of methyl magnesium bromide. After standing for 30 minutes, the reaction mixture is acidified cautiously with ice and aqueous 6N HCl, and extracted with methylene chloride. The extracts are combined, washed with water, dilute aqueous sodium bicarbonate and water, dried and concentrated under reduced pressure to obtain the product.

EXAMPLE XXII

3-[α-(2-Chloro-5-methoxyphenyl)ethyl]adipic acid diethyl ester

The product of Example XXI, 2 g., is dissolved in 150 ml. of glacial acetic acid and hydrogenated at a pressure of 40 psi of hydrogen gas for 24 hour at room temperature in the presence of 2g. of 5% palladium-in-carbon catalyst. The mixture is filtered and then concentrated. The product is obtained by vacuum distillation of the residue.

EXAMPLE XXIII 3,3',4-Trimethoxybenzophenone

A mixture of 40 g. of 3-methoxybenzoyl chloride, 32 g. of verstrole and 250 ml. of carbon disulfide in a 3 neck round bottom flask fitted with reflux and stirrer is cooled to 0°C. Then 40 g. of aluminum chloride is added portionwise to the cooled mixture and the mixture stirred for 45 minutes, after which it is allowed to warm to room temperature. A vigorous reaction ensues with the separation of a yellow precipitate. The mixture is carefully warmed on a steam bath and stirred for 1 ½ hours. Water is then added to the cooled mixture and the carbon disulfide is steam distilled off. The resultant mixture is then extracted with chloroform and the chloroform layer separated, washed with dilute hydrochloric acid, followed by dilute sodium hydroxide and then dried and concentrated under reduced pressure. The residual oil is distilled to obtain the product, b.p. 216°–218°C. at 1.5 mm. mercury. A 65% yield of product is obtained. The viscous product is stirred in absolute methanol and crystallizes, m. 85°–86°C.

EXAMPLE XXIV 3,3',4-Trimethoxydiphenylmethane

METHOD A

A solution of 5 g. of 3,3',4-trimethoxybenzophenone in 200 ml. of ethanol containing 1 g. of copper chromium oxide is hydrogenated at 180°C. and 100 atmospheres of hydrogen gas for 1.5 hours. The resultant solution is filtered and concentrated under reduced pressure. The residual oil is distilled to obtain the product b.p. 192°–194°C. at 2.5 mm. mercury. The product crystallizes on standing, the melting point of the crystals being 45°–46°C. Elemental analysis gives the following results:

Calcd. for $C_{16}H_{18}O_3$: C, 74.39; H, 7.02;
Found: C, 74.50; H, 7.18.

METHOD B

This product is also obtained by hydrogenation of the starting compound of Method A using 10% palladium on carbon in ethanol at 50°C. and 40 psi of hydrogen gas. The hydrogenation procedure is also carried out at room temperature, although the uptake of hydrogen is considerably slower than at 50°C. The product is obtained by filtration and concentration of the hydrogenation mixture.

EXAMPLE XXV 3,3'4-Trihydroxydiphenylmethane

Two grams of 3,3'4-trimethoxydiphenylmethane are dissolved in 10 ml. of acetic acid and 10 ml. of 48% hydrobromic acid and the mixture refluxed for 5 hours. The reaction mixture is concentrated under reduced pressure to obtain a residual gum which is vacuum-distilled (b.p. 230°C. at 0.5 mm. of mercury). The distillate, a colorless gum, crystallizes. A 62% yield of product is obtained, m. 103.5°–104°C.

EXAMPLE XXVI

A mixture of 3.5 g. of 3,3'4-trihydroxydiphenylmethane in 50 ml. of acetone and 50 ml. of 10% aqueous sodium hydroxide is cooled to 0°C. Thirty ml. of 35% aqueous hydrogen peroxide solution is then added dropwise, the mixture turning pale pink after 5 to 10 minutes. An exothermic reaction occurs with considerable boiling and foaming. The mixture is allowed to stand for 1 hour and is then extracted with ethyl acetate, the extract being discarded. The aqueous solution is then acidified and extracted with ethyl acetate. Concentration of the ethanol acetate extract after drying gives the product as a gummy residue.

EXAMPLE XXVII 3-(3-Hydroxybenzyl)adipic acid

The product of the preceding example (105 mg.) is dissolved in 13 ml. of ethanol containing 1 drop of concentrated hydrochloric acid and hydrogenated over platinum oxide at 1 atmosphere of hydrogen gas at room temperature. The hydrogen uptake is exactly molecular equivalent. Filtration and concentration of reaction mixture gives the product.

EXAMPLE XXVIII 3-(3-Methoxybenzyl)adipic acid dimethyl ester

The acid product of the preceding example is dissolved in aqueous sodium hydroxide (4 molar equivalents) and agitated with 3 molar equivalents of dimethyl sulfate at 40°C. for 6 hours. The resultant solution is then diluted with water and extracted with chloroform. The chloroform layer is separated, dried and concentrated under reduced pressure to yield an oil, b.p. 205° to 210° C. at 0.2 mm. mercury. This product is also obtained by treatment of the starting compound with diazomethane in diethyl ether.

In a similar manner the corresponding ethyl and propyl esters are prepared.

EXAMPLE XXIX 3-(3-Methoxybenzyl)hexa-2,4-dienedioic acid

Five grams of 3,3′4-trimethoxydiphenylmethane are dissolved in 50 ml. of acetic acid containing about 10 drops of water and ozonized air containing about 4% $O_3$ is then passed into the mixture for 1.5 hours (total of about 6 moles of ozone). The resultant yellow solution is poured into 1 liter of water and extracted with chloroform. The chloroform layer is separated, washed with aqueous sodium bicarbonate solution and concentrated under reduced pressure. The residue is dissolved in ethanol containing 2 g. of KOH and the mixture allowed to stand at room temperature for 2 days after which it is diluted with water and extracted with chloroform. After separation of the chloroform layer the aqueous alkaline solution is acidified with dilute hydrochloric acid and extracted with chloroform. Concentration of the chloroform extract gives the acid product.

The methyl, ethyl and propyl diesters of this acid are prepared by refluxing the acid for 3 days in ethylene dichloride containing the appropriate alcohol and sulfuric acid.

EXAMPLE XXX 3-(3-Methoxybenzyl)adipic acid dimethyl ester

The ester of the preceding example is hydrogenated in ethanol over 10% palladium on carbon at 1 atmosphere of hydrogen gas at room temperature. The theoretical uptake of hydrogen gas (2 molar equivalents) is very rapid. The product is obtained by filtration and concentration of the hydrogenation mixture.

In similar fashion the corresponding free acid is obtained by hydrogenation of the free acid of the preceding example.

EXAMPLE XXXI

The following monoester compounds are prepared by reduction of corresponding benzoyl diesters according to the methods of Example I. The free adipic acid derivatives are prepared by the methods of Example II from the corresponding benzoyl adipic acids. The products are subsequently converted to the corresponding diesters by conventional procedures, e.g. Example II, Method B.

3-benzyladipic acid monoethyl ester
3-(3,4,5-trimethoxybenzyl)adipic acid monoethyl ester
3-(2,4,5-trimethoxybenzyl)adipic acid monoethyl ester
3-(2-ethyl-5-hydroxybenzyl)adipic acid monoethyl ester
3-(2-chloro-5-methoxybenzyl)adipic acid monomethyl ester
3-(2-dimethylamino-5-methoxybenzyl)adipic acid monomethyl ester
3-(2-amino-5-methoxybenzyl)adipic acid
3-(2-acetamido-5-methoxybenzyl)adipic acid
3-(3-hydroxybenzyl)adipic acid monoethyl ester
3-(3-methyl-5-hydroxybenzyl)adipic acid monoethyl ester
3-(2,3-dimethyl-5-hydroxybenzyl)adipic acid monoethyl ester
3-(2-methyl-5-hydroxybenzyl)adipic acid monoethyl ester
3-(3-dimethylamino-5-hydroxybenzyl)adipic acid monoethyl ester
3-(3,5-dimethoxybenzyl)adipic acid monoethyl ester
3-(3-isopropyl-5-hydroxybenzyl)adipic acid monoethyl ester
3-(2,3-diethyl-5-hydroxybenzyl)adipic acid monoethyl ester
3-(5-benzyloxybenzyl)adipic acid monoethyl ester
3-(2-chloro-5-benzyloxybenzyl)adipic acid monoethyl ester
3-(3-propionyloxybenzyl)adipic acid monoethyl ester
3-(3-acetyloxybenzyl)adipic acid monoethyl ester Those compounds having a benzyloxy substituent are reduced by the procedures of Methods A or C of Example II. Of course, the procedure of Example II, Method A, results in hydrolysis of the ester groups and necessitates re-esterification.

EXAMPLE XXXII

Alpha-hydroxybenzyladipic acid compounds corresponding to the products of Example XXXI are prepared by hydrogenation of corresponding benzoyladipic acid compounds according to the method of Example XIV.

The α-hydroxybenzyl adipate diesters are further converted to the corresponding α-dimethylamino and α-monomethylamino derivatives via the tosylates by the procedure described in Example XIV. For this procedures mercapto and hydroxy substituents other than the α-hydroxy group are avoided by employing the corresponding methyl ethers; likewise, amino substituents are employed in acetylated form.

The α-amino benzyl adipates obtained in this manner are further converted to the corresponding 1-amino-4-tetralone of structure III by the procedure of Example VI.

EXAMPLE XXXIII

The procedure of Example XXI is repeated to produce the following compounds from corresponding benzoyladipic acid compounds using lower alkylmagnesium halides.

diethyl 3-(α-hydroxy-α-phenethyl)adipate
diethyl 3-[α-hydroxy-α-(3,4,5-trimethoxyphenyl)ethyl]adipate
diethyl 3-[α-hydroxy-α-(2,4,5-trimethoxyphenyl)butyl]adipate
diethyl 3-[α-hydroxy-α-(2-ethyl-5-hydroxyphenyl)ethyl]adipate
dimethyl 3-[α-hydroxy-α-(2-chloro-5-methoxyphenyl)ethyl]adipate
dimethyl 3-[α-hydroxy-α-(2-dimethylamino-5-methoxyphenyl)ethyl]adipate
dimethyl 3-[α-hydroxy-α-(2-amino-5-methoxyphenyl)ethyl]adipate
dimethyl 3-[α-hydroxy-α-(2-acetamido-5-methoxyphenyl)ethyl]adipate
diethyl 3-[α-hydroxy-α-(3-hydroxyphenyl)ethyl]adipate
diethyl 3-[α-hydroxy-α-(3-methyl-5-hydroxyphenyl)ethyl]adipate
diethyl 3-[α-hydroxy-α-(3,5-dimethoxyphenyl)ethyl]adipate In the case of the precursors to the compounds listed above which possess an active hydrogen, 2.5 moles of Grignard reagent are employed.

The compounds containing an amino-substitutent are isolated from the reaction mixture by the substitution of saturated aqueous ammonium chloride for 6N HCl.

EXAMPLE XXXIV

The α-hydroxy group of Example XXXIII compounds is hydrogenolyzed according to the method of Example XXII to afford the following compounds:

diethyl 3-(α-phenethyl)adipate
diethyl 3-[α-(3,4,5-trimethoxyphenyl)ethyl]adipate
diethyl 3-[α(2,4,5-trimethoxyphenyl)butyl]adipate
diethyl 3-[α-(2-ethyl-5-hydroxyphenyl)ethyl]adipate
dimethyl 3-[α-(2-chloro-5-methoxyphenyl)ethyl]adipate
dimethyl 3-[α-(2-dimethylamino-5-methoxyphenyl)ethyl]adipate
dimethyl 3-[2-amino-5-methoxyphenyl)ethyl]adipate
dimethyl 3-[α-(2-acetamido-5-ethoxyphenyl)propyl]adipate
diethyl 3-[α-(3-hydroxyphenyl)ethyl]adipate
diethyl 3-[α-(3-methyl-5-hydroxyphenyl)ethyl]adipate
diethyl 3-[α-(3,5-dimethoxyphenyl)ethyl]adipate

EXAMPLE XXXV

The following compounds are prepared according to the methods of Example VI by ring closure of corresponding compounds.

2-(2-carbethoxyethyl)-4-tetralone
2-(2-carboxyethyl)-5,6,7-trimethoxy-4-tetralone
2-(2-carboxyethyl)-5,6,8-trimethoxy-4-tetralone
2-(2-cyanoethyl)-5-methoxy-8-ethyl-4-tetralone
2-(2-carboxyethyl)-5-methoxy-8-dimethylamino-4-tetralone
2-(2-carbobenzyloxyethyl)-5-methoxy-8-amino-4-tetralone
2-(2-carbopropoxyethyl)-5-methoxy-8-acetamido-4-tetralone
2-(2-carbobenzyloxyethyl)-5-hydroxy-8-chloro-4-tetralone
2-(2-carbethoxyethyl)-5-hydroxy-7-methyl-8-chloro-4-tetralone
2-(2-carboxyethyl)-5-hydroxy-7-isopropyl-8-chloro-4-tetralone
2-(2-carboxyethyl)-5-hydroxy-7,8-diethyl-4-tetralone
2-(2-cyanoethyl)-5-hydroxy-8-methoxy-4-tetralone
2-(2-carbobenzyloxyethyl)-5-benzyloxy-8-chloro-4-tetralone
2-(2-carbethoxyethyl)-5-propionyloxy-8-chloro-4-tetralone
2-(2-carbethoxyethyl)-5-acetoxy-8-chloro-4-tetralone
2-(2-carboxypropyl)-5-hydroxy-8-chloro-4-tetralone
2-(2-carboxybutyl)-5-hydroxy-8-chloro-4-tetralone
2-(2-carbobenzyloxyethyl)-5-methoxy-7-amino-8-chloro-4-tetralone
2-(2-carbobenzyloxyethyl)-5-methoxy-7-ethyl-8-chloro-4-tetralone
2-(2-carbobenzyloxyethyl)-5-methoxy-7-methyl-8-chloro-4-tetralone
2-(2-carboxyethyl)-5-hydroxy-7-dimethylamino-8-chloro-4-tetralone
2-(2-carboxyethyl)-5-benzyloxy-8-propionyloxy-4-tetralone
2-(2-carboxyethyl)-5-propoxy-8-butyryloxypropyl-4-tetralone
2-(2-carboxyethyl)-5,8-dihydroxy-4-tetralone
2-(2-carboxyethyl)-5-hydroxy-8-chloro-4-tetralone
1-methyl-2-(2-carboxyethyl)-5-methoxy-8-chloro-4-tetralone
1-ethyl-2-(2-carboxyethyl)-5-methoxy-8-chloro-4-tetralone
1-propyl-2-(2-carboxyethyl)-5-methoxy-8-chloro-4-tetralone
1-methyl-2-(2-carboxypropyl)-5-methoxy-8-chloro-4-tetralone
2-(2-carboxyethyl)-5-hydroxy-8-methyl-4-tetralone
2-(2-carboxyethyl)-5-hydroxy-7,8-dimethyl-4-tetralone
1-methyl-2-(2-carboxyethyl)-5-hydroxy-8-chloro-4-tetralone
1-propyl-2-(2-carboxyethyl)-5-hydroxy-8-chloro-4-tetralone
1-methyl-2-(2-carboxyethyl)-5-hydroxy-7-fluoro-8-chloro-4-tetralone
2-(2-cyanoethyl)-5-methoxy-8-methyl-4-tetralone
2-(2-carboxyethyl)-5-methoxy-7-methyl-8-chloro-4-tetralone
2-(2-carboethoxyethyl)-5,7-dimethoxy-4-tetralone The aromatic chloro compounds can be subsequently hydrogenolyzed to the corresponding deschloro compounds by the procedure of Example XV.

Those compounds of the above list which contain no amino or hydroxy, groups are also prepared by the methods of Example V.

EXAMPLE XXXVI

Example XXXV products, as lower alkyl or benzyl esters or nitrile, are condensed with diethyl oxalate according to the method of Example IX to obtain 3,4,10-trioxoanthracene derivatives. Those compounds having an active hydrogen require the use of an additional mole of sodium hydride.

The reaction mixtures are worked up as follows: When active bubbling ceases, the reaction is chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acidwashed Florisil. The highly fluorescent product fraction is collected and evaporated to obtain the desired substance.

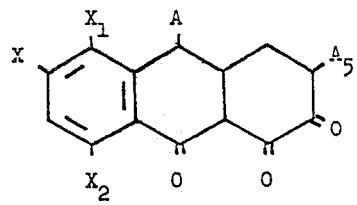

| $X_1$ | X | $X_2$ | A | $A_5$ |
|---|---|---|---|---|
| H | H | H | H | $CO_2Et$ |
| 8-Et | H | 5-OMe | H | CN |
| 8-$NMe_2$ | H | 5-OMe | H | $CO_2CH_2C_6H_5$ |
| 8-$NH_2$ | H | 5-OMe | H | $CO_2CH_2C_6H_5$ |
| 8-NHCOMe | H | 5-OMe | H | $CO_2Pr$ |
| H | H | 5-OH | H | $CO_2CH_2C_6H_5$ |
| H | 7-Me | 5-OH | H | $CO_2Et$ |
| H | 7-i-Pr | 5-OH | H | $CO_2CH_2C_6H_5$ |
| 8-Et | 7-Et | 5-OH | H | $CO_2Me$ |
| H | H | 5-$OCH_2C_6H_5$ | H | $CO_2CH_2C_6H_5$ |
| H | 7-$NH_2$ | 5-OMe | H | $CO_2CH_2C_6H_5$ |
| H | 7-Pr | 5-OME | H | $CO_2CH_2C_6H_5$ |
| H | 7-Me | 5-OMe | H | $CO_2CH_2C_6H_5$ |
| H | 7-$NMe_2$ | 5-OH | H | $CO_2Ch_2C_6H_5$ |
| 8-$NH_2$ | H | 5-$OCH_2C_6H_5$ | H | $CO_2Me$ |
| 8-Pr | H | 5-OPr | H | $CO_2Me$ |
| 8-OBu | H | 5-OH | H | $CO_2Me$ |
| H | H | 5-OH | H | $CO_2Me$ |
| H | H | 5-OMe | Me | $CO_2Me$ |
| H | H | 5-OMe | Et | $CO_2Me$ |
| H | H | 5-OMe | Pr | $CO_2Me$ |
| 8-Me | H | 5-OH | H | $CO_2CH_2C_6H_5$ |
| 8-Me | 7-Me | 5-OH | H | $CO_2CH_2C_6H_5$ |
| H | H | 5-OH | Me | $CO_2CH_2C_6H_5$ |
| H | H | 5-OH | i-Pr | $CO_2CH_2C_6H_5$ |
| H | H | 5-OMe | Me | $CO_2Ch_2C_6H_5$ |
| H | H | 5-OMe | H | $CO_2CH_2C_6H_5$ |
| H | H | 5-OMe | Et | $CO_2CH_2C_6H_5$ |
| 6-OMe | 7-OMe | 5-OMe | H | $CO_2CH_2C_6H_5$ |

In the above table, Me = $CH_3$; Et = $C_2H_5$; and Pr = $C_3H_7$.

EXAMPLE XXXVII

5-Methoxy-8-chloro-3,4,10-trioxo-1,2,3,4,4a,9,9a,10-octahydroanthracene

Method A

A mixture of 10 g. of ester product of Example XII, 250 ml. of glacial acetic acid, 125 ml. concentrated HCl and 25 ml. of water is heated at 95° C. for 1 hour. During the first 45 minutes considerable effervescence occurs and the suspended matter gradually dissolves to give a deep red-brown solution. The reaction mixture is then poured into 2 liters of cold water and extracted with chloroform. The combined extracts are washed with water, decolorized with activated carbon, dried and evaporated to an orange-crystalline solid (6.9 g.) which melts at 171°-172.8° C. After recrystallization from acetone-hexane, the product melts at 172°-173° C.

Method B

The 2-carbobenzyloxy compound (5 g.) corresponding to that of Example XII is treated with hydrogen gas at room temperature in acetic acid and in the presence of 0.5 g. of 5% palladium on carbon at 50 psig. until one molar equivalent of gas is taken up. The product is obtained by filtration and concentration of the reaction mixture after warming to 60°C. for 20 minutes to ensure complete evolution of carbon dioxide.

Method C

The product of Example XII (3 g.) is refluxed for 3 hours in 10 ml. of acetic acid, 10 ml. of concentrated sulfuric acid and 1 ml. of water after which chloroform is added to the mixture which is then poured into excess water. The product is obtained by separation of the chloroform layer, washing, drying over sodium sulfate and concentration. A solid residue is obtained and recrystallized from methanol.

If desired, further purification is achieved by chromatograph on silicic acid with chloroform elution. The product is contained in the less polar effluent fraction.

EXAMPLE XXXVIII

The products of Example XXXVI are decarboxylated, (benzyl esters by hydrogenolysis according to Method B, Example XXXVII and lower alkyl esters and nitriles by the procedure of Method C, Example XXXVII) to produce the following compounds (nitriles require a 24-hour reflux period):

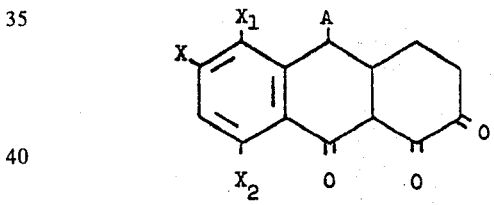

| $X_1$ | X | $X_2$ | A |
|---|---|---|---|
| H | H | H | H |
| 8-Et | H | 5-OMe | H |
| 8-$NMe_2$ | H | 5-OMe | H |
| 8-$NH_2$ | H | 5-OMe | H |
| 8-NHCOMe | H | 5-OMe | H |
| H | H | 5-OH | H |
| H | 7-Me | 5-OH | H |
| H | 7-i-Pr | 5-OH | H |
| 8-Et | 7-Et | 5-OH | H |
| H | H | 5-$OCH_2C_6H_5$ | H |
| H | 7-$NH_2$ | 5-OMe | H |
| H | 7-Pr | 5-OMe | H |
| H | 7-Me | 5-OMe | H |
| H | 7-$NMe_2$ | 5-OH | H |
| 8-$NH_2$ | H | 5-$OCH_2C_6H_5$ | H |
| 8-Pr | H | 5-OPr | H |
| 8-OBu | H | 5-OH | H |
| H | H | 5-OH | H |
| H | H | 5-OMe | Me |
| H | H | 5-OMe | Et |
| H | H | 5-OMe | Pr |
| 8-Me | H | 5-OH | H |
| 8-Me | 7-Me | 5-OH | H |
| H | H | 5-OH | Me |
| H | H | 5-OH | i-Pr |
| H | H | 5-OMe | Me |
| H | H | 5-OMe | H |
| H | H | 5-OMe | Et |
| 6-OMe | 7-OMe | 5-OMe | H |

In the above table, Me = $CH_3$; Et = $C_2H_5$; and Pr = $C_3H_7$.

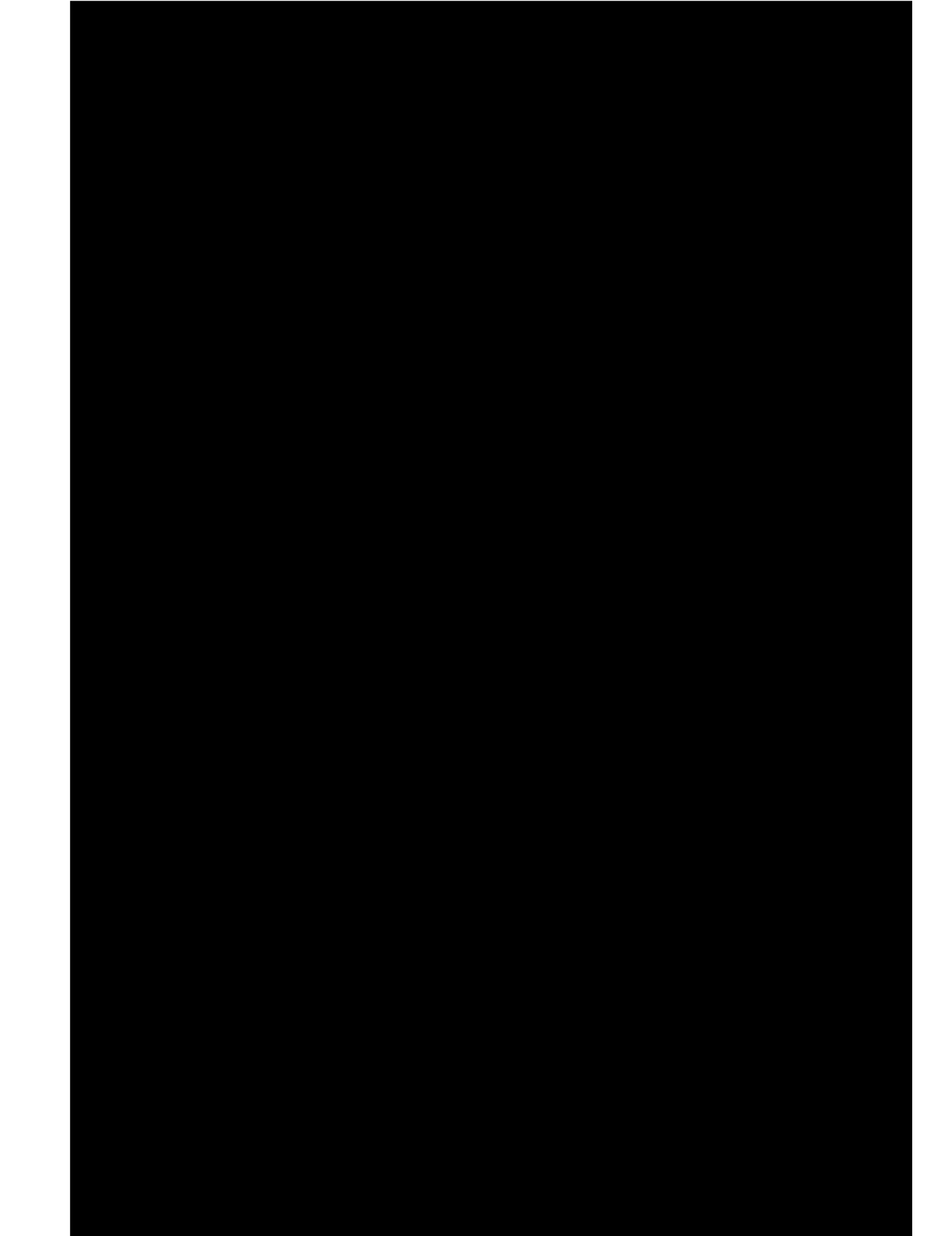

Calcd. for: $C_{14}H_{16}O_6$: C, 59.99; H, 5.75; Found: C, 59.91; H, 5.79.

In similar manner, the corresponding diethyl, dipropyl and di-t-butyl esters are prepared.

EXAMPLE XLIII

Ethyl 3-carbo-t-butoxy-3-(3-methoxybenzoyl)propionate

A mixture of 15.8 g. of the product of Example XLI 10.5 g. of ethyl bromoacetate and 3.02 g. of sodium hydride in 130 ml. of dimethylformamide is treated as in Method A of Example XLII to obtain this product as a yellow oil. Infrared analysis of the product shows characteristic peaks at 5.75 and 5.90μ. The product is used without distillation in the procedure of Example XLVI to produce ethyl 3-[carbo-t-butoxy-3-(2-cyanoethyl)-3-(3-methoxybenzoyl)]-propionate.

EXAMPLE XLIV

Diethyl 3-carbethoxy-3-(3-methoxybenzoyl)adipate

To a mixture of 102 g. of diethyl α-(3-methoxybenzoyl)succinate in 250 ml. of dioxane and 10 ml. of a 35% solution of benzyltrimethylammonium hydroxide in methanol maintained at 50°C. is added 167 g. of ethyl acrylate in one portion with stirring. Heating and stirring are continued for 30 minutes, after which 10 ml. of glacial acetic acid is added. The mixture is evaporated under reduced pressure to a dark oil which is distilled in vacuo to yield 80.5 g. of the diethyl ester product, b.p. 197°C.(0.1–0.2 mm.), $n_D^{25}$=1.5043. Infrared analysis shows characteristic peaks at 5.76 and 5.92 μ.

Elemental analysis gives the following results:

Calcd. for: $C_{21}H_{28}O_8$: C, 61.75; H, 6.91; Found: C, 61.64; H, 6.90.

Dimethyl and dipropyl β-carbomethoxy-3-(3-methoxybenzoyl)adipate are prepared in similar fashion.

EXAMPLE XLV

Diethyl 3-carbo-t-butoxy-3-(3-methoxybenzoyl)adipate

The product of Example XLIII a yellow oil, is dissolved in 80 ml. of t-butanol containing 0.75 g. of potassium t-butoxide and 19 g. of ethyl acrylate. The mixture is refluxed for 1.3 hours and then concentrated under reduced pressure to obtain the adipate ester product, a yellow viscous oil, which is used without distillation in the procedure of Method B of Example XLVII

EXAMPLE XLVI

α-(3-Methoxybenzoyl)-α-(2-cyanoethyl)succinic acid diethyl ester

This compound is prepared according to the procedure of Example XLIV using acrylonitrile or β-bromopropionitrile in lieu of ethyl acrylate. The product is vacuum distilled at 212°–218° C. (0.45 mm. Hg.). This product is hydrolyzed and decarboxylated to 3-(3-methoxybenzoyl)adipic acid by refluxing in aqueous acetic acid containing sulfuric acid by the procedure of Method A of Example XLVII Corresponding esters are prepared in the usual manner.

EXAMPLE XLVII

Diethyl 3-(3-methoxybenzoyl)adipate

METHOD A

A mixture of 25 g. of diethyl-3-carbethoxy-3-(3-methoxybenzoyl)adipate in 30 ml. of acetic acid, 10 ml. of concentrated sulfuric acid and 10 ml. of water is refluxed for 36 hours. The mixture is then poured into excess water and extracted with chloroform, the extract dried and evaporated under reduced pressure to an oil. The oil is dissolved in a mixture of 50 ml. of ethanol, 1 liter of ethylene dichloride and 6 ml. of concentrated sulfuric acid and refluxed for 12 hours. The mixture is then poured into water. The ethylene chloride layer is separated, dried and evaporated in vacuo to an oil which is distilled to obtain 5.5 g. of product, b.p. 169°–172° C. (0.05 mm.), $n_D^{25}$ = 1.5092.

Elemental analysis gives the following results:

Calcd. for: $C_{18}H_{24}O_6$: C, 64.27; H, 7.19; Found: C, 64.09; H, 7.19.

In similar fashion, the dimethyl and dipropyl esters are prepared.

METHOD B

The product of Example XLV a yellow viscous oil, is refluxed in 120 ml. of dry xylene containing 3.0 g. of p-toluenesulfonic acid and cooled and extracted with water. The xylene solution, after drying, is concentrated under reduced pressure and the residual oil vacuum distilled to obtain 6.8 g. of product.

There is also obtained 5.86 g. of the enol lactone:

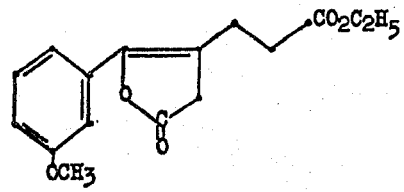

a red oil, which on infrared absorption analysis showed a maximum at 5.58 μ.

As is recognized by those in the art, the product of this example is a racemic compound, DL-3-(3-methoxybenzoyl)adipic acid diethyl ester which, as the free acid, lends itself to resolution into its optical active forms by salt formation with optically active bases such as brucine, cinchonine, cinchonidine, morphine and the like to form diestereoisomers. Such procedures are well known to those skilled in the art. Of course, the optically active forms (antipodes) after separation, may be converted one to the other, as desired, by racemization and resolution. The present compound, in one of its optically active forms, is racemized by treating it with a strong base in solvent, e.g. sodium hydride, hydroxide or alkoxide in a lower alkanol. After racemization, the desired optical form may be resolved and the procedure repeated to produce more of the desired optical form from its antipode.

EXAMPLE XLVIII

Employing the procedure of Example XL, the following compounds are prepared from corresponding starting compounds. Those compounds having an active hydrogen require the use of an additional mole of sodium hydride.

ethyl (3,4,5-trimethoxybenzoyl)acetate
methyl (2,4,5-trimethoxybenzoyl)acetate ethyl (2-ethyl-5-hydroxybenzoyl)acetate
methyl 2-(5-methoxybenzoyl)propionate
methyl 2-(5-methoxybenzoyl)butanoate
methyl 2-(5-methoxybenzoyl)pentanoate
methyl (2-chloro-5-methoxybenzoyl)acetate
methyl (2-dimethylamino-5-methoxybenzoyl)acetate
methyl (2-amino-5-methoxybenzoyl)acetate
methyl (2-acetamido-5-methoxybenzoyl)acetate
ethyl (5-hydroxybenzoyl)acetate
ethyl (2-methyl-5-hydroxybenzoyl)acetate
ethyl (2,3-dimethyl-5-hydroxybenzoyl)acetate
ethyl (3-isopropyl-5-hydroxybenzoyl)acetate
ethyl (2,3-diethyl-5-hydroxybenzoyl)acetate
ethyl (5-benzyloxybenzoyl)acetate
ethyl (3-methyl-5-hydroxybenzoyl)acetate
ethyl (3-dimethylamino-5-hydroxybenzoyl)acetate
ethyl (2,5-dipropoxybenzoyl)acetate

EXAMPLE XLIX

The following carbalkoxybenzoyl propionates are prepared from corresponding benzoyl acetates by reaction with a α-haloacetic acid esters according to the procedure of Method A of Example XLII, as well as by the procedure of Method B, Example XLII.

ethyl-3-carbomethoxy-3-benzoylpropionate
ethyl 3-carbethoxy-3-(3,4,5-trimethoxybenzoyl)propionate
methyl 3-carbomethoxy-3-(2,4,5-trimethoxybenzoyl)propionate
methyl 3-carbethoxy-3-(2-ethyl-5-methoxybenzoyl)propionate
methyl 3-carbomethoxy-3-(3-methoxybenzoyl)butanoate*
methyl 3-carbomethoxy-3-(3-methoxybenzoyl)pentanoate*
methyl 3-carbomethoxy-3-(3-methoxybenzoyl)hexanoate*
methyl 3-carbomethoxy-3-(2-chloro-5-methoxybenzoyl)propionate
methyl 3-carbomethoxy-3-(2-dimethylamino-5-methoxybenzoyl)propionate
benzyl 3-carbomethoxy-3-(2-acetamido-5-methoxybenzoyl)propionate
ethyl 3-carbethoxy-3-(3-methoxybenzoyl)propionate

*The higher benzoyl alkanoates, e.g. butanoate, pentanoate and hexanoate, are prepared from the next lower homolog by the procedure of Method A, Example XLII.

ethyl 3-carbethoxy-3-(2,3-diethyl-5-methoxybenzoyl)propionate
ethyl 3-carbethoxy-3-(3-isopropyl-5-methoxybenzoyl)propionate
ethyl 3-carbethoxy-3-(3-methyl-5-ethoxybenzoyl)propionate
ethyl 3-carbethoxy-3-(3-dimethylamino-5-propoxybenzoyl)propionate
methyl 3-carbomethoxy-3-(2-dimethylaminoethyl-5-methoxybenzoyl)propionate
ethyl 3-carbethoxy-3-(2,5-dipropoxybenzoyl)propionate
ethyl 3-carbethoxy-3-(2-methyl-5-methoxybenzoyl)propionate
ethyl 3-carbethoxy-3-(2,3-dimethyl-5-methoxybenzoyl)propionate
ethyl 3-carbethoxy-3-(3-benzyloxybenzoyl)propionate

EXAMPLE L

The following compounds are prepared from the products of Example XLIX by the procedure of Examples XLVI and XLIV using corresponding β-bromo or α,β-unsaturated esters or nitriles.

diethyl 3-carbomethoxy-3-benzoyladipate
diethyl 3-carbethoxy-3-(3,4,5-trimethoxybenzoyl)adipate
dimethyl 3-carbomethoxy-3-(2,4,5-trimethoxybenzoyl)adipate
dimethyl 3-carbethoxy-3-(2-ethyl-5-methoxybenzoyl)adipate
dimethyl 3-carbomethoxy-3-(2-chloro-5-methoxybenzoyl)adipate
dimethyl 3-carbomethoxy-3-(2-dimethylamino-5-methoxybenzoyl)adipate
dibenzyl 3-carbomethoxy-3-(2-acetamido-5-methoxybenzoyl)adipate
diethyl 3-carbethoxy-3-(3-methoxybenzoyl)adipate
diethyl 3-carbethoxy-3-(3,4,5-trimethoxybenzoyl)adipate
dimethyl 3-carbomethoxy-3-(2,4,5-trimethoxybenzoyl)adipate
dimethyl 3-carbethoxy-3-(2-ethyl-5-methoxybenzoyl)adipate
dimethyl 3-carbomethoxy-3-(2-chloro-5-methoxybenzoyl)adipate
dimethyl 3-carbomethoxy-3-(2-dimethylamino-5-methoxybenzoyl)adipate
dibenzyl 3-carbomethoxy-3-(2-acetamido-5-methoxybenzoyl)adipate
diethyl 3-carbethoxy-3-(3-methoxybenzoyl)adipate
diethyl 3-carbethoxy-3-(3-methyl-5-methoxybenzoyl)adipate
diethyl 3-carbethoxy-3-(3-dimethylamino-5-methoxybenzoyl)adipate
diethyl 3-carbethoxy-3-(2,5-dipropoxybenzoyl)adipate
diethyl 3-carbethoxy-3-(2-methyl-5-methoxybenzoyl)adipate
diethyl 3-carbethoxy-3-(2,3-dimethyl-5-methoxybenzoyl)adipate
diethyl 3-carbethoxy-3-(3-isopropyl-5-methoxybenzoyl)adipate
diethyl 3-carbethoxy-3-(2,3-diethyl-5-methoxybenzoyl)adipate
diethyl 3-carbethoxy-3-(3-benzyloxybenzoyl)adipate

EXAMPLE LI

The following compounds are prepared by hydrolysis and decarboxylation of corresponding 3-carbalkoxy compounds according to the procedure of Example XLVII.

methyl 3-(3-methoxybenzoyl)butanoate
methyl 3-(3-methoxybenzoyl)pentanoate
methyl 3-(3-methoxybenzoyl)hexanoate

EXAMPLE LII

Diethyl 3-(3-methoxybenzoyl)adipate 3-(3-Methoxybenzoyl)propionic acid ethyl ester (16.7 g.) is dissolved in 100 ml. of a 2.5 M solution of methyl magnesium carbonate in methanol and the resulting mixture refluxed for 2 hours. After cooling, 25 g. of ethyl β-brompropionate is added and the mixture allowed to stand for 12 hours, after which it is acidified with concentrated HCl. Chloroform is then added and the entire mixture poured into water. The chloroform layer is separated, dried and concentrated under reduced pressure to give the product which is vacuum-distilled.

Using this procedure, the products of Example LI are alkylated with corresponding 3-bromo esters or nitriles to provide the following compounds:

methyl 4-carbomethoxymethyl-4-(3-methoxybenzoyl)valeronitrile
dimethyl 3-methyl-3-(3-methoxybenzoyl)adipate
dimethyl 3-ethyl-3-(3-methoxybenzoyl)adipate
dimethyl 3-propyl-3-(3-methoxybenzoyl)adipate

EXAMPLE LIII

Dimethyl 2-(3-methoxybenzoyl)glutarate this compound is prepared according to the methods of Examples XLIV and XLVI using methyl (3-methoxybenzoyl)acetate as the starting compound.

In similar fashion, the following compounds are prepared from corresponding starting compounds using one equivalent of alkylating agent:

diethyl 2-benzoylglutarate
diethyl 2-(3,4,5-trimethoxybenzoyl)glutarate
dimethyl 2-(2,4,5-trimethoxybenzoyl)glutarate
dimethyl 2-(2-ethyl-5-methoxybenzoyl)glutarate
dimethyl 2-(2-chloro-5-methoxybenzoyl)glutarate
dimethyl 2-(2-dimethylamino-5-methoxybenzoyl)glutarate
dibenzyl 2-(2-acetamido-5-methoxybenzoyl)glutarate
diethyl 2-(3-methoxybenzoyl)glutarate
diethyl 2-(3-methyl-5-methoxybenzoyl)glutarate
diethyl 2-(3-dimethylamino-5-methoxybenzoyl)glutarate
diethyl 2-(2,5-dipropoxybenzoyl)glutarate
diethyl 2-(2-methyl-5-methoxybenzoyl)glutarate
diethyl 2-(2,3-dimethyl-5-methoxybenzoyl)glutarate

EXAMPLE LIV

The compounds of Example LIII are converted to the corresponding adipic acid derivatives described in Example L by reaction with bromacetic acid ester by the procedure of Method A of Example XLII.

EXAMPLE LV

Dimethyl 3-(α-methoxymethyl-2-chloro-5-methoxybenzyl)adipate

The ylid is prepared from chloromethyl ether in the following manner: triphenylphosphine (52.4 g., 0.2 mole) is dissolved in 100 ml. anhydrous benzene and 16.1 g. chloromethyl ether added. The mixture is heated at 50°C. for 16 hours. The resulting heavy crystalline mass in filtered off, washed with ether, dissolved in chloroform, and reprecipitated with ethyl acetate. The precipitate is then separated, washed with ether, and dried at 80°C. in high vacuum.

Triphenylmethoxymethylphosphonium chloride, 6.84 g., 0.02 mole, prepared as described above, is suspended in 65 ml. absolute ether. To this suspension is added 19.6 ml. 1.0 N phenyl lithium solution. With slight warming the mixture turns orange-red and then dark red. After five minutes there is added portionwise 0.02 mole dimethyl 3-(2-chloro-5-methoxybenzoyl)adipate in 50 ml. ether. An exothermic reaction occurs causing the ether to reflux. After stirring for 2 hours, the suspension is filtered and the separated solids washed with ether. The combined ether filtrate and washings are dried over anhydrous sodium sulfate, filtered, and evaporated, to obtain dimethyl 3-(α-methoxymethylene-2-chloro-5-methoxybenzyl)adipate as residue. It is further purified by distillation under high vacuum.

The methoxymethylene benzyl adipate, obtained as described, is dissolved in 50 parts by weight dioxane and hydrogenated over 0.1 part 5% palladium on charcoal at 50 psi and room temperature until one molar equivalent of hydrogen has been absorbed. The hydrogenation mixture is filtered, and the filtrate evaporated to obtain the desired dimethyl 3-(α-methoxymethyl-2-chloro-5-methoxybenzyl)adipate as residue. It is further purified by high vacuum distillation.

Following the described procedure, the following additional adipates are prepared from the corresponding benzoyl adipates. (For these syntheses the necessary chloromethyl ethers of the formula $(B_3)CHClOB_2$ are obtained by treatment of aldehyde acetals of the formula $B_2CH(OB_3)_2$ with acetyl chloride, as described in Liebig's *Annalen*, 493, p. 203, and 498, p. 120 (1932).

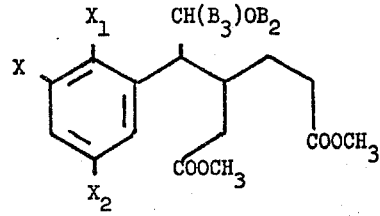

| X | $X_1$ | $X_2$ | $B_2$ | $B_3$ |
| --- | --- | --- | --- | --- |
| H | 2-Cl | 5-OH | $CH_3$ | $CH_3$ |
| H | 2-$OCH_3$ | 5-OH | $CH_3$ | $CH_3$ |
| 3-Cl | 2-$CH_3$ | 5-OH | i-$C_5H_{11}$ | H |
| 4-$OCH_3$ | 2-$NHCH_3$ | 5-$OCH_3$ | $C_2H_5$ | $C_2H_5$ |

The alkoxy alkyl ethers produced in this manner are converted to the corresponding tetralones and thence to the corresponding 9-alkoxy-alkyl-3,4,10-trioxo-1,2,3,4,4a,9,9a,10-octahydroanthracenes by the reaction sequences illustrated and exemplified above for the conversion of compounds of structure II to those of structure I.

The methoxymethylene benzyl adipate is also converted to an aldehyde, in the following manner: dimethyl 3-(α-methoxy-methylene-2-chloro-5-methoxybenzyl) adipate is warmed with a mixture of 1:10 by volume 1% aqueous hydrochloric acid:dioxane for 5 minutes at 60°C. The solvent is then removed by evaporation at reduced pressure, and the residue is converted to the bisulfite addition product by shaking with alcoholic sodium bisulfite as described in Vogel, "A Textbook of Practical Organic Chemistry" Longmans (1948) p. 330. The addition product is then hydrolyzed by treatment with 5% aqueous hydrochloric acid and the resulting dimethyl 3-(α-formyl-2-chloro-5-methoxybenzyl) adipate is extracted from the aqueous acid into chloroform and recovered by evaporation of the solvent.

The dimethyl 3-(α-formyl-2-chloro-5-methoxybenzyl) adipate prepared as described is hydrogenated in ethylene glycol dimethyl ether solvent at room temperature over platinum oxide catalyst until an equimolar proportion of hydrogen is consumed. The catalyst is then separated by filtration and the resulting α-hydroxymethyl benzyl adipate recovered by evaporation of the solvent under reduced pressure.

These α-alkoxyalkyl benzyl adipates are converted to 9-alkoxyalkyl-3,4,10-trioxo-octahydroanthracenes of Structure IV via the corresponding tetralones of Structure III by applying in order the procedures of Examples XXXV and XXXVI.

EXAMPLE LVI

Method A
2-Carbobutoxymethylidene-5-methoxy-8-chloro-3,4,10-trioxo-1,2,3,4,4a,9,9a,10-octahydroanthracene.

Under a nitrogen atmosphere, a solution of 1.51 g. (0.0051 mole) of 5-methoxy-8-chloro-3,4,10-trioxo-1,2,3,4,4a,9,9a,10-octahydroanthracene (I), 1.51 g. (0.012 mole) of n-butyl glyoxylate, two drops of piperidine, and 90 cc. of glacial acetic acid is heated under reflux for four hours. The acetic acid is removed by evaporation under reduced pressure, and the residual red gum is dissolved in chloroform. The solution is washed successively with water and brine; and is then dried over anhydrous sodium sulfate. The solvent is evaporated to yield a red gum which crystallizes upon trituration with ethyl acetate and ether. Orange crystals (0.75 g., 36%) melting 121°–124° are obtained. The filtrate is chromatographed on silicic acid to afford an additional 0.54 g. of the product. The total yield of product is 62% theory. Two recrystallizations of the material produces an analytical sample as small yellow-orange crystals melting at 127.5° – 128°.

Anal. Calcd. for $C_{21}H_{21}O_6Cl$ (404.8): C, 62.30; H, 5.23; Cl, 8.76. Found: C, 62.58; H, 5.55; Cl, 8.87.

By using an analogous procedure to that above, 2-carbomethoxy-methylidene-5-methoxy-8-chloro-3,4,10-trioxo 1,2,3,4,4a,9,9a,10-octahydro anthracene may be obtained from I and methyl glyoxylate. This product is purified by recrystallization from a hot solution of ethyl acetate and hexane; m.p. 161°–168°.

Anal. Calcd. for $C_{18}H_{15}O_6Cl$ (362.7): C, 59.60; H, 4.35, Found: C, 60.26; H, 4.38;

METHOD B

Under a nitrogen atmosphere, a solution of 500 mg. (1.7 mmole) of 5-methoxy-8-chloro-3,4,10-trioxo-1,2,3,4,4a,9,9a,10-octahydro anthracene (I), 85 mg. (1.0 mmole) of magnesium methoxide, 500 mg. (3.8 mmole) of n-butyl glyoxylate, and 20 cc. of xylene is heated at 105°–110° for 3 hours. The red brown mixture is evaporated to dryness under reduced pressure, and the residue is shaken with a mixture of chloroform and 2N hydrochloric acid. The chloroform solution is then washed with water, decolorized with activated carbon, dried over anhydrous sodium sulfate, filtered, and evaporated to give a reddish oil. Upon silicic acid chromatography (eluting with chloroform) or by crystallization from a solution of ether and hexane, 2-carbobutoxymethylidene-5-methoxy-8-chloro-3,4,10-trioxo-1,2,3,4,4a,9,-9a,10-octahydro anthracene: m.p. 121°–124°(impure) is obtained.

METHOD C

A mixture of 3 g. of 5-methoxy-8-chloro-3,4,10-trioxo-1,2,3,4,4a-9,9a,10-octahydro anthracene, 1.5 g. of butyl glyoxylate (15% excess) in 180 ml. of glacial acetic acid containing 12 drops of conc. HCl is refluxed under nitrogen for 6 hours. The solvent is then removed under reduced pressure and the residual red gum is chromatographed on a silicic acid column in chloroform. After an initial small fraction of brightly fluorescent solution which yields an orange gum, the next three fractions (2 g.) are combined and recrystallized from ethyl acetate-hexane to give 1.57 g. of product melting at 125.5° – 126.5°C. Recrystallization gives a product melting at 127.5°–128°C. Elemental analysis: calculated for $C_{21}H_{21}O_6Cl$: C, 62.30; H, 5.23: Cl, 8.76; found: C, 62.58; H, 5.55.

In the same manner, the following compounds are prepared:

2-(carbethoxymethylidene)-5-benzyloxy-8-chloro-3,4,10-trioxo-1,2,3,4,4a,9,9a,10-octahydroanthracene 2-(carbethoxymethylidene)-5-benzyloxy-3,4,10-trioxo-1,2,3,4,4a,9,9a,10-octahydroanthracene

METHOD D

In a flask equipped with a mechanical stirrer, a nitrogen inlet, and a reflux condenser fitted with a Dean Stark trap 13.9 g. (0.0476 mole) of 5-methoxy-8-chloro-3,4,10-trioxo-1,2,3,4,4a,9,9a,10-octahydroanthracene, 1.03 g. (0.012 mole) of magnesium methoxide, 13.9 g. (0.107 mole) of n-butylglyoxylate and one liter of xylene are refluxed for two hours. During this period, the mixture becomes dark orange in color and water is collected in the trap. The mixture is then cooled and shaken intermittently with 6N hydrochloric acid for 5 min. The organic layer is washed twice with water, once with saturated sodium chloride solution, dried over anhydrous sodium sulfate, treated with Darco, filtered through Super Cel, and evaporated to a viscous red oil. The oil is dissolved in a limited quantity of ether and the solution seeded with unsaturated ester. More ether is added after some crystallization has occurred. After crystallizing overnight, the orange solid is filtered and washed with ether containing a small amount of ethyl acetate. The unsaturated ester is obtained as small yellow-orange crystals; m.p. 120°–123°C; Analytical Sample 127°–128°C.

An additional quantity of ester may be obtained by Florisil chromatography of the mother liquor and elution with 1:1 carbon-tetrachloride; chloroform. Elution with carbon tetrachloride alone gives the geometric isomer of the unsaturated ester (m.p. 134°–135°C). Elution with chloroform gives the hydroxy ester: n-butyl-5-methoxy-8-chloro-3,4,10-trioxo-1,2,3,4,4a,9,9a,10-octahydro-anthracene-2-(α-hydroxy)acetate; m.p. 180°–182°C.

Similarly, the following carboxymethylidene-3,4,10-trioxo-1,2,3,4,4a,-9,9a,10-octahydroanthracenes are prepared in the form of their esters from the appropriate triketone and glyoxylic acid ester.

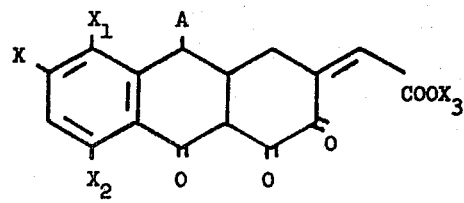

| $X_1$ | X | $X_2$ | A | $X_3$ |
|---|---|---|---|---|
| H | H | H | H | Bu |
| 8-NMe$_2$ | H | 5-OMe | H | Me |
| 8-NHCOMe | H | 5-OMe | H | Me |
| H | H | 5-OMe | H | Et |

-Continued

| $X_1$ | X | $X_2$ | A | $X_3$ |
|---|---|---|---|---|
| H | 7-Me | 5-OMe | H | n-Bu |
| H | 7-i-Pr | 5-OMe | H | Pr |
| 8-Et | 7-Et | 5-OMe | H | Pr |
| H | H | 5-OCOEt | H | Et |
| H | H | 5-OCOMe | H | Et |
| H | H | 5-OMe | H | i-Bu |
| H | 7-NHCOMe | 5-OMe | H | Et |
| H | 7-Et | 5-OMe | H | Et |
| H | 7-NMe$_2$ | 5-OMe | H | sec-Bu |
| 8-Pr | H | 5-OPr | H | Me |
| 8-OBu | H | 5-OBu | H | Bz |
| H | H | 5-OCOMe | Et | Et |
| H | H | 5-OCOBu | Me | Bu |
| H | H | 5-OEt | Me | Et |
| H | H | 5-OMe | Me | Et |
| 8-Cl | H | 5-OMe | i-Pr | Me |
| 8-CF$_3$ | H | 5-OMe | Me | Me |
| H | H | 5-OH | Me | Bu |
| 8-OMe | 6-OMe | 5-OMe | H | Et |
| H | H | 5-OH | Me | Me |
| 8-Cl | H | 5-OMe | MeOCH$_2$ | Me |
| 8-Cl | H | 5-OH | MeOCH(Me) | Me |
| 8-OMe | H | 5-OH | MeOCH(Me) | Bu |
| H | H | 5-OMe | MeOCH$_2$ | Bu |
| 6-OMe | 7-OMe | 5-OMe | H | Et |

In the above table Me = CH$_3$, ET = C$_2$H$_5$, Pr = C$_3$H$_7$, Bu = C$_4$H$_9$, Bz = CH$_2$C$_6$H$_5$.

Upon hydrolysis the free acids are, of course, obtained.

EXAMPLE LVII n-Butyl 5-Methoxy-8-chloro-3,4,10-trioxo-1,2,3,4,4a,9,9a,10-octahydroanthracene-2-($\alpha$-dimethylamino)acetate A flask equipped with a stirrer and containing 1.31 g. (0.0032 mole) of 2-carbobutoxymethylidene-5-methoxy-8-chloro-3,4,10-trioxo-1,2,3,4,4a.9,9a,10-octahydroanthracene is cooled in a dry-ice/acetone bath. Dimethylamine is passed in under nitrogen until about 70 cc. have condensed. The dry-ice/acetone bath is replaced with an ice/water wath. After some minutes the solid material dissolves to give a red solution. After 20 minutes a yellow precipitate forms. The dimethylamine is evaporated with a stream of nitrogen, and the residual brown gum is stirred with 10 cc. of ether. The ether is evaporated under nitrogen, and this process repeated to remove traces of dimethylamine. Crude n-butyl-5-methoxy-8-chloro-3,4,10-trioxo-1,2,3,4,4a,9,9a,10-octahydroanthracene-2-(a-dimethylamino)acetate is obtained as the residue.

The residue is taken up in chloroform and hydrogen chloride bubbled through the solution for 30 seconds. Removal of the solvent gives the hydrochloride salt. The hydrochloride salt is more stable than the free base and is the preferred form in which this product is stored.

EXAMPLE LVIII

Esters of 3,4,10-trioxo-1,2,3,4,4a,9,9a,10-octahydroanthracene-2-($\alpha$-substituted amino)acetic acids.

Following the method of Example LVII, the products of Example LVI are converted to the substituted amino acetate products having the formula:

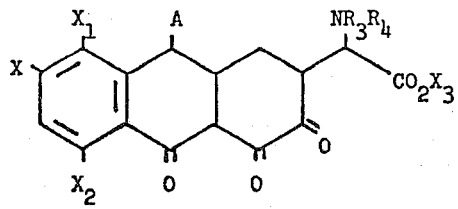

| $X_1$ | X | $X_2$ | A | $X_3$ | $NR_3R_4$ |
|---|---|---|---|---|---|
| H | H | H | H | Bu | Me$_2$N |
| 8-Et | H | 5-OMe | H | Me | MeNH |
| 8-NMe$_2$ | H | 5-OMe | H | Me | BzNH |
| 8-NHCOMe | H | 5-OMe | H | Me | Me$_2$NCH$_2$CH$_2$NMe |
| H | H | 5-OMe | H | Et | (MeOCH$_2$CH$_2$)$_2$N |
| H | 7-Me | 5-OMe | H | Pr | Bz$_2$N |
| H | 7-i-Pr | 5-OMe | H | Pr | MeNH |
| 8-Et | 7-Et | 5-OMe | H | Pr | MeNH |
| H | H | 5-OCOEt | H | Et | MeNH |
| H | H | 5-OCOMe | H | Et | p-tolylNMe |
| H | H | 5-OMe | H | i-Bu | morpholino |
| H | 7-NHCOMe | 5-OMe | H | Et | MeNH |
| H | 7-Et | 5-OMe | H | Et | BuNH |
| 8-Cl | H | 5-OMe | Me | Bu | Me$_2$N |
| H | 7-Me | 5-OMe | H | n-Bu | Bz$_2$N |
| H | 7-NMe$_2$ | 5-OMe | H | sec-Bu | Bz$_2$N |
| 8-Cl | H | 5-OMe | H | Bu | MeNH |
| 8-Cl | H | 5-OMe | H | Bu | NH$_2$ |
| H | H | 5-OMe | H | Bu | NH$_2$ |
| 8-OMe | 6-OMe | 5-OMe | H | Et | Bu$_2$N |
| 8-Cl | H | 5-OMe | Me | Bu | MeNH |
| H | H | 5-OMe | Me | Bu | NH$_2$ |
| 8-Pr | H | 5-OPr | H | Me | C$_6$H$_5$(CH$_2$)$_4$NMe |
| H | H | 5-OMe | Me | Bz | thiomorpholino |
| H | H | 5-OCOMe | Et | Et | pyrrylo |
| H | H | 5-OCOBu | Me | Bu | piperazino |
| H | H | 5-OEt | Me | Et | Bu$_2$N |
| H | H | 5-OMe | Me | Et | Me$_2$NCH$_2$CH$_2$NH |
| 8-Cl | H | 5-OMe | i-Pr | Me | BzNMe |
| 8-CF$_3$ | H | 5-OMe | Me | Me | Me$_2$N |
| 8-Cl | H | 5-OH | Me | Bu | pyrrolidino |
| H | H | 5-OCOMe | H | Et | Me$_2$N |
| 8-Cl | H | 5-OMe | MeOCH$_2$ | Me | Me$_2$N |
| 8-Cl | H | 5-OH | MeOCH(Me)Me | | [MeOC(CH$_2$)$_4$]$_2$N |
| 8-OMe | H | 5-OH | MeOCH(Me)Bu | | MeOOC(CH$_2$)$_2$NMe |
| 8-Cl | H | 5-OMe | H | Bu | Me$_2$N |
| H | H | 5-OMe | MeOCH$_2$ | Bu | Me$_2$N |
| 6-OMe | 7-OMe | 5-OMe | H | Et | Et$_2$N |

In the above table, Me = CH$_3$, Et = C$_2$H$_5$, Pr = C$_3$H$_7$, Bu = C$_4$H$_9$, Bz = CH$_2$C$_6$H$_5$. Upon hydrolysis the free acids are, of course, obtained.

Note: In the above preparations, the reaction is conducted at a temperature 10° above the freezing point of the amine reactant if freezing occurs at dry ice/acetone bath temperatures.

EXAMPLE LIX n-Butyl-3-hydroxy-5-methoxy-8-chloro-4,10-dioxo-1,2,3,4,4a,9,9a,10-octahydroanthracene-2-(α-dimethylamino)acetate Hydrochloride.

A flask equipped with a stirrer and containing 1.31 g. (0.0032 mole) of 2-carbobutoxymethylidene-3,4,10-trioxo-5-methoxy-8-chloro-1,2,3,4,4a,-9,9a,10-octahydroanthacene (LVI) is cooled in a dry-ice/acetone bath. Dimethylamine is passed into the flask (under $N_2$) until 70 cc. have condensed. The dry-ice/acetone bath is replaced with an ice/water bath. After some minutes the solid material dissolves to give a red solution. After 20 minutes a yellow precipitate forms. The dimethylamine is evaporated with a stream of nitrogen, and the residual brown gum is stirred with 10 cc. of ether. The ether is evaporated under nitrogen, and this process repeated to remove traces of dimethylamine. The red-brown gum is dissolved in 70 cc. of 1,2-dimethoxy ethanol which is previously cooled to 0°. Two drops of water and 0.070 g. (0.0018 mole) of sodium borohydride are then added to the solution. The mixture is stirred for 30 minutes, and is then treated with 5 cc. of glacial acetic acid. To this point the reaction solution is always maintained at the ice bath temperature. After stirring an additional ten minutes, 150 cc. of 5% hydrochloric acid is added and stirring is continued for 30 minutes. The mixture is poured into water, and is extracted several times with chloroform. The combined organic extracts are dried over anhydrous sodium sulfate, filtered, and evaporated to give a red gum which is redissolved in 10 cc. of chloroform. Hydrogen chloride is passed through the solution for 30 seconds, and the solvent is evaporated. The residual red gum partially crystallizes upon trituration with chloroform and ethyl acetate. After filtration, 0.60 g. (38%) of the hydrochloride salt is obtained as small pale yellow prisms, m.p. 172°–176°C.

A high melting pale-yellow solid (0.10 g.) is obtained from the filtrate. Its infrared spectrum with a band at 5.58 μ. indicates it to be the hydrochloride of the lactone of the above product.

The 3-acetoxy derivative of the title product is prepared by allowing the 3-alcohol to stand at room temperature for four days in a solution of acetic anhydride and pyridine. The product melts 180°–182°. An analytical sample of the acetate melts 188.5°–189°.

Anal. Calcd. for $C_{25}H_{33}O_7Cl_2N$ (530.43): C, 56.61; H, 6.27.

Found: C, 56.61; H, 6.36 (uncor.).

EXAMPLE LX

A.

n-Butyl-3-Hydroxy-5-Methoxy-8-Chloro-4,10-Dioxo-1,2,3,4,4a,9,9a,10-Octahydroanthracene-2-(α-Dimethylamino)acetate Hydrochloride.

The procedure of Example LVII is repeated and the crude product, kept cold in an ice-water bath, is dissolved in 280 ml. in a 1:1 solution of tetrahydrofuran and 1,2-dimethoxyethane at a temperature below −7°C. To this solution is added 0.50 g. (0.013 mole) of sodium borohydride in 50 ml. of 1,2-dimethoxyethane and 15 ml. of water. The reaction mixture becomes a deep, clear red color and, after 15 minutes, 10 ml. of glacial acetic acid added. This is stirred 5 min., 5 ml. of 6N HCl added and stirring continued 0.5 hr. The mixture is poured into water and extracted several times with chloroform. The combined extracts are dried over anhydrous sodium sulfate. After evaporation of the solvent, a red gum is obtained which is redissolved in 40 ml. of chloroform. Hydrogen chloride is bubbled through the solution for 0.5 min. and the solvent then evaporated. The residual red gum partially crystallizes upon trituration with chloroform and ethylacetate as small pale yellow prisms; m.p. 170°–176°. The corresponding lactone is obtained from the filtrate.

In like manner, application of this procedure to the remaining products of Example LVIII produces the corresponding 3-hydroxy compounds together with their corresponding lactones. Moderate treatment of the products bearing thioether and ether groups with HBr according to well known procedures produces the corresponding mercapto and hydroxy compounds. If desired, the acyl groups also removed by this treatment are replaced by standard acylation procedures.

B.

The product of Example LVI-A (12.5g.) in about 250 ml. of liquid dimethylamine is stirred under nitrogen for two hours at 0° C. The intermediate Mannich base crystallizes out during this period. The dimethylamine is evaporated under reduced pressure, nitrogen being passed into the system to avoid the presence of air. The resulting solid is cooled to −70° C., solid sodium borohydride (1.17 g., 1 mole eq.) added, followed by 200 ml. of precooled (−70° C.) 1,2-dimethoxyethane and 1 ml. of water. The dry ice-acetone bath is immediately replaced with an ice-salt bath. The mixture is swirled vigorously until solution is complete then stirred for 30 minutes at 0° C.

Glacial acetic acid (30 ml.) is added, the mixture stirred for 5 minutes, then poured into 180 ml. of 6N HCl. Water (250 ml.) is added and the solution extracted with chloroform. The chloroform extract is washed with water until acid free followed by a single wash with saturated sodium chloride solution. It is dried over anhydrous sodium sulfate, treated with Darco, filtered through Supercel and evaporated to dryness. The residue is taken up in chloroform, hydrogen chloride gas bubbled in and the solvent evaporated. Trituration of the residue with methanol-ethyl acetate gives a pale-yellow crystalline solid (42% yield, 7 g.); m.p. 182°–184° C. Recrystallization from methanol-ethyl acetate further purifies the product; m.p. 196°–197° C. (dec.).

Additional product is obtained by extracting the aqueous washes with butanol followed by evaporation of the butanol.

The corresponding lactone hydrochloride is obtained by fractional crystallization of the mother liquors; m.p. 280° C.

EXAMPLE LXI

5-Methoxy-8-chloro-3,4,10-trioxo-1,2,3,4,4a,9,9a,10-octahydroanthracene-4-enol Methyl Ether To 5-methoxy-8-chloro-3,4,10-trioxo-1,2,3,4,4a,9,9a,10-octahydroanthracene (0.59 g.) in 100 ml. ether is added chloroform to bring about solution. Diazomethane (0.5 g.) in 50 ml. ether and 70 ml. methanol is then added and the solution allowed to stand for 8 days. A further quantity of diazomethane (0.08 g.) in 100 ml. ether is added and the solution allowed to stand for 10 more days, at the end of which time an aliquot of the solution no longer gives a positive ferric chloride test. The solution is stripped in vacuo and the buff colored residue washed with ether. After two recrystallizations from ether it melts at 181°–183° C.

Analysis

Calcd. for $C_{16}H_{15}O_7Cl$: 62.64% C; 4.92% H; 11.5% Cl;
Found: 62.80% C; 5.20% H; 12.4% Cl.

In like manner the 4-enol methyl ethers of triketo octahydroanthracenes of Example XXXVIII are prepared.

EXAMPLE LXII n-Butyl-3-formyloxy-5-methoxy-8-chloro-4,10-dioxo-1,2,3,4,4a,9,9a,10-octahydroanthracene-2-($\alpha$-dimethylamino)acetate Hydrochloride To 0.74 g. of n-butyl-3-hydroxy-5-methoxy-8-chloro-4,10-dioxo-1,2,3,4,4a,9,9a,10-octahydroanthracene-2-($\alpha$-dimethylamino)acetate hydrochloride (product of Example LIX) dissolved in 6 ml. pyridine at 0° is added 3 ml. acetoformic anhydride. The mixture is stirred for one half hour then poured into $CHCl_3$, washed with water twice and saturated sodium chloride once, and dried over $Na_2SO_4$. The filtered solution is charcoaled and concentrated to dryness several times with repeated addition of toluene to remove the pyridine. The residue is then taken up in chloroform, HCl bubbled in, the solution concentrated and the residue triturated with chloroform-ethyl acetate. There is obtained 0.685 g. of the formate, m.p. 180° C.

A chloroform solvate of the formate is obtained as pale yellow rods, m.p. 145°–146° dec., by recrystallization from chloroform-ethyl acetate.

Anal. Calcd. for $C_{24}H_{30}O_7ClN \cdot HCl \cdot 1/3\ CHCl_3$: C, 52.54; H, 5.68; Cl, 19.12; N, 252. Found: C,52,38; H, 5.66; Cl, 20.2; N, 2.30.

The products of Example LX are also converted to their 3-formyloxy derivatives by substantially the same procedure. When one of $R_3$ and $R_4$ is hydrogen, N-formylation also occurs if excess acetoformic anhydride is used (see Example LXXXIV).

Those compounds bearing a free amino group are converted to their acetamido derivatives prior to the formylation reaction.

EXAMPLE LXIII n-Butyl-5-methoxy-8-chloro-4,10-dioxo-1,2,3,4,4a,9,9a,10-octahydro-2-anthracene-$\alpha$-dimethylaminoacetate hydrochloride.

A solution of 5 g. of n-butyl-3-formyloxy-5-methoxy-8-chloro-4,10-dioxo-1,2,3,4,4a,9,9a,10-octahydro-2anthracene-$\alpha$-dimethylaminoacetate hydrochloride and 30 ml. of 98% formic acid is treated for two minutes with 1.5 g. of zinc dust. The reaction mixture is filtered through supercel and the filtrate is evaporated under reduced pressure with addition of toluene to give a residue. The residue is dissolved in chloroform, the solution saturated with hydrogen sulfide gas, and filtered through Supercel. The filtrate is reduced to a gum, dissolved in chloroform and the solution saturated with dry hydrogen chloride and filtered. The filtrate is evaporated to a gum, redissolved in a small volume of chloroform and chromatographed on Florisil. The first fraction (fluorescent) is collected, evaporated to a gum and redissolved in a small volume of chloroform. It is converted to the hydrochloride by treatment with dry HCl and the solution concentrated. The residual gum is triturated with ethyl acetate to give a crystalline yellow solid which melts 130°–140°. Upon recrystallization from ethyl acetate and chloroform an analytical sample is obtained; m.p. 154°–157°.

Anal. Calcd. for $C_{23}H_{31}Cl_2NO_5$ (MW - 472.40): C, 58.47; H, 6.42;
Found: C, 58.88; H, 7.16.

The 3-formyloxy groups of the remaining compounds of Example LXXII are removed by this same procedure to give the corresponding 4,10-dioxo-octahydroanthracenes.

The ether groups of the 4,10-dioxo compounds thus produced are cleaved by treatment with hydrogen bromide according to known procedures. The ester and amide groups hydrolyzed by this treatment are replaced by standard acylation techniques.

EXAMPLE LXIV

5-Methoxy-8-Chloro-4,10-Dioxo-1,2,3,4,4a,9,9a,10-Octahydroanthracene-2-($\alpha$-Dimethylamino)Acetic Acid Under a nitrogen atmosphere a solution of 2.0 g. (0.004 mole) of n-butyl 3-hydroxy-5-methoxy-8-chloro-4,10-dioxo-1,2,3,4,4a,9,9a,10-octahydroanthracene 2-($\alpha$-dimethylamino)acetate hydrochloride, 1.0 g. of p-toluenesulfonic acid, and 600 cc. of toluene is heated under reflux in a vessel equipped with a Dean-Stark type moisture trap. After 20 hour the reaction mixture is cooled, and the solution is evaporated under reduced pressure. The residue is taken up in chloroform, and the resulting solution washed four times with 50 cc. portions of water and once with 50 cc. of saturated sodium chloride solution. The chloroform solution is dried over anhydrous sodium sulfate, treated with activated carbon, filtered, and evaporated to give a yellow foam. This is dissolved in chloroform and dry hydrogen chloride is passed through the solution for five minutes. The solvent is then evaporated to give a gum which upon trituration with a solution of methanol and ethyl acetate gives a yellow crystalline solid. The mixture is stored overnight in a refrigerator, and then filtered to give the crude lactone hydrochloride. It is purified by recrystallization from a hot solution of methanol and ethyl acetate.

A solution of 4.14 g. (0.01 mole) of the lactone hydrochloride and 98% formic acid is stirred with 4.0 g. of zinc dust for 60 seconds. The mixture is filtered rapidly through diatomaceous earth, and the filtrate is evaporated under reduced pressure to give a yellow gum. This material is dissolved in a mixture of water and methanol (1:2 v/v and hydrogen sulfide gas is passed through the resulting solution for three minutes. The reaction mixture is again filtered through diatomaceous earth, and the filtrate is evaporated to give crude 5-methoxy-8-chloro-4,10-dioxo-1,2,3,4,4-a,9,9a,10-octahydroanthracene-2-($\alpha$-dimethylamino)acetic acid. The product is recrystallized from a hot solution of methand and chloroform; m.p. 235°–237° C.

EXAMPLE LXV

5-Methoxy-8-Chloro-4,10-Dioxo-1,2,3,4,4a,9,9a,10-octahydroanthracene-2-(α-dimethylamino)acetic acid Lactone hydrochloride In a flask equipped with a mechanical stirrer, a nitrogen inlet, and a reflux condenser with a Dean-Stark trap are placed 4.36 g. (0.0089 mole) of n-butyl-3-hydroxy-5-methoxy-8-chloro-4,10-dioxo-1,2,3,4,4a,9,9a,10-octahydroanthracene-2-(α-dimethylamino)acetate hydrochloride, 1.0 g. of p-toluene sulfonic acid and 1 liter of toluene. The mixture is refluxed for 17 hours under a nitrogen atmosphere, cooled, and the toluene evaporated under reduced pressure. The residual oily solid is dissolved in 400 ml. of chloroform then washed with water until acid free. After an additional wash with saturated sodium chloride solution, the chloroform solution is dried over anhydrous sodium sulfate and concentrated under reduced pressure to a volume of 100 ml. Hydrogen chloride is then bubbled into the solution and the remainder of the chloroform then evaporated. The residual orange foam is triturated with methanol-ethyl acetate yielding yellow crystals. Filtration gives the yellow crystalline lactone, m.p. 232°–234° (darkening at 200°). An analytical sample as a chloroform solvate, pale yellow needles, m.p. 222° –225° dec., is prepared from the lactone by recrystallization from methanol-ethyl acetate, then from chloroform-ethyracetate.

Anal. Calcd. for $C_{19}H_{21}O_5ClNl/3CHCl_3$: C, 51.13; H, 4.74; Cl, 23.4; N, 3.09. Found: C, 51.33; H, 4.76; Cl, 24.0; N, 3.00. Repetition of this procedure using 0.5 g. p-toluene-sulfonic per 1.0 g. of hydroxy ester increases the yield from 66% to 80–90%.

By the same procedure, the remaining products of Example LX are converted to their corresponding lactones.

EXAMPLE LXVI

5-Methoxy-8-Chloro-4,10-Dioxo-1,2,3,4,4a,9,9a,10-Octahydroanthracene-2-(α-Dimethylamino)acetic acid To a solution of 2.4 g. of the title lactone product of Example LXV in 50 ml. of 97% formic acid is added 2.4 g. of zinc dust. After being vigorously stirred magnetically for 1.0 minute, the mixture is rapidly filtered through SuperCel. The filter pad is washed thoroughly with 97% formic acid and the filtrate evaporated under reduced pressure to a hard gum. To remove traces of formic acid, the gum is triturated with ether, filtered, washed thoroughly with ether and the residual amber gum dissolved in 150 ml. of 67% methanol in water. Hydrogen sulfide is bubbled through the solution for 3 minutes, the mixture then treated with Darco and filtered through SuperCel, the filter pad being thoroughly washed with the methanol solution. The filtrate is concentrated under reduced pressure. When most of the methanol is removed the product crystallizes as yellow needles. The solution is then heated to dissolve the acid, filtered, and the product allowed to crystallize overnight at 5° C. The acid is filtered, washed with water, followed by a small amount of acetone, and dried. The product is then suspended in dry toluene and heated on the steam bath 20 minutes. After evaporation of the toluene under reduced pressure, the acid is obtained as small pale yellow crystals, m.p. 239°–241° dec. (220° previous darkening). Recrystallization from methanol of a sample of acid obtained in an analogous experiment afforded pale yellow needles, m.p. 169°; dec. 225°–230°. The analytical data and m.p. of this substance indicate it to be a methanol solvate. A sample of this material after treatment with toluene as above had m.p. 235°–237°.

Anal. Calc. for $C_{19}H_{22}O_5NCl$: C, 60.08; H, 5.84; N. 3.69; Cl, 9.33. Found: C, 60.29; H, 5.87; N, 3.49; Cl, 9.7.

The remaining lactones of Example LXV are similarly cleaved to produce the corresponding 4,10-dioxo amino acid compounds. The ether-groups present are converted to hydroxy groups by treatment with hydrogen bromide in accordance with known procedures. The amphoteric products are obtained by careful neutralization with $NaHCO_3$.

EXAMPLE LXVII

5-Methoxy-8-Chloro-4,10-dioxo-1,2,3,4,4a,9,9a,10-octahydroanthracene-2-(α-dimethylamino) acetic acid To 480 mg. of the lactone of Example LXV in 40 ml. of acetic acid there is added 150 mg. of zinc chloride. The mixture is swirled for 5 minutes after which 40 ml. of methanol is added. Zinc dust (500 mg.) is then added, the mixture stirred for 20 minutes under nitrogen and filtered. The filter cake is washed with chloroform and the combined filtrate and washings evaporated to dryness. The yellow-brown foam thus produced is taken up in methanol (100 ml.), hydrogen sulfide bubbled through for 10 minutes and the mixture filtered through Supercel. The filtrate is evaporated to a gum then taken up in 45 ml. of water-methanol (1-2) and taken to dryness again. The resulting gum was crystallized from chloroform-methanol as pale yellow crystals; m.p.; gum at 200°, decomposed at 210°. Additional material is recovered from the filtrate.

The remaining products of Example LXV are similarly converted to their corresponding acids.

EXAMPLE LXVIII

5-Methoxy-8-Chloro-4,10-Dioxo-1,2,3,4,4a,9,9a,10-Octahydroanthracene-2-(α-Dimethylaminoacetonyl-γ,γ-Dinitrile Malonodinitrile, 0.015 mole, is dissolved in 100 ml. dry dimethyl formamide and treated with 0.015 mole sodium hydride (as a 50% dispersion in oil), added in portions over a 30 minute period. After hydrogen evolution ceases, 0.01 mole of the mixed anhydride of 5-methoxy-8-chloro-4,10-dioxo, 1,2,3,4,4a,9,9a,10-octahydroanthracene-2-(α-dimethylamino) acetic acid with neo pentylchloro carbonate in 100 ml. of dry dimethylformamide is added. The mixture is stirred for 16 hours at room temperature and then concentrated at reduced pressure to remove the solvent. The residue is taken up in 200 ml. of chloroform. The chloroform solution is extracted six times with 1.5N hydrochloric acid, four times with water (acid-free), two times with saturated sodium chloride solution and dried over anhydrous sodium sulfate. Evaporation of the solvent provides the desired substance as residue.

The corresponding γ-cyano-γ-carbethoxy and γ-carboxamido-γ-carbethoxy compounds are obtained in the same way, substituting equimolar proportions of cyanoaceticester and malonic ester half amide for the malononitrile.

In the same way, malonic monobutyl ester mono-N-t-butyl amide, malonic monoethyl ester monocarboxamide and malonic mononitrile mono-N-t-butyl amide are substituted in equimolar proportion for the malononitrile in separate experiments, to obtain, respectively, the corresponding γ-mono-N-t-butyl-carboxamido-γ-carbobutoxy, γ-mono-carboxamido-γ-carbethoxy and γ-mono-N-t-butyl-carboxamido-γ-cyano compounds. Each of the N-t-butylamide compounds is dissolved in concentrated sulfuric acid (0.4 g. in 2 ml.) and the solutions allowed to stand for one hour at room temperature. Careful dilution with 2 volumes of water, with cooling, causes precipitation of butyl 5-methoxy-8-chloro-4,10-dioxo-1,2,3,4,4a,9,9a,10-octahydroanthracene-2-(α-dimethylaminoacetonyl)-γ-carboxamide-γ-carboxylate, and 5-methoxy-8-chloro-4,10-dioxo-1,2,3,4,4a,9,9a,10-octahydroanthracene-2-(α-dimethylaminoacetonyl)-γ-dimethylaminoacetonyl)-γ-carboxamide-γ-nitrile, respectively.

EXAMPLE LXIX

Dimethyl 5-Methoxy-8-Chloro-4,10-Dioxo-1,2,3,4,4a,9,9a,10-Octahydroanthracene-2-[α-Dimethylaminoacetonyl]-γ,γ-Dicarboxylate A solution of 2.64 g. (0.02 mole) of dimethyl malonate and 40 cc. of 1,2-dimethoxyethane is added as rapidly as safety permits to an etheral solution of 0.02 mole of ethyl magnesium bromide. With cooling and efficient stirring, the mixed anhydride of 5-methoxy-8-chloro-4,10-dioxo-1,2,3,4,4a,9,9a,10-octahydroanthracene-2-[(α-dimethylamino)acetic acid]and n-butyl chloro carbonate, 0.02 mole, in 40 cc. of 1,2-dimethoxyethane is added dropwise. The reaction mixture is stirred overnight at room temperature, and is then treated with 2.0 cc. of glacial acetic acid. The volatile components are evaporated under reduced pressure, and the residue is taken up in 100 cc. of chloroform. The chloroform solution is first washed three times with 25 cc. portions of 1N HCl and then three times with 25 cc. portions of water. The chloroform solution is dried over anhydrous sodium sulfate, filtered, and evaporated under reduced pressure to give the desired product. It is recrystallized from a hot solution of ethyl acetate and hexane.

EXAMPLE LXX

Hydrochloride Salt of 5-Methoxy-8-Chloro-4,10-Dioxo-1,2,3,4,4a,9,9a,10-Octahydroanthracene-2-(α-Dimethylamino)Acetic Acid Anhydrides With Lower (Alkyl)Carbonates To a magnetically stirred suspension of 1.17 g. (0.0031 mole) of the title acid of Example LXVI 100 ml. of chloroform is added 0.86 ml. (0.63 g., 0.0062 mole) of triethylamine. After the acid dissolves, the solution is cooled to 0° and 0.76 g. (0.0062 mole) of i-propylchloroformate is added. The solution is stirred at 0° for 2 hours then extracted rapidly with two portions of water and one portion of saturated sodium chloride solution. The chloroform solution is dried over anhydrous sodium sulfate, then hydrogen chloride is bubbled into the solution for two minutes. The chloroform is then evaporated under reduced pressure and the residual yellow solid triturated with ethyl acetate. The product, removed by filtration consists of pale yellow crystals, m.p. 127°/129° (bubbling), $\lambda_{max}^{KBR}$ 5.49 and 5.67.

The ethyl, n-butyl, and i-butyl mixed anhydrides are also prepared by the above procedure from the appropriate chloroformate esters.

Similarly, the remaining 4,10-dioxo amino acids of Example LXVI are reacted with the lower (alkyl)-chloro-formates to give the respective mixed anhydrides.

EXAMPLE LXXI

Diethyl-5-Methoxy-8-Chloro-4,10-Dioxo-1,2,3,4,4a,9,9a,10-Octahydroanthracene-2-(α-Dimethylaminoacetonyl)-γ,γ-Dicarboxylate A. A solution of 0.01 mole 5-methoxy-8-chloro-4,10-dioxo-1,2,3,4,4a,9,9a,10-octahydroanthracene-2-(α-dimethylamino)acetic acid and 0.02 mole triethylamine in 50 ml. dry chloroform is cooled in an ice-salt bath and 0.02 mole ethylchlorocarbonate is added rapidly with continuous stirring. Stirring is then continued for 30 minutes after which the solvent is removed in the cold under reduced pressure.

B. The 5-methoxy-8-chloro-4,10-dioxo-1,2,3,4,4a-9,9a,10-octahydroanthracene-2-(α-dimethylamino)acetic - carbonic anhydride, prepared in A above is dissolved in 30 ml. acetonitrile, 0.05 mole of solid magnesium ethoxy malonic ester (prepared as described in the *Journal of Organic Chemistry*, Vol. 22, pp 247–8, by removal of solvent) is added. During the addition the temperature is maintained at −5°–0°C. with cooling as required. The mixture is allowed to come to room temperature and to stand over night. The solvent is removed, the residue dissolved in CHCl₃ and extracted 3 times with 3NHCl, three times with water and once with brine. The chloroform solution is then dried with anhydrous sodium sulfate and concentrated at reduced pressure to obtain the desired product as residue.

In the same way, 0.02 mole magnesium ethoxy malonic half ester half amide is substituted for the magnesium ethoxy malonic ester in step B, to obtain ethyl 5-methoxy-8-chloro-4,10-dioxo-1,2,3,4,4a,9,9a,10-octahydroanthracene-2-(α-dimethylaminoacetonyl)-γ-carboxamide-γ-carboxylate.

C. The procedures of Methods A and B are repeated but substituting magnesium ethoxy malonic half amide half-t-butyl ester for magnesium ethoxy malonic ester. The resulting t-butyl-5-methoxy-8-chloro-4,10-dioxo-1,2,3,4,4a,9,9a,10-octahydroanthracene-2-(α-dimethylaminoacetonyl)-γ-carboxamide-γ-carboxylate decarboxylated by gentle heating to give the corresponding 5-methoxy-8-chloro-4,10-dioxo-1,2,3,4,4a,9,9a,10-octahydroanthracene-2-(α-dimethylaminoacetonyl)-γ-carboxamide.

In the like manner the use of magnesium ethoxy malonic di-t-butyl ester gives upon decarboxylation the corresponding 5-methoxy-8-chloro-4,10-dioxo-1,2,3,4,4a,9,9a,10-octahydroanthracene-2-(α-dimethylaminoacetone).

EXAMPLE LXXII

The products of Example LXX are converted to the malonic acid derivatives of formula XIX by the procedure of Example LXXI-B. In this manner, the following malonic acid derivatives are produced from the appropriate magnesio malonic acid derivative EtO—CH-(Y₂)(X₄).

| $X_1$ | X | $X_2$ | A | $NR_3R_1$ | $Y_2$ | $X_4$ |
|---|---|---|---|---|---|---|
| H | H | H | H | $Me_2N$ | CN | COOEt |
| 6-OMe | 7-OMe | 5-OMe | H | $Et_2N$ | H | H |
| 8-OMe | 6-OMe | 5-OMe | H | $Bu_2N$ | COOBu | COOBu |
| 8-OMe | 6-OMe | 5-OMe | H | $Bu_2N$ | CN | CN |
| 8-Et | H | 5-OMe | H | MeCONH | H | $CONH_2$ |
| 8-NMe$_2$ | H | 5-OMe | H | BzNH | CN | CONHMe |
| 8-NHCOMe | H | 5-OMe | H | $Me_2NCH_2CH_2NMe$ | COOEt | CONHMe |
| H | H | 5-OMe | H | $(MeOCH_2CH_2)_2N$ | CN | $CONBu_2$ |
| H | 7-Me | 5-OMe | H | $Bz_2N$ | COOEt | $CONHC_6H_5$ |
| H | 7-i-Pr | 5-OMe | H | MeCONH | COOEt | $CON(Me)C_6H_5$ |
| H | H | 5-OCOEt | H | MeCONH | CN | COOEt |
| H | H | 5-OMe | Me | $Me_2NCH_2CH_2NH$ | COOBu | COOBu |
| 8-Cl | H | 5-OMe | i-Pr | BzNMe | CN | $CONMeNM_2$ |
| 8-CF$_3$ | H | 5-OMe | Me | $Me_2N$ | COOEt | $CONH_2$ |
| 8-Cl | H | 5-OH | Me | pyrrolidino | COOEt | $CONH_2$ |
| H | H | 5-OH | Me | p-tolylNEt | CN | CN |
| H | H | 5-OCOMe | H | $Me_2N$ | CN | COOMe |
| 8-Cl | H | 5-OMe | $MeOCH_2$ | $Me_2N$ | CN | CN |
| 8-Cl | H | 5-OH | MeOCH(Me) | $[MeO(CH_2)_3]_2N$ | COOMe | COOMe |
| H | H | 5-OMe | H | morpholino | CN | CO(morpholino) |
| H | 7-NHCOMe | 5-OMe | H | MeNH | CH | CO(thiomorpholino) |
| H | 7-Et | 5-OMe | H | BuNH | COOBu | CN |
| H | 7-Me | 5-OMe | H | $Bz_2N$ | CN | $CONH_2$ |
| H | 7-NMe$_2$ 5-OMe | | H | $Bz_2N$ | CN | $CONH_2$ |
| 8-Pr | H | 5-OPr | H | $C_6H_5(CH_2)_4NME$ | CN | $CON(Me)(CH_2)_3OEt$ |
| 8-OBu | H | 5-OBu | H | thiomorpholino | CN | CO(thiomorpholino) |
| H | H | 5-OMe | Me | thiomorpholino | CN | CO(thiomorpholino) |
| H | H | 5-OCOMe | Et | pyrrylo | CN | CO(pyrrylo) |
| H | H | 5-OCOBu | Me | piperazino | COOMe | CO(piperazino) |
| H | H | 5-OEt | Me | $Bu_2N$ | H | $CONH_2$ |
| 8-OMe | H | 5-OH | MeOCH(Me) | $MeOOCCH_2NMe$ | CN | COOEt |
| 8-Cl | H | 5-OMe | H | $Me_2N$ | CN | CN |
| H | H | 5-OMe | $MeOCH_2$ | $Me_2N$ | CN | CN |

EXAMPLE LXXIII

Ethyl 2-Decarboxamido-6-demethyl-6,12a-dideoxy-7-chlorotetracycline-2-carboxylate-10-methyl Ether A solution of 4.94 g. of diethyl 5-methoxy-8-chloro-4,10-dioxo-1,2,3,4,4a,9,9a,10-octahydroanthracene-2-(α-dimethylaminoacetonyl)-γ,γ-dicarboxylate (the title product of Example LXXI) and 25 cc. of dry N,N-DMF is cautiously treated with 2.4 g. (0.10 mole) of sodium hydride as a 50% dispersion in mineral oil. When the exothermic reaction has subsided, 5 drops of methanol are added and the reaction mixture is heated on a steam bath until 5 minutes after hydrogen evolution ceases. (Alternatively, the reaction-mixture is stirred at room temperature for 3 days). 50 cc. of glacial acetic acid is then carefully added and the dimethylformamide is removed from the reaction mixture by evaporation at 1 mm. pressure (bath temperature 50°–75°). The residue, taken up in methanol, is chromatographed on a carboxylic acid ion exchange resin. The fractions containing the product are readily distinguished from the starting materials by their strong fluorescence. The combined fluorescent fractions are stripped to dryness and the product crystallized from dimethylformamide-water.

The remaining products of Examples LXXI and LXXII are respectively cyclized to the tetracycline type products of formula XVII.

Following the same procedure, the corresponding octahydroanthracene-2-(α-dimethylaminoacetonyl)-γ,γ-dinitrile is converted to 2-decarboxamido-6-demethyl-6,12a-dideoxy-7-chloro-1-imidotetracycline-2-nitrile-10-methyl ether; the corresponding γ-carboxamido-γ-carbethoxy compound is converted to 6-demethyl-6,12a-dideoxy-7-chlorotetracycline-10-methyl ether, the corresponding γ-cyano-γ-carbethoxy compound is converted to 2-decarboxamido-6-demethyl-6,12a-dideoxy-7-chlorotetracycline-2-nitrile-10-methyl ether; the corresponding 5-benzyloxy-8-chloro compound is converted to methyl 2-decarboxamido-6-demethyl-6,12a-dideoxy-7-chlorotetracycline 2-carboxylate 10-benzylether.

In the case of 12a-deoxytetracyclines bearing a nitrile group, the crude residue obtained from the glacial acetic acid acidified reaction mixture by removal of the solvent is crystallized directly from dimethylformamide-water or tetrahydrofuran-water. The product thus obtained is, if necessary, purified further by partition chromatography in the following manner.

Formic acid : chloroform : ethanol (2:2:1) are thoroughly mixed together then allowed to stand for two days. During this period, partial esterification occurs, and a two phase system results. The phases are separated. The aqueous formic acid layer is used to wet powdered cellulose, the stationary phase of the chromatographic column.

The crude product is dissolved in the ethyl formate: chloroform: ethanol layer and put through the column. The 12a-deoxy nitrile band is recognized by its intense yellow fluorescence in ultraviolet light. The product is recovered by evaporation of the solvent and crystallized from dimethylformamide-water or tetrahydrofuran-water.

EXAMPLE LXXIV
dl-6-demethyl-6,12a-Dideoxy-tetracycline

1. Isopropoxy formic 5-methoxy-4,10-dioxo-1,2,3,4,4a,9,9a,10-Octahydroanthracene-2-(α-dimethylamino)acetic anhydride In still another, and preferred modification, 1.035 g. of 5-methoxy-4,10-dioxo-1,2,3,4,4a,9,9a,10-octahydroanthracene-2-(α-dimethylamino)acetic acid is suspended in 100 ml. of chloroform and 0.67 g. (0.93 ml., 2 equivalents + 10% excess) of triethylamine added. To the resulting clear solution, cooled to 0° C., 0.81 g. (2 equivalents + 10% excess) of distilled isopropylchloroformate is added and the mixture stirred magnetically at 0° C. for 2 hours. The chloroform is then evaporated under reduced pressure, the temperature being kept near 0° C. during the evaporation. The yellow gum thus obtained crystallizes on standing and exhibits the expected anhydride absorption in the infrared.

Preparation of 5-Methoxy-4,10-dioxo-1,2,3,4,4a,9,9a,10-Octahydro-Anthracene-2-(α-dimethylamino)acetic acid.

To 0.76 g. of the 8-chloro substituted analog (Example LXVI in 150 ml. of absolute ethanol there is added 4.2 equivalents of triethylamine (1.16 ml.) and the mixture stirred until solution is complete. Pd/C (200 mg. of 5%) is added and the mixture hydrogenated at atmospheric pressure and room temperature for about 3 hours when hydrogen uptake ceases. The mixture is filtered through SuperCel then evaporated to a foam. To the combined product from two such runs is added 50 ml. of toluene and the mixture evaporated. This step is repeated once again to insure complete removal of the ethanol.

The residue is chromatographed on 30 g. of silicic acid. The column is eluted with chloroform through 15% methanol in chloroform to remove triethylamine hydrochloride. Elution with methanol followed by evaporation provides the crude acid (1.31 g.) as a pale yellow solid.

2. Ethyl 5-Methoxy-4,10-Dioxo-1,2,3,4,4a,9,9a,10-Octahydroanthracene-2-(α-dimethylaminoacetonyl)-γ-(N-t-butylcarboxamide)-γ-Carboxylate To the crude anhydride is added 3.84 g. (5 eq.) of the magnesium salt of ethyl t-butylmalonamate (freshly prepared as described below), followed by 100 ml. of distilled acetonitrile. The solids rapidly dissolve and the solution is stirred at room temperature for 0.5 hr. The acetonitrile is then evaporated at room temperature under reduced pressure and the residual gum dissolved in 200 ml. cf chloroform. The chloroform solution is extracted six times with 1.5N hydrochloric acid, four times with water (acid-free), two times with saturated sodium chloride solution and dried over anhydrous sodium sulfate. Evaporation of the solvent yields 3.0 g. of acylmalonamate as a yellow oil.

The Magnesium Salt of ethyl t-butylmalonamate

A mixture of 3.75 g. of the malonamate, 0.49 g. (1 eq.) of powered magnesium, 365 ml. of absolute alcohol, and 0.15 ml. of carbon tetrachloride is stirred magnetically at room temperature. The vigorous reaction which occurs within a few minutes subsides in about 20 minutes. To the thick slurry, 10 ml. of absolute ether is added and stirring continued at room temperature until all the magnesium is dissolved. The solution is filtered through SuperCel and the solvents evaporated under reduced pressure in the cold. The resulting foam is crushed and dried under high vacuum.

3. dl-2-Decarboxamido-6-Demethyl-6,12a-Di-deoxy-Tetracycline-2-(N-t-Butylcarboxamide)-10-Methyl Ether The 3.0 g. sample of crude acylmalonamate obtained above is dissolved in 50 ml. of dry dimethylformamide in a flask equipped with a magnetic stirrer, reflux condenser, and nitrogen inlet. To the yellow solution is added 1.0 g. of 53% sodium hydride in bayol (mineral oil). After the initial reaction subsides (6 min.), 5 drops of methanol is added and the flask plunged into a 148°C. oil bath. At ca. 82°C. a vigorous reaction begins as evidenced by the bubbling and the deepening color. After 6 min. in the bath, the temperature is 110°C., the solution an orange-red, and the bubbling somewhat decreases. At 119°C. (7 min. in bath), 0.20 g. of 53% sodium hydride is added. The rapid bubbling which occurs rapidly subsides and after 4 min. (121°) the mixture is cooled and poured with stirring into 15 ml. of acetic acid, affording an amber solution with intense yellow-green fluorescence. The solvent is evaporated under reduced pressure, the residual dark gum dissolved in n-butanol and extracted two times with water. The combined water extracts are then extracted once with butanol and the organic solutions combined. After two additional water extractions the butanol is evaporated under reduced pressure to a red gum having intense absorption above 400 $\mu$ in the ultraviolet. The gum is taken up in 1:1 chloroform-carbon tetrachloride and chromatographed on silicic acid. Elution with chloroform yields a gum which crystallizes when triturated with methanol. Recrystallization from chloroform-methanol produces yellow-orange needles; m..p. 215°–216°C.

$\lambda_{max}^{MeOH}$(0.01N HCl) 436(26,700), 325(9,300), 254(12,900)

$\lambda_{min}^{MeOH}$(0.01N HCl) 366(7,000), 299(7,900), 238(11,100)

$\lambda_{sh}^{MeOH}$(0.01N HCl) 456(22,400), 420(21,600)

Analysis: Calcd. for $C_{26}H_{32}O_6N_2$: C,66.65; H,6.69; N,5.98 Found: C,66.95; H,6.80; N,6.04.

4. Removal of 10-Methyl Ether and N-t-Butyl groups

The 10-methyl ether thus obtained is transferred to a small flask and dissolved in 15 ml. of 48% HBr. Nitrogen is bubbled through the solution for 3 min. at room temperature and the mixture then heated on the steam bath for 15 min., nitrogen being bubbled through during this entire period. The solution is cooled and poured into 100 ml. of water, an orange precipitate being obtained. The entire mixture is transferred to a separatory funnel and washed three times with hexane to remove the bayol. The mixture is then neutralized to pH 4-5 with 10% sodium hydroxide. Some precipitate dissolves during the neutralization. The mixture is extracted 5 times with n-butanol and the combined organic layers extracted 3 times with small portions of water. Evaporation of the butanol under reduced pressure gives 0.72 g. of a partially crystalline dark gum.

This gum was chromatographed on an acid-washed-SuperCel partition column (250 X 30 mm.) (see below), to give 0.217 g. of tetracyclic material as an orange foam. Trituration of this foam with methanol affords 0.102 g. (8.5% from amino acid) of dl-6-demethyl-6,12a-dideoxytetracycline as small orange crystals.

The SuperCel Column

The phases are prepared by shaking together a mixture of chloroform, ethyl formate, formic acid, water, and ethanol in a ratio of 4:3:2:2.5:1. The upper layer is used as the stationary phase.

Acid-washed SuperCel is slurried in the stationary phase and the column packed under pressure. Excess stationary phase is drawn off and the crude material put onto the column with a small amount of stationary phase followed by the mobile phase. The 12a-deoxytetracycline is followed by virtue of its intense yellow-green fluorescence.

EXAMPLE LXXV 6,12a-Dideoxy-6-demethyltetracycline-10-methyl Ether

A. To a well-stirred mixture of 10 g. (0.025 mole) of 2-decarboxamido-6,12a-dideoxy-6-demethyletetracycline-20-nitrile-10-methyl ether in 100 ml. of glacial acetic acid is added 18 ml. of 85% $H_2SO_4$. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water, and the orange crystalline precipitate of N-t-butyl-6,12a-dideoxy-6-demethyltetracycline-10-methyl ether is filtered, water-washed, and dried in vacuum.

The product (0.4 g.) is dissolved in 2 ml. of 85% sulfuric acid and the solution allowed to stand for one hour at room temperature, after which it is carefully diluted with 2 volumes of water, employing external cooling to control the exothermic reaction. Upon standing for an additional 16 hours, a crystalline precipitate forms and is collected. The product is a mixture of predominantly 6-demethyl-6,12a-dideoxytetracycline-10-methyl ether together with a small amount of starting compound which is separated using chromatographic techniques as in Example LXXVIII.

B. The 10-methyl ether is converted to 6,12a-dideoxy-6-demethyltetracycline as follows: 2 g. are heated at 100° C. in 50 ml. 48% HBr for 45 minutes. Concentration of the mixture yields the desired product as a hydrobromide which may be converted to the amphoteric compound by treatment in aqueous solution with an equivalent proportion of sodium bicarbonate.

Resolution of the racemate is accomplished by fractional crystallization of the camphorsulfonic acid salt from aqueous alcohol. The crops of crystals of the desired antipode are identified by virtue of their enhanced antibacterial potency.

Following Procedure B (15 minutes heating instead of 45 ), 6,12a-dideoxy-6-demethyltetracycline-2-nitrile is prepared from the corresponding 10-methyl ether. Alternatively, this product is obtained by passing dry hydrogen chloride through a concentrated hydrochloric acid solution of 6,12a-dideoxy-6-demethyltetracycline-2-nitrile-10-methyl ether for 30 minutes at steam bath temperature, cooling, diluting with water, adjusting the pH to 4 and filtering the precipitated product.

EXAMPLE LXXVI

Following Procedure A of Example LXXV, 6,12a-dideoxy-7-chlortetracycline-10-methyl ether and 10-benzyl ether are prepared from the corresponding nitriles of Example LXXIII. Those products bearing ether groups are subsequently converted to the corresponding hydroxy compounds by Method B of Example LXXV.

EXAMPLE LXXVII

12a-Hydroxylation of 12a-deoxytetracyclines

A solution of about 30 g. of the 12a-deoxytetracycline in 350 ml. of methanol containing 26.6 grams of cerium chloride heptahydrate is combined with 350 ml. pH 10 glycine:sodium chloride:sodium hydroxide buffer and treated by passing oxygen gas through the solution for 30 minutes.

The reaction mixture is diluted with 700 ml. water, adjusted to pH 5–6, and extracted with butanol. The butanol extract is evaporated to dryness and taken up in water. The product is isolated by passing this solution through a column consisting of two layers, the first, an anion exchange resin (an amine anion resin prepared by the method of the example of U.S. Pat. No. 2,630,429, which is converted to the acetate salt by treatment with aqueous acetic acid and subsequent water washing to remove excess acetic acid) and the second, a cation exchange resin (a carboxylic acid resin-H+ cycle, prepared by polymerizing methacrylic acid with 5% divinylbenzene in the presence of 1% benzoyl peroxide catalyst at 60° C. for 24 hours). The effluent from the column contains unreacted 12a-deoxy starting compound as the acetate salt. Elution of the carboxylic acid resin with dilute hydrochloric acid followed by concentration of the eluate yields the tetracycline product as the hydrochloride salt.

EXAMPLE LXXVIII

6-Deoxy-6-demethyltetracycline

To a well-stirred mixture of 10 g. (0.025 mole) of 6-deoxy-6-demethyltetracycline-2-nitrile in 100 ml. of glacial acetic acid 1a added 18 ml. of 85% $H_2SO_4$. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water and the solution then neutralized with dilute sodium hydroxide solution, extracted with three 250 ml. portions of butanol, the combined extracts water-washed and dried. The product, N-t-butyl-6-deoxy-6-demethyltetracycline is obtained crystalline by evaporation of the solvent.

The product (0.4 g.) is dissolved in 2 ml. of 85% sulfuric acid and the solution allowed to stand for one hour at room temperature, after which it is carefully diluted with 2 volumes of water, employing external cooling to control the exothermic reaction. Upon standing for an additional 16 hours, a crystalline precipitate forms and is collected. The product is a mixture of predominantly 6-demethyl-6-deoxytetracycline together with a small amount of starting compound which is separated using chromatographic techniques.

The diasteroisomeric amide products thus obtained are separated by partition chromatography using ethyl acetate saturated with water as the mobile phase and water saturated with ethyl acetate as the stationary phase. A column is prepared by making a slurry of the mobile phase and Whatman cellulose powder (about 150–200 g. per gram of products to be separated). This slurry is homogenized with the stationary phase in a blender, employing 0.5 ml. of stationary phase per gram of paper powder. The mixture is then poured into a chromatography tube and packed down tightly with a plunger using hand pressure. Excess liquid is then drawn off the column.

The diastereoisomeric products are dissolved in a minimum of water and the solution is adjusted to pH 6 by addition of triethylamine while dimethylformamide is also added to keep the solution homogeneous. This solution is applied to the top of the column and eluated with the mobile phase.

The less polar effluent fraction possesses high biological activity and has infrared and ultraviolet characteristics identical with those of 6-deoxy-6-demethyltetracycline. It is purified by crystallization of the sulfate salt from aqueous solution.

Resolution of the racemate is accomplished by fractional crystallization of the d-camphorsulfonic acid salt from aqueous alcohol. The crops of crystals of the desired antipode are identified by virtue of their enhanced antibacterial potency.

This product is also obtained by the 12a-hydroxylation of the 12a-deoxy compound.

EXAMPLE LXXIX

6-Deoxy-6-demethyl-7-chlortetracycline

A. 6-Deoxy-6-demethyl-7-chlortetracycline-10-methyl ether, 2 g., is heated at 100° C. with 50 ml. 48% hydrobromic acid for 15 minutes. Nitrogen is bubbled through the hydrobromic acid solution (which is previously freed of oxygen) throughout the reaction. The mixture is neutralized to pH 5.5, extracted with butanol, the solvent stripped and the product crystallized from dimethylformamide-water. It is converted to the amphoteric compound by treatment with an equivalent of sodium bicarbonate in aqueous solution.

B. 6-Deoxy-6-demethyl-7-chlortetracycline-10-benzyl ether, 2 g., is dissolved in 150 ml. glacial acetic acid and hydrogenated at about 40 psi hydrogen pressure at room temperature in the presence of 2 g. 5% palladium on carbon catalyst until an equimolar proportion of hydrogen has been consumed. The mixture is then filtered and concentrated at reduced pressure to obtain the product as residue.

The racemic mixtures obtained by the foregoing procedures are resolved as described in the preceding example.

EXAMPLE LXXX

6-Demethyl-6,12a-dideoxy-7-chlortetracycline-10-methyl Ether

2-Decarboxamido-6-demethyl-6,12a-dideoxy-7-chloro-1-imidotetracycline-2-nitrile-10-methyl ether (Example LXXIII), 10 g., in 100 ml. glacial acetic acid is treated, with vigorous stirring, with 18 ml. concentrated sulfuric acid. The solution is cooled to 15°C. and 9 g. isobutylene is introduced. Stirring is continued for 16 hours at 5° C. and the mixture is then extracted with petroleum ether. The acetic acid layer is separated, poured into a liter of ice-water, and neutralized with dilute sodium hydroxide. This mixture is extracted three times with 250 ml. portions of chloroform, and the extracts are combined, water-washed, dried with sodium sulfate, and evaporated to dryness.

The residue is dissolved in 2 ml. 85 percent sulfuric acid and the solution is held at room temperature for one hour and then diluted with two volumes of water, with cooling. This solution is next heated to 60° C. for two hours and then permitted to stand for 16 hours while cooling to room temperature. The resulting crystalline precipitate is separated and dried.

In like manner, the remaining 1-imido tetracyclines of Example LXXIII are transformed to the corresponding 12a-deoxytetracyclines.

EXAMPLE LXXXI 6,12a-Dideoxy-6-demethyltetracycline

2-Decarboxamido-6,12a-dideoxy-6-demethyltetracycline-2-nitrile, 0.5 g., is partly dissolved in a mixture of 5 ml. glacial acetic acid and 0.9 ml. concentrated sulfuric acid and cooled to 0° C. Isobutylene gas is passed into the mixture for 15 minutes while maintaining the temperature below 10° C. The reaction mixture is then maintained under nitrogen at 0° to 5° C. for 16 hours, hexane-washed, and poured into water at 10° C. The resulting orange precipitate is separated and triturated with chloroform, causing it to crystallize. The crystals are washed with ether and dried, to obtain 563 mg. (94% of theory) of N-t-butyl-6,12a-dideoxy-6-demethyltetracycline. The infrared absorption curve shows no nitrile absorption at 4.5 $\mu$. Ultraviolet absorption maxima are observed at 233, 367, 410, 433 and 456 m$\mu$ in 0.01 N HCl.

The t-butyl amide, 500 mlg., is dissolved in 4 ml. 85% $H_2SO_4$ and the solution allowed to stand at room temperature for 1.5 hours, then added to water. The resulting solution is adjusted to pH 5 and filtered. The crude solid thus obtained is crystallized from n-butanol, or from aqueous dimethyl formamide to give red prisms of the desired product.

EXAMPLE LXXXII

6-Deoxy-6-Demethyltetracycline 6,12a-Dideoxy-6-demethyltetracycline (250 mg.) and 25 ml. of dimethylformamide are vigorously stirred in a 250 ml. round bottom flask under nitrogen. After 5 minutes cerous chloride (308 mg.) is added to the suspension and stirring continued under nitrogen for an additional 10 minutes. Methanol (55 ml.) is then added in one portion to the clear solution of the cerous chelate. Seventeen ml. of a buffer solution (pH 10.40, comprising 9 ml. of 0.1N glycine/0.1N sodium chloride and 8 ml. of 0.1N sodium hydroxide) is added in one portion to produce a clear light yellow to amber solution. The apparent pH of the resulting solution is 5.7.

The flow of nitrogen gas is discontinued and oxygen then bubbled in at a vigorous rate for 30 minutes. The reaction mixture becomes progressively darker in color during the oxidation. At the end of this time 9.5 ml. of concentrated hydrochloric acid is introduced into the reaction mixture to give a clear yellow/amber color. The mixture is then evaporated to dryness.

To the residue in the still warm flask there is added 5.0 ml. concentrated HCl and the mixture warmed on a steam bath to effect solution. 60 ml. of n-butanol, previously saturated with 1N.HCl, is added to give a completely clear solution. Water (50 ml.) is added and the mixture vigorously shaken and allowed to separate into two layers. The butanol layer is collected and shaken with 25 ml. of 1N.HCl previously saturated with butanol. The aqueous HCl extract is combined with the original HCl liquor and extracted twice with 20 ml. volumes of butanol which had been previously saturated with 1N.HCl. The three n-butanol extracts are combined and run through a partition column, which had been previously prepared according to the following method.

Partition column I n-Butanol and 1.0N.HCl are shaken together until each is saturated with the other. Acid washed super-cel is mixed with the aqueous acid layer to produce a thin slurry which is packed into a column under a 5 p.s.i. pressure of $N_2$ to produce a super-cel column (1. 300 mm; i.d. 28 mm). n-Butanol saturated with 1.0N HCl is run through this column to displace the excess stationary phase.

The butanol solution of the reaction mixture is run slowly through this column and the entire yellow eluate evaporated to dryness. Toluene is added and this solvent removed in vacuo until no odor of solvents remain. The residue. a friable, yellow/orange solid is chromatographed on a partition column prepared in a manner similar to that above using the system $CHCl_3$: HCOOH: $HCOOC_2H_5$: $H_2O$ (2:1:1:1) (Upper phase=stationary; Lower phase=Mobile).

The acid washer super-cel column is prepared with the stationary phase (1. 280 mm; i.d. 28 mm). It is not necessary to replace excess stationary phase. Instead, the mixture to be chromatographed is dissolved in the minimum amount of stationary phase and pressed into the column with 5 psi pressure of $N_2$.

The mobile phase is cautiously added to the column, and a pressure of 8–10 psi $N_2$ applied. The mobile phase overtakes the layer of applied solids, and displaces excess stationary phase. The developed column is extruded from the column, and the bands eluted from the super-cel with methanol and evaporated to dryness. In this manner, 6-deoxy-6-demethyltetracycline and a mixture containing 6-deoxy-6-demethyltetracycline, its $C_4$ epimer and a presently unidentified substance are obtained. The $C_4$ epimer is converted to 6-deoxy-6-demethyltetracycline by equilibration of its calcium chelate as described below.

The mixture containing 6-deoxy-6-demethyltetracycline and its $C_4$ epimer (119 mg.) is combined with anhydrous calcium chloride (75 mg.), 0.1 ml. water and 3 ml. n-butanol under nitrogen and swirled to produce a clear solution. The pH is adjusted to 8.5 with an ethanolamine solution (10% v/v in n-butanol) and the mixture refluxed for 3.5 hours under nitrogen in the dark. After one hour yellow crystals separate. The final amber mixture is acidified with 3 ml. of 1N HCl saturated with butanol, the mixture shaken vigorously, and the butanol layer separated and extracted with a further 3 ml. of 1N HCl saturated with butanol. The combined HCl liquors are extracted three times with 5 ml. portions of butanol, and the butanol solutions combined and run through a partition column (1. 110 mm; i.d. 29 mm; n-Butanol/1.0N HCl — See Partition Column 1 above). The yellow eluate is evaported to dryness, toluene added, and the mixture again evaporated until free of solvents. The product, a yellow foam, is purified further by countercurrent extraction with the system methanol: water: chloroform: carbon-tetrachloride (4:4:3:1). The upper layer is the stationary phase and the lower layer the mobile phase.

25 ml. of the stationary phase is placed into each of eleven 50 ml. separatory funnels. Then 25 ml. of the mobile phase is put into tubes 1 and 2.

The yellow foam is dissolved in the contents of tube I. (pH of the upper phase of tube 1=pH 3.2). 5% $NH_3$ solution is cautiously added to tube I, until the pH of the upper layer is pH 8.0. The tube is shaken vigorously after each addition of base. If the pH should accidently rise above pH 8.0, it is brought back to the required pH by addition of 5% HCl.

Tubes 1 and 2 are shaken vigorously and allowed to separate. Then the lower phase of tube 2 is transferred to tube 3, and the lower phase of tube 1 to tube 2. 25 ml. of fresh mobile phase is added to tube 1.

Tubes 1, 2 and 3 are shaken, allowed to separate, and transferred, 3 to 4, 2 to 3, 1 to 2, and 25 ml. of fresh mobile phase to 1, etc.

A very rapid way to run this countercurrent is as follows. Before the pH of tube 1 is adjusted to 8.0, the contents of tube 2 (being 25 ml. of each, Mobile and Stationary phases) are shaken, allowed to separate, and the lower phase transferred to tube 3. This is in turn shaken, allowed to separate, and the lower phase transferred to tube 4, and so on along the countercurrent train and 3. the lower (mobile phase) discarded. This process assures that the mobile and stationary phases are mutually saturated, and removes any impurities present in the separatory funnels.

Then tube 1 is adjusted to pH 8.0 as described above. Tube 1 is equilibrated, separated and the mobile phase transferred to 2. Fresh mobile phase (25 ml.) is added to 1. 1 and 2 are shaken, allowed to separate, and then 2 is transferred to 3; 1 is transferred to 2. These two separatory funnels contain ca. 80% of the 6-demethyl-6-deoxytetracycline. Their mobile phases are run along the countercurrent train, transferring 3 to 4, 2 to 3, then 4 to 5, and 3 to 4, etc., until the first portion of mobile phase arrives at tube 9. Tube 9 is adjusted to pH 2–3 with 5% HCl, and then equilibrated — most of the color is now in the upper stationary phase. Then the lower phase from 9 is transferred to 10, and 8 to 9, etc., and the mobile phases run through tubes 10 and 11 and finally collected in an Erlenmeyer flask. Compounds which pass through this countercurrent are non-basic. The desired 6-demethyl-6-deoxytetracycline, as the stable hydrochloride salt is in the upper (stationary) phase of tube 9.

Meanwhile, in a second operation 25 ml. of fresh mobile phase is added to tube 1, the mixture equilibrated, the lower layer separated and transferred to tube 2. Then a further 25 ml. portion of the mobile phase is added to tube 1. The process is continued as described above to carry the mobile phases of these tubes through the countercurrent system. A third such operation is also carried out making a total of six tubes (21 changes) which normally is sufficient to remove all the 6-demethyl-6-deoxytetracycline from tubes 1, 2 and 3. Tubes 1, 2 and 3 contain the unidentified product and any trace amounts of Epi 6-demethyl-6-deoxytetracycline. Tubes 1 + 2 + 3 are acidified and evaporated to produce mostly unidentified product and ammonium chloride (71 mg.). The Erlenmeyer flask at the end of the train contains a non-basic impurity and tube 9 contains 6-demethyl-6-deoxytetracycline (49 mg.). Evaporation of tube 9 produces a pale yellow solid which can be crystallized from a small volume of methanol.

A more effective method of purification involves thin layer chromatography on buffered silica gel plates (pH 4.2) and elution therefrom with methanol. The methanol eluates containing the desired product (determined by paper chromatography) are combined, evaporated to dryness and run through a countercurrent system as described above but using only 5 separatory funnels. Tube 1 is adjusted to pH 8.0, and tube 5 is acidic. This is necessary to separate the 6-demethyl-6-deoxytetracycline from the materials used to buffer the silica gel plate. Tube 5 is evaporated to dryness to give almost pure 6-demethyl-6-deoxytetracycline (14 mg.) which is recrystallized from methanol. Bioassay 860 (Control 860); paper chromatography shows only one spot.

| Ultraviolet absorption data | | | | |
|---|---|---|---|---|
| | max: | ε: | E: | % purity |
| (0.01N HCl MeOH | 267 mμ; | 18,700; | 418; | 96.5% |
| | 346 mμ; | 15,300; | 342; | 102% |
| (0.01N NaOH | 247 mμ; | 16,700; | 372; | 99.5% |
| MeOH) | 384 mμ; | 18,500; | 413; | 102 % |

Following the above procedure, racemic 6,12a-dideoxy-6-demethyltetracycline is converted to racemic 6-deoxy-6-demethyltetracycline. The quantities of materials used in the various stages are summarized below.

| Oxidation Step | | |
|---|---|---|
| D.L. 6-demethyl:6-12a-dideoxytetracycline | 250 | mg. |
| Dimethylformamide | 25 | ml. |
| Cerous chloride heptahydrate | 308 | mg. |
| Methanol | 44 | ml. |
| Buffer (9 ml. 0.1N glycine/0.1N NaCl) (8 ml. 0.1N NaOH ) | pH | 10.4 |
| Epimerization Step | | |
| D.L. 6-deoxy-6-demethyltetracycline - C₄ epi mixture | 99.5 | mg. |
| CaCl₂ (anhydrous) | 63 | mg. |
| n-Butanol | 3 | ml. |
| Water | 0.1 | ml. |
| Ethanolamine solution (10% v/v in butanol) apparent pH | 8.5 | |

EXAMPLE LXXXIII n-Butyl-3-hydroxy-5-methoxy-8-chloro-4,10-dioxo-1,2,3,4,4a,9,9a,10-octahydroanthracene-2-(α-methylamino)acetate hydrochloride Following the method of Example LIX, 2-carbobutoxymethylidene-5-methoxy-8-chloro-3,4,10-trioxo-1,2,3,4,4a,9,9a,10-octahydroanthracene is converted to the title compound by substituting monomethylamine for dimethylamine.

In the same manner, the following compounds are prepared:

n-butyl-3-hydroxy-5-methoxy-4,10-dioxo-1,2,3,4,4a,9,9a,10-octahydroanthracene-2-(α-methyl amino) acetate hydrochloride n-butyl-3-hydroxy-4,10-dioxo-1,2,3,4,4a,9,9a,10-octahydroanthracene-2-(α-methylamino)acetate hydrochloride n-butyl-3-hydroxy-5-methoxy-8-chloro-4,10-dioxo-1,2,3,4,4a,9,9a,10-octahydroanthracene-2-(α-amino)acetate hydrochloride n-butyl-3-hydroxy-5-benzyloxy-4,10-dioxo-1,2,3,4,4a,9,9a,10-octahydroanthracene-2-(α-amino)acetate hydrochloride

EXAMPLE LXXXIV n-butyl-3-formyloxy-5-methoxy-8-chloro-4,10-dioxo-1,2,3,4,4a,9,9a,10-octahydroanthracene-2-(α-N-methyl-N-formyl amino)acetate The title product of Example LXXXIII (0.001 mole) is treated with excess acetoformic anhydride according to the procedure of Example LXII. However, the residue remaining after removal of the pyridine by repeated evaporation of toluene is extracted with chloroform. The chloroform extract is dried then chromatographed on silicic acid using 5% methanol-chloroform as eluant. The fraction containing the desired product is recognized by a band at about 6μ in the infra-red spectrum. The remaining products of Example LXXXIII are formylated in like manner.

EXAMPLE LXXXV

3-Hydroxy-5-methoxy-8-chloro-4,10-dioxo-1,2,3,4a,4a,9,9a,10-octahydroanthracene-2-[(α-N-formyl-N-methyl)amino]acetic Acid Lactone The title product of Example LXXXIV is stirred for 5 minutes at 60°C. under nitrogen in 10 ml. of acetic acid containing 1 ml. of concentrated sulfuric acid and 3 ml. of water. The solution is then cooled, poured into 4 volumes of water and extracted with chloroform. The chloroform extract is back-washed with sodium bicarbonate solution, water and brine, then dried over anhydrous sodium sulfate. The solvent is removed in vacuo and the residue worked according to the method of Example LXIV to give the lactone. The residue is taken up in chloroform and the solution is chromatographed on silicic acid with 5% methanol-chloroform as eluant. The product occurs in the major less polar fraction.

The remaining products of Example LXXXIV reacted in like manner to produce the corresponding lactones.

EXAMPLE LXXXVI

5-Methoxy-8-chloro-4,10-dioxo-1,2,3,4,4a,9,9a,10-octahydroanthracene-2-[(α-N-formyl-N-methyl)amino]acetic Acid.

The title lactone of Example LXXXV is subjected to the reaction conditions of Example LXVI. The residue obtained is purified by extraction into saturated sodium bicarbonate solution followed by acidification and extraction into chloroform. The dried chloroform solution is chromatogrphed on silicic acid using 5% methanol-chloroform as eluant. The product is contained in the polar fraction.

Application of this procedure to the remaining products of Example LXXXV produces the corresponding 3-desoxy acids.

EXAMPLE LXXXVII

3-Acyloxy-4,10-dioxo-1,2,3,4,4a,9,9a,10-octahydroanthracene-2(α-N-acylamino)acetates A variety of products of formula XVB wherein at least one of $R_3$ and $R_4$ is hydrogen are prepared by acylation at the 3-position and at the nitrogen by the procedure which comprises dissolving 0.05 equivalent of the appropriate 3-hydroxy-4,10-dioxo-1,2,3,4,4a,9,9a,10-octahydroanthracene-2-(α-amino)acetate in 0.4 mole of anhydrous pyridine, adding 0.20 equivalent of the desired anhydride (acetic, propionic butyric) and stirring for 15 minutes at 60°–100° C. The mixture is then poured into an excess of ice water and the diacylated compound separated by filtration if solid, and the product washed thoroughly with water. When the product is not a solid, it is separated by chloroform extraction, thorough washing of the extract with water and evaporation of the solvent after drying.

The following compounds are thus prepared. When the acyl group is formyl, the procedure of Example LXXXIV is used.

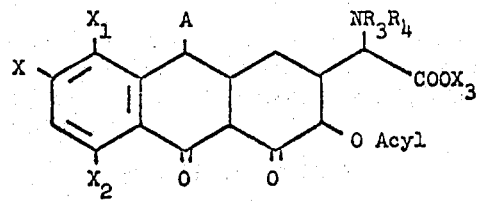

| $X_1$ | X | $X_2$ | A | $NR_3R_4$ | $X_3$ | Acyl |
|---|---|---|---|---|---|---|
| 8-Et | H | 5-OMe | H | MeNCHO | Me | Formyl |
| 8-NMe$_2$ | H | 5-OMe | H | BzNCHO | Me | Formyl |
| H | 7-i-Pr | 5-OMe | H | MeNCOC$_2$H$_5$ | Pr | Propionyl |
| 8-Et | 7-Et | 5-OMe | H | MeNCOCH$_3$ | Pr | Acetyl |
| H | H | 5-OMe | H | BzNCHO | Bu | Formyl |
| H | H | 5-OMe | H | C$_6$H$_5$NCHO | Bu | Formyl |
| 8-Cl | H | 5-OMe | Me | MeNCOCH$_3$ | Bu | Acetyl |
| H | H | 5-OMe | Me | NHCOCH$_3$ | Bu | Acetyl |
| H | H | 5-OBz | H | NHCOC$_3$H$_7$ | Bu | Butyryl |
| H | H | H | H | MeNCOCH$_3$ | Bu | Acetyl |

Me = CH$_3$; Et = C$_2$H$_5$; Pr = C$_3$H$_7$; Bu = C$_4$H$_9$; Bz = CH$_2$C$_6$H$_5$

EXAMPLE LXXXVIII

Following the procedures of Examples LXXXV-LXXXVI and LXXIV, the products of Example LXXXVII are converted to their corresponding 12a-deoxytetracyclines.

EXAMPLE LXXXIX

Lactam of 3-hydroxy-3-N-methylamino-5-methoxy-8-chloro-4,10-dioxo-1,2,3,4,4a,9,9a-10-octahydroanthracene-2-(α-N-methylamino)acetic Acid Under a nitrogen atmosphere, 2-carbobutoxymethylidene-5-methoxy-8-chloro-3,4,10-trioxo-1,2,3,4,4a,9,9a,10-octahydroanthracene (1.00 g.; the product of Example LVI-A) is dissolved in 25 ml. of liquid monomethylamine and stirred for 2 hours at −15° C. The amine is then evaporated under reduced pressure (air being excluded) and the residue slurried in ether containing a small amount of ethyl acetate for 2 hours at 0° C., filtered and washed with ether. The orange solid (1.08 g.) gives characteristic absorption maxima in the ultraviolet region:

$\lambda_{Max}^{MeOH-HCl}$ 348 mμ (ε ca. 14,000)
$\lambda_{Max}^{MeOH-NaOH}$ 360 mμ (ε ca. 14,500)

and infrared region:

$\lambda_{Max}^{CHCl_3}$ 5.87 μ (lactam > C=0) 6.2 – 6.3 μ (broad β-diketone).

Similarly, the following fused lactams are prepared from the appropriate unsaturated butyl ester and primary amine reactants.

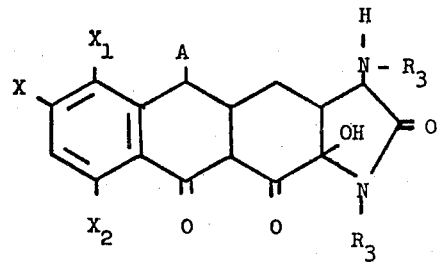

| $X_1$ | X | $X_2$ | A | $R_3$ |
|---|---|---|---|---|
| H | H | 5-OMe | H | H |
| H | H | 5-OMe | H | Et |
| H | H | 5-OBz | H | Me |
| 8-Cl | H | 5-OBz | H | Me |
| H | H | H | H | Me |
| 8-Cl | H | 5-OMe | H | Bu |
| 8-OMe | 6-OMe | 5-OMe | H | Me |
| 8-CF$_3$ | H | 5-OMe | Me | CH$_2$CH$_2$NMe$_2$ |
| 8-Cl | H | 5-OMe | H | C$_6$H$_{13}$ |

EXAMPLE XC

5-Methoxy-8-chloro-4,10-dioxo-1,2,3,4,4a,9,9a,10-octahydro-2-anthraldehyde

Method A

To 0.50 g. of 5-methoxy-8-chloro-4,10-dioxo-1,2,3,4,4a,9,9a,10-octahydroanthracene-2-(α-dimethylamino)acetic acid (the product of Example LXVI) suspended in 100 ml. of chloroform is added 0.29 g. (2.2 equivalents) of triethylamine. The mixture is stirred at room temperature for 20 minutes, and the clear yellow solution then cooled to 0° C. Para-nitrobenzenesulfonyl chloride (0.48 g., 1.65 equivalents) is added and the solution stirred at 0°–5° C. for one hour then concentrated to small volume. Chromatography on 30 g. of acid washed Florisil and elution with chloroform gives a yellow oil which slowly crystallizes. Trituration with ether gives 0.46 g. of yellow crystals; m.p. 141°– 147° C. Recrystallization from chloroform-ethylacetate affords a mixture of yellow prisms and colorless plates which are separated mechanically; m.p. 178°–179° and 170°–171° C., respectively. The colorless plates are identified as N,N-dimethyl-p-nitrobenzene sulfonamide by comparison with an authentic sample.

Recrystallization of the yellow prisms from ethyl acetate affords the desired aldehyde. m.p. 178°–179° C.; $\lambda_{Max}^{CHCl_3} = 3.67 \mu$ (aldehyde C—H), 5.74 (aldehyde C=O), 6.15–6.3 $\mu$ (broad, $\beta$-diketone.)

Analysis: Calcd. for $C_{16}H_{15}O_4CL$: C, 62.64; H, 4.93%. Found: C, 62.43; H, 4.77%.

Method B

Diethyl chlorophosphate (1.1 equivalents, 0.15 g.) is added at 0° C. to a solution of 5-methoxy-8-chloro-4,10-dioxo-1,2,3,4,4a,9,9a,10-octahydroanthracene (0.30 g.) in 15 ml. of dimethylformamide. After 2 hours stirring at 0° C., the dimethylformamide is evaporated under reduced pressure. The residue is dissolved in chloroform, the solution washed three times with water, once with saturated sodium chloride and dried over anhydrous sodium sulfate. Removal of the solvent leaves a yellow oil which, when triturated with ethyl acetate is converted to yellow crystals (0.125 g.); m.p. 160°–163° C.

The product, purified by recrystallization from ethyl acetate, is identical to the aldehyde of Method A.

By means of these procedures, the remaining $\alpha$-amino acids of Example LXVI wherein the $R_3$ and $R_4$ groups of the amino acid moiety are other than hydrogen or acyl are converted to the corresponding 2-anthraldehydes. Amino and hydroxy groups in the reactants are, of course, first protected by appropriate means, e.g. by acylation, and in the case of hydroxy groups by ether formation. Those products of Example LXVI wherein at least one of $R_3$ and $R_4$ is hydrogen are operative in these processes by replacement of the hydrogen with an alkyl, aryl or alkaryl group. It is generally preferred to alkylate an $\alpha$-primary or secondary amino group to a tertiary amino group before application of the above methods.

EXAMPLE XCI

4-Desdimethylamino-4-N-Methyl, N-($\beta$-hydroxyethyl)amino-6,12a-dideoxy-6-Demethyl-7-Chlortetracycline This product is prepared from 4-desdimethylamino-4-N-methyl, N-($\beta$-methoxyethyl)amino-6,12a-dideoxy-6-demethyl-7-chlortetracycline-10-methyl ether by heating with 48% HBr or 50% HI (25 ml. per gram of the tetracycline) at 100° C. for 45 minutes, followed by concentration, as in Example LXXXIX-A. Similarly, the appropriate 4-desdimethylamino-4-N-methyl,N-($\beta$-methoxyalkyl)amino-6-deoxy-6-demethyl-7-chlortetracycline-10-methyl ethers are subjected to the same reactions to produce the 12a-hydroxy compounds corresponding to the foregoing products.

EXAMPLE XCII

6-Demethyl-6,12a-Dideoxy-7-Chlortetracycline-10-Benzylether

Methyl  2-decarboxamido-6-demethyl-6,12a-dideoxy-7-chlortetracycline-2-carboxylate-10-benzyl ether, 100 mg., is fused with 2 g. ammonium formate at 140° C. for 3 hours under nitrogen. After cooling, the reaction mixture is extracted with water and with ethyl acetate. The extracts are equilibrated and the organic phase separated and washed with water. After drying, the organic extract is evaporated at reduced pressure, and the solid residue obtained is hydrolyzed by refluxing in a mixture of 7.5 ml. glacial acetic acid, 7.5 ml. concentrated hydrochloric acid and 5 drops water for an hour. The hot reaction mixture is poured into water, adjusted to pH 5.5 and extracted with chloroform. The organic phase is separated, water-washed, dried and concentrated in vacuum to obtain the product. It is purified by recrystallization from aqueous alcohol.

EXAMPLE XCIII

The procedure of Example LXXVII is repeated employing the 12a-deoxy compound of Example XCII as reactant to produce the corresponding 12a-hydroxy compound.

What is claimed is:

1. A compound selected from the group consisting of those having the formula:

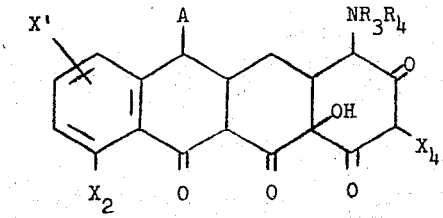

wherein

X' is selected from the group consisting of 7-trifluoromethyl, 8-trifluoromethyl, 8-dimethylamino, 7-lower alkyl, 7-hydroxyl, 8-hydroxyl and 7-lower alkoxyl;

$X_2$ is OR' wherein R' is selected from the group consisting of hydrogen, lower alkyl and benzyl;

A is selected from the group consisting of hydrogen, lower alkyl, and $B_2OCHB_3$— wherein $B_2$ is lower alkyl, and $B_3$ is selected from the group consisting of hydrogen and lower alkyl;

$R_3$ and $R_4$ when taken together with the nitrogen atom to which they are attached form a nitrogen heterocyclic ring selected from the group consisting of piperazino, piperidino, morpholino, pyrrylo, thiomorpholino, pyrrolidono and 2-(lower carbalkoxy)pyrrolidino;

$R_3$ and $R_4$ when taken separately are each selected from the group consisting of hydrogen, lower alkyl and alkanoyl containing 1 to 4 carbon atoms, and $\beta$-dimethylaminoethyl, with the proviso that only one of said $R_3$ and $R_4$ substituents is alkanoyl containing 1 to 4 carbon atoms and $X_4$ is selected from the group consisting of cyano and —$CONHR_6$ in which $R_6$ is selected from the group consisting of hydrogen and lower alkyl.

2. The compound of claim 1 wherein each of $R_3$ and $R_4$ is lower alkyl; $X_4$ is —$CONH_2$; A is hydrogen; $X_2$ is hydroxyl; and X' is 8-dimethylamino.

3. The compound of claim 1 wherein each of $R_3$ and $R_4$ is methyl; $X_4$ is —$CONH_2$; A is hydrogen; $X_2$ is hydroxyl; and X' is 8-hydroxyl.

4. The compound of claim 1 wherein each of $R_3$ and $R_4$ is methyl; $X_4$ is —$CONH_2$; A is hydrogen; $X_2$ is hydroxyl; and X' is 7-trifluoromethyl.

5. The compound of claim 2 wherein each of $R_3$ and $R_4$ is methyl; $X_4$ is —$CONH_2$; A is hydrogen; $X_2$ is hydroxyl and X' is 8-dimethylamino.

6. A compound selected from the group consisting of those having the formula:

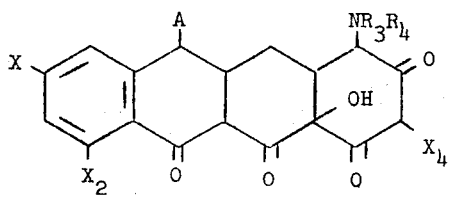

wherein
  X is selected from the group consisting of amino, mono-lower alkylamino and mono-alkanoylamino containing 2 to 4 carbon atoms;
  $X_2$ is OR' wherein R' is selected from the group consisting of hydrogen, lower alkyl and benzyl;
  A is $B_2OCHB_3$—wherein $B_2$ is lower alkyl, and $B_3$ is selected from the group consisting of hydrogen and lower alkyl;
  $R_3$ and $R_4$ are each selected from the group consisting of hydrogen, lower alkyl and β-dimethylaminoethyl;
  $X_4$ is selected from the group consisting of cyano and —$CONHR_6$ in which $R_6$ is selected from the group consisting of hydrogen and lower alkyl.

* * * * *